(12) United States Patent
Moro et al.

(10) Patent No.: US 7,408,674 B2
(45) Date of Patent: Aug. 5, 2008

(54) PRINTING CONTROL APPARATUS AND METHOD FOR CHANGING A SETTING BASED ON A CHANGE IN ANOTHER SETTING

(75) Inventors: Takahiro Moro, Wako (JP); Koji Yamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/659,262

(22) Filed: Sep. 11, 2003

(65) Prior Publication Data

US 2004/0051891 A1    Mar. 18, 2004

Related U.S. Application Data

(62) Division of application No. 09/970,916, filed on Oct. 5, 2001, now Pat. No. 6,704,122, which is a division of application No. 08/768,579, filed on Dec. 18, 1996, now Pat. No. 6,327,051.

(30) Foreign Application Priority Data

Dec. 22, 1995  (JP)  ................................... 7-335045
Dec. 25, 1995  (JP)  ................................... 7-337281
Jul. 31, 1996  (JP)  ................................... 8-202584

(51) Int. Cl.
*G06F 1/00* (2006.01)
*G03G 15/00* (2006.01)
*B65H 39/00* (2006.01)
*B41L 43/12* (2006.01)
*B41F 13/54* (2006.01)

(52) U.S. Cl. ....................... 358/1.9; 358/1.13; 358/1.14; 358/1.15; 358/1.16; 399/370; 399/86; 270/58.08; 270/37; 270/1.01

(58) Field of Classification Search ................... 358/1.9, 358/1.13, 1.14, 1.15, 1.16; 399/370, 86; 270/58.08, 37, 1.01
See application file for complete search history.

(56) References Cited

U.S. PATENT DOCUMENTS 4,393,375 A * 7/1983 Sugiura et al. ................. 399/81

(Continued)

FOREIGN PATENT DOCUMENTS

EP    0 574 182    12/1993

(Continued)

OTHER PUBLICATIONS

Microsoft Press Computer Dictionary, Microsoft Press, Third Edition.*
English translation of JP 4-251871.
English translation of JP 4-251871. Sep. 8, 1992 Laid Open Date.

*Primary Examiner*—Mark Zimmerman
*Assistant Examiner*—Charlotte M Baker
(74) *Attorney, Agent, or Firm*—Fitzpatrick, Cella, Harper & Scinto

(57) ABSTRACT

When a user enters control information for controlling a printing device, the information is stored in a user information storage unit. All combinations of items of the control information capable of being set by the user and values of items incapable of being set by the user, these having been selected so as to be the optimum values for the combinations, are stored as preset values in a combined information storage unit. An information storage unit compares a value in the user information storage unit with a value in the combined information storage unit. If a combination for which agreement is achieved is found in the combined information storage unit, this value is stored in a printing information storage unit and transmitted to the printing device. Thus, an optimum value can be selected and sent to the printing device even with regard to an item incapable of being selected by the user.

15 Claims, 53 Drawing Sheets

U.S. PATENT DOCUMENTS

| | | | | |
|---|---|---|---|---|
| 5,006,895 | A | * 4/1991 | Hashimoto et al. | 399/86 |
| 5,049,929 | A | 9/1991 | Anderson et al. | 399/82 |
| 5,129,639 | A | 7/1992 | DeHority | 270/1.01 |
| 5,159,546 | A | 10/1992 | Inoue et al. | 700/17 |
| 5,182,796 | A | 1/1993 | Shibayama et al. | 345/841 |
| 5,185,628 | A | 2/1993 | Wilson et al. | 399/81 |
| 5,229,814 | A | * 7/1993 | Hube et al. | 399/14 |
| 5,258,779 | A | 11/1993 | Serizawa et al. | 346/134 |
| 5,267,727 | A | * 12/1993 | DeHority | 270/1.02 |
| 5,467,434 | A | * 11/1995 | Hower et al. | 358/1.15 |
| 5,500,715 | A | 3/1996 | Ta et al. | 399/1 |
| 5,604,843 | A | 2/1997 | Shaw et al. | 358/1.1 |
| 5,734,799 | A | 3/1998 | Kusumoto et al. | 358/1.6 |
| 5,757,395 | A | 5/1998 | Chew et al. | 347/24 |
| 6,009,242 | A | 12/1999 | Anzai | 358/1.15 |
| 6,053,595 | A | 4/2000 | Otsuka et al. | |
| 6,327,051 | B1 | 12/2001 | Moro et al. | 358/1.9 |
| 6,339,654 | B1 | 1/2002 | Yamada | |

FOREIGN PATENT DOCUMENTS

| | | |
|---|---|---|
| JP | 3-181958 | 8/1991 |
| JP | 4-251871 | 9/1992 |
| JP | 05-270012 | 10/1993 |
| JP | 07-112538 | 5/1995 |
| JP | 7-234767 | 7/1995 |
| JP | 7-223341 | 8/1995 |
| JP | 07-237306 | 9/1995 |
| JP | 8-25715 | 1/1996 |
| JP | 8-34141 | 2/1996 |
| JP | 08-090865 | 4/1996 |
| JP | 08-185290 | 7/1996 |
| JP | 8-190464 | 7/1996 |
| WO | WO 92/11596 | 7/1992 |
| WO | WO 94/11804 | 5/1994 |

* cited by examiner

FIG. 2

| TYPE OF INFORMATION | INFORMATION ENTERED BY USER |
|---|---|
| PAPER SIZE | A4 |
| PAPER TYPE | COATED PAPER |
| PRINTING QUALITY | HIGH QUALITY |
| PRINTING COLOR | COLOR |

FIG. 3

| TYPE OF INFORMATION | INFORMATION ENTERED BY USER |
|---|---|
| PAPER SIZE | A4 |
| PAPER TYPE | COATED PAPER |
| PRINTING QUALITY | HIGH QUALITY |
| PRINTING COLOR | COLOR |
| PAPER FEED METHOD | AUTOMATIC SHEET FEEDER |

FIG. 4

| TYPE OF INFORMATION | INFORMATION ENTERED BY USER |
|---|---|
| PAPER SIZE | A4 |
| PAPER TYPE | COATED PAPER |
| PRINTING COLOR | COLOR |
| PAPER FEED METHOD | AUTOMATIC SHEET FEEDER |

FIG. 5

| PAPER SIZE | PAPER TYPE | PRINTING QUALITY | PRINTING COLOR | COMBINATION No. |
|---|---|---|---|---|
| A4 | PLAIN PAPER | HIGH QUALITY | COLOR | 1 |
| A4 | PLAIN PAPER | HIGH QUALITY | MONOCHROME | 2 |
| A4 | PLAIN PAPER | LOW QUALITY | COLOR | 3 |
| A4 | PLAIN PAPER | LOW QUALITY | MONOCHROME | 4 |
| A4 | COATED PAPER | HIGH QUALITY | COLOR | 5 |
| A4 | COATED PAPER | HIGH QUALITY | MONOCHROME | 6 |
| A4 | COATED PAPER | LOW QUALITY | COLOR | 7 |
| A4 | COATED PAPER | LOW QUALITY | MONOCHROME | 8 |

FIG. 6

| PAPER SIZE | PAPER TYPE | *PRINTING QUALITY | PRINTING COLOR | COMBINATION No. |
|---|---|---|---|---|
| A4 | PLAIN PAPER | LOW QUALITY | COLOR | 1 |
| A4 | PLAIN PAPER | LOW QUALITY | MONOCHROME | 2 |
| A4 | COATED PAPER | HIGH QUALITY | COLOR | 3 |
| A4 | COATED PAPER | HIGH QUALITY | MONOCHROME | 4 |

* INFORMATION NOT SELECTED BY USER

FIG. 7

| PAPER SIZE | PAPER TYPE | *PRINTING QUALITY | PRINTING COLOR | *SMOOTHING | COMBINATION No. |
|---|---|---|---|---|---|
| A4 | PLAIN PAPER | LOW QUALITY | COLOR | NO | 1 |
| A4 | PLAIN PAPER | LOW QUALITY | MONOCHROME | NO | 2 |
| A4 | COATED PAPER | HIGH QUALITY | COLOR | NO | 3 |
| A4 | COATED PAPER | HIGH QUALITY | MONOCHROME | YES | 4 |

* INFORMATION NOT SELECTED BY USER

FIG. 8

| PAPER SIZE | PAPER TYPE | *PRINTING QUALITY | PRINTING COLOR | *SMOOTHING | PAPER FEED METHOD | COMBINATION No. |
|---|---|---|---|---|---|---|
| A4 | PLAIN PAPER | LOW QUALITY | COLOR | NO | MANUAL INSERTION | 1 |
| A4 | PLAIN PAPER | LOW QUALITY | COLOR | NO | AUTOMATIC SHEET FEEDER | 2 |
| A4 | PLAIN PAPER | LOW QUALITY | MONOCHROME | NO | MANUAL INSERTION | 3 |
| A4 | PLAIN PAPER | LOW QUALITY | MONOCHROME | NO | AUTOMATIC SHEET FEEDER | 4 |
| A4 | COATED PAPER | HIGH QUALITY | COLOR | NO | MANUAL INSERTION | 5 |
| A4 | COATED PAPER | HIGH QUALITY | COLOR | NO | AUTOMATIC SHEET FEEDER | 6 |
| A4 | COATED PAPER | HIGH QUALITY | MONOCHROME | YES | MANUAL INSERTION | 7 |
| A4 | COATED PAPER | HIGH QUALITY | MONOCHROME | YES | AUTOMATIC SHEET FEEDER | 8 |

* INFORMATION NOT SELECTED BY USER

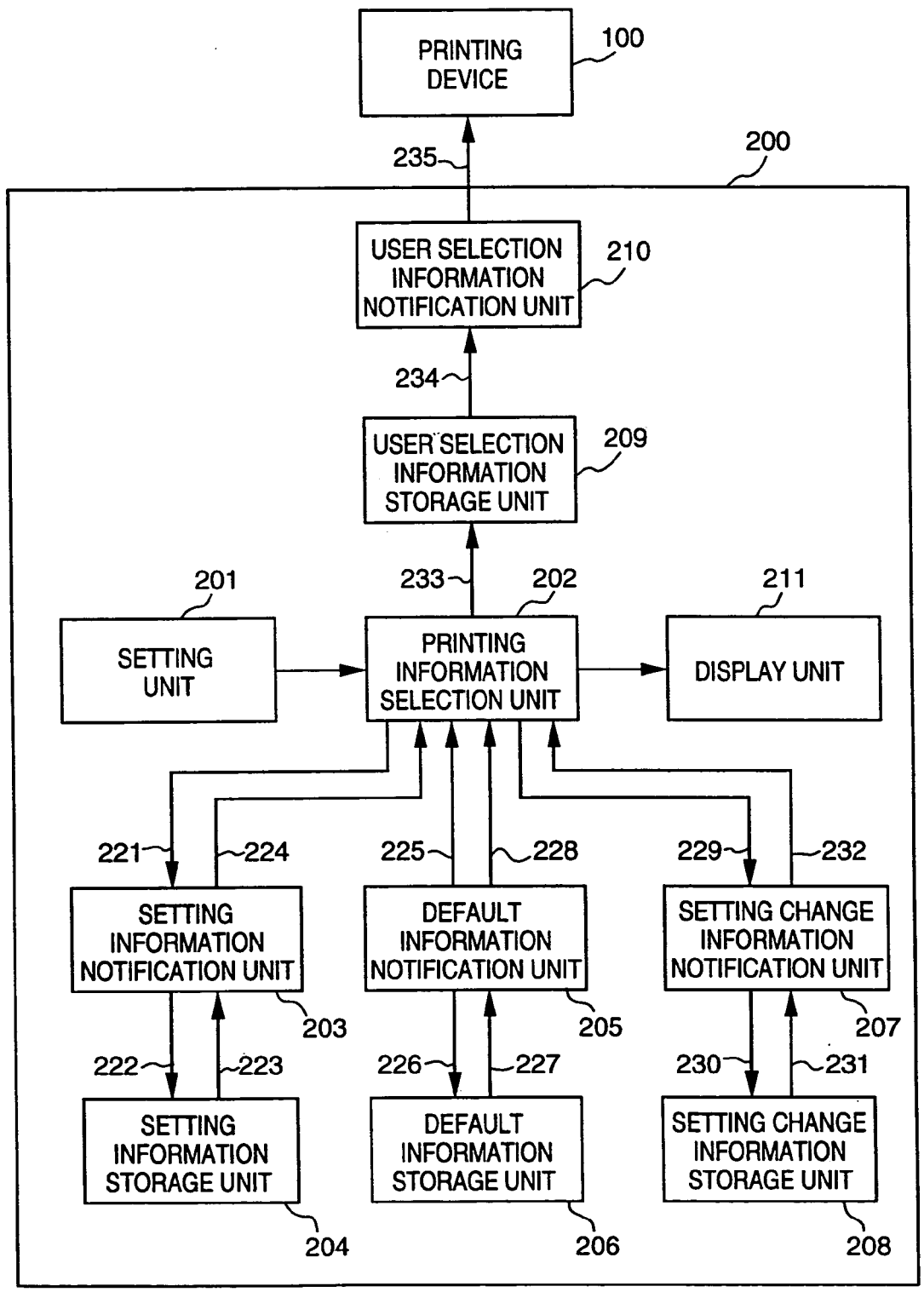

FIG. 13

| | | | |
|---|---|---|---|
| MEDIA TYPE: | PLAIN PAPER<br>COATED PAPER<br>OHP PAPER | PRINTING QUALITY: | HIGH-QUALITY PRINTING<br>INTERMEDIATE-QUALITY PRINTING<br>LOW-QUALITY PRINTING |
| PAPER SIZE: | A4<br>A5<br>B4<br>B5<br>POSTCARD | PAPER FEED METHOD: | AUTOMATIC SHEET FEEDER<br>MANUAL INSERTION |
| PRINTING COLOR: | COLOR PRINTING<br>MONOCHROME PRINTING | | ( SELECT )<br>( CANCEL ) |

FIG. 14

| | | | |
|---|---|---|---|
| MEDIA TYPE: | PLAIN PAPER<br>COATED PAPER<br>OHP PAPER | PRINTING QUALITY: | HIGH-QUALITY PRINTING<br>INTERMEDIATE-QUALITY PRINTING<br>LOW-QUALITY PRINTING |
| PAPER SIZE: | A4<br>A5<br>B4<br>B5<br>POSTCARD | PAPER FEED METHOD: | AUTOMATIC SHEET FEEDER<br>MANUAL INSERTION |
| PRINTING COLOR: | COLOR PRINTING<br>MONOCHROME PRINTING | | ( SELECT )<br>( CANCEL ) |

FIG. 18

| SETTABLE ITEM | SETTING |
|---|---|
| PAPER SIZE | A5<br>A5 HORIZONTAL<br>A4<br>POSTCARD<br>ENVELOPE |
| PRINTING COLOR | COLOR<br>MONOCHROME<br>AUTOMATIC |
| MEDIA TYPE | PLAIN PAPER<br>OHP FILM<br>COATED PAPER<br>BLACK PRINT FILM<br>FABRIC<br>THICK PAPER |
| PRINTING QUALITY | QUALITY 1<br>QUALITY 2<br>QUALITY 3<br>QUALITY 4<br>QUALITY 5 |
| DITHER PROCESSING | AUTOMATIC SHEET FEEDER<br>MANUAL INSERTION |
| COLOR INFORMATION PROCESSING | DITHER PATTERN<br>ERROR DIFFUSION |
| PAPER FEED METHOD | COLOR PROCESSING ON<br>COLOR PROCESSING OFF |

FIG. 19

| SETTING ITEM | SETTING |
|---|---|
| PAPER SIZE | A4 |
| PRINTING COLOR | AUTOMATIC |
| MEDIA TYPE | PLAIN PAPER |
| PRINTING QUALITY | QUALITY 3 |
| PAPER FEED METHOD | AUTOMATIC SHEET FEEDER |
| DITHER PROCESSING | DITHER PATTERN |
| COLOR PROCESSING INFORMATION | COLOR PROCESSING ON |
| RESOLUTION MESSAGE | 360 × 360dpi |
| PRINTING MODE MESSAGE | HQ |
| SMOOTHING MESSAGE | OFF |

FIG. 25

[PHOTOGRAPHIC FILM] PROPERTIES

QUALITY | COLOR SETTING | SETTING REGISTRATION

PRINTING QUALITY (Q)

HIGH SPEED — HIGH QUALITY

RESOLUTION 720 × 360dpi
PRINTING MODE FINE

PAPER FEED METHOD (F): MANUAL INSERTION
MEDIA (M): HIGH-GLOSS FILM

DITHER SETTING ☐ AUTOMATIC SETTING (E)

PATTERN (HIGH SPEED) | PATTERN | ERROR DIFFUSION

CARTRIDGE SELECTION: NORMAL CARTRIDGE

OK | CANCEL | UPDATE (A) | RETURN TO STANDARD (D) | HELP

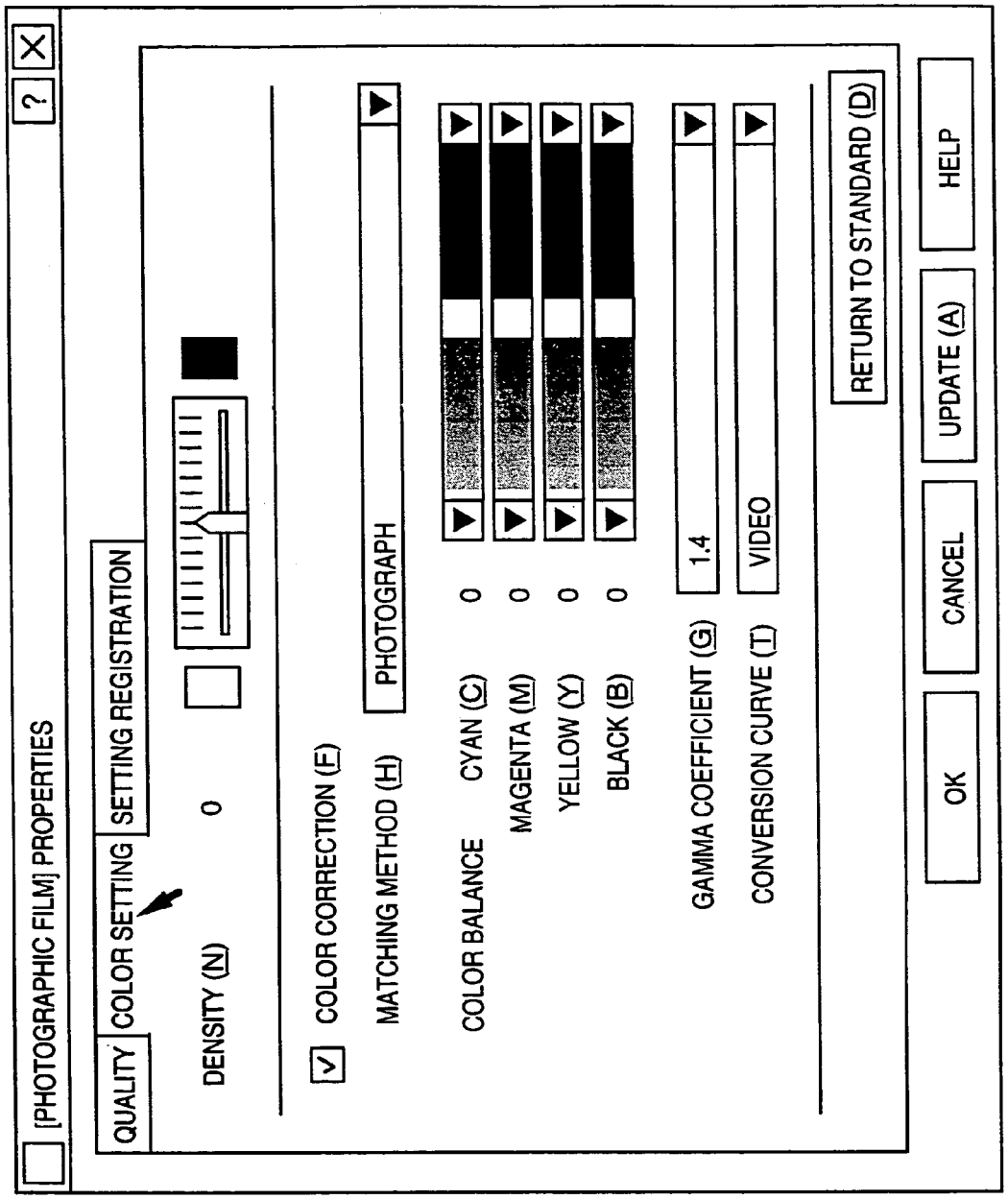

[PHOTOGRAPHIC FILM (UPDATED)] PROPERTIES

| QUALITY | COLOR SETTING | SETTING REGISTRATION |

PRINTING QUALITY (Q)          RESOLUTION   720 × 360dpi
                              PRINTING MODE   FINE

HIGH SPEED      HIGH QUALITY

PAPER FEED METHOD (F)  [AUTOMATIC SHEET FEEDER ▼]
MEDIA (M)              [COATED PAPER ▼]

DITHER SETTING   ☐ AUTOMATIC SETTING (E)

PATTERN (HIGH SPEED)      PATTERN       ERROR DIFFUSION

CARTRIDGE SELECTION  [NORMAL CARTRIDGE ▼]

[OK]  [CANCEL]  [UPDATE (A)]  [HELP]

RETURN TO STANDARD (D)

Kanon BJC-4550     Version 1.0

Copies : [ 1 ]

Pages : ⊙ All    ○ From [ ] To [ ]

Print Quality : [ Normal ▶ ]

Cartridge : [ Color ▶ ]

Paper Feed : [ Automatic ▶ ]

Destination : [ Printer ▶ ]

☐ Reverse Order

☐ Collate Copies

[ Print ]   [ Cancel ]   [ Color... ]   [ Save ]   [ Default ]

Monochrome
✓ Color
    Photo Color

BJC-4550 Error number : D12
Color BJ cartridge is not installed.
Please replace the black BJ cartridge
with a color BJ cartridge Continue    Stop

```
    A3
    A4
    B4
    A5
    B5
✓   Letter
    Legal
    Tabloid
    #10 Envelop
    DL Envelop
    Custom 1
    Custom 2
    Custom 3
```

BJC-4550 Error number : D1
Paper Size is not correct.
Please replace A4 paper with A3 paper.

[ Continue ]   [ Stop ]

FIG. 43

Kanon BJC-4550        Version 1.0

Copies: [1]  Pages: ⊙ All  ○ From [ ] To [ ]

Print Quality: | Normal ▶ |

Cartridge: | Color ▶ |

Paper Feed: | Automatic ▶ |

Destination | Printer ▶ |

☐ Reverse Order

☐ Collate Copies

[ Print ]
[ Cancel ]
[ Color... ]
[ Save ]
[ Default ]

FIG. 50

Kanon BJC-4550     Version 1.0

Copies: 1    Pages: ⊙ All    ○ From [ ] To [ ]

Print Quality: Normal ▶

Cartridge: Color ▶

Paper Feed: Automatic ▶

Destination: Printer ▶

☐ Reverse Order

☐ Collate Copies

[ Print ]   [ Cancel ]   [ Color... ]   [ Save ]   [ Default ]

FIG. 51

```
  Monochrome
√ Color
  Photo Color
```

FIG. 52

```
√ Monochrome
  Color
  Photo Color
```

FIG. 53

```
  Monochrome
  Color
√ Photo Color
```

Press cartridge button on printer after BJ cartridge is replaced.

Do you wish to reset remaining amount of ink?
Reset when new BJ cartridge has been installed.

Cancel    OK

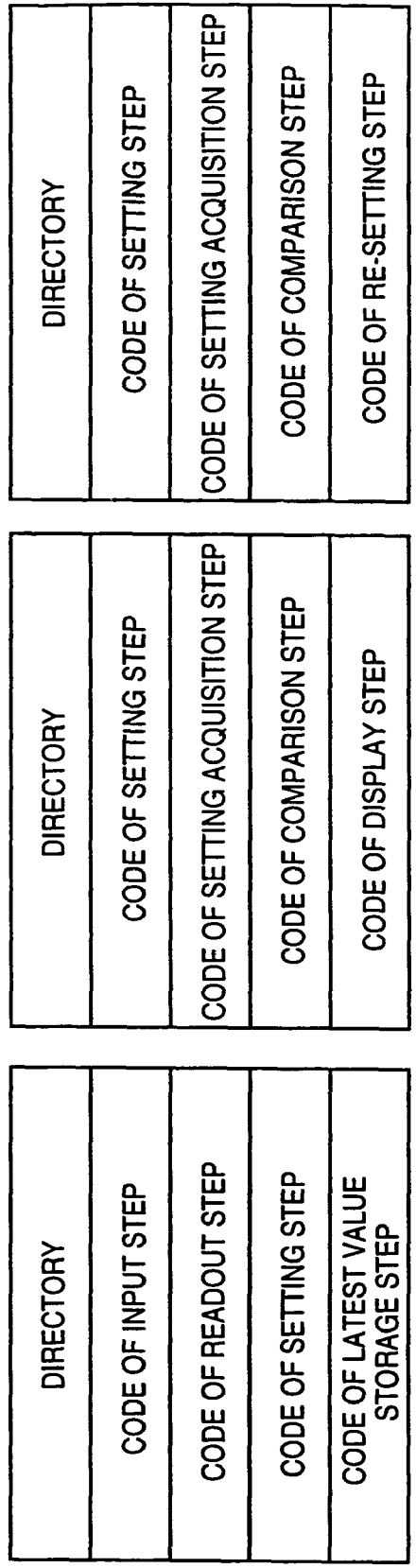

FIG. 64 (PRIOR ART)

MEDIA TYPE:
- PLAIN PAPER
- COATED PAPER
- OHP PAPER

PRINTING QUALITY:
- HIGH-QUALITY PRINTING
- INTERMEDIATE-QUALITY PRINTING
- LOW-QUALITY PRINTING

PAPER SIZE:
- A4
- A5
- B4
- B5
- POSTCARD

PAPER FEED METHOD:
- AUTOMATIC SHEET FEEDER
- MANUAL INSERTION

PRINTING COLOR:
- COLOR PRINTING
- MONOCHROME PRINTING

SELECT  CANCEL

FIG. 65 (PRIOR ART)

| | |
|---|---|
| PAPER SIZE | A4<br>A5<br>A5 HORIZONTAL<br>LETTER<br>LEGAL<br>POSTCARD |
| MEDIA TYPE | PLAIN PAPER<br>COATED PAPER<br>FOR OHP<br>GLOSSY PAPER<br>HIGH-GLOSS FILM<br>THICK PAPER |
| PRINTING QUALITY | HIGH QUALITY<br>INTERMEDIATE QUALITY<br>LOW QUALITY |
| PAPER FEED METHOD | AUTOMATIC SHEET FEEDER<br>MANUAL INSERTION |
| PRINTING COLOR | COLOR<br>MONOCHROME |
| DITHER | DITHER PATTERN<br>ERROR DIFFUSION |
| COLOR PROCESSING | ☐ |
| CYAN | |
| MAGENTA | |
| YELLOW | |
| BLACK | |

OK    CANCEL

PRINTING CONTROL APPARATUS AND METHOD FOR CHANGING A SETTING BASED ON A CHANGE IN ANOTHER SETTING

This application is a division of application Ser. No. 09/970,916 filed Oct. 5, 2001, now U.S. Pat. No. 6,704,122, which is a division of application Ser. No. 08/768,579 filed Dec. 18, 1996, now U.S. Pat. No. 6,327,051 issued Dec. 4, 2001.

BACKGROUND OF THE INVENTION

Field of the Invention

This invention relates to a printing control apparatus and method which make it possible to set the values of functions possessed by a printing device, wherein printing information for controlling the operation of the printing device is delivered to the printing device to control the same.

A printing control apparatus known in the art supplies printing information, which is necessary to perform printing using a desired paper and in accordance with a desired method, to a printing device in which it is possible to select plural types of printing paper and a variety of printing methods. With an apparatus of this kind, the user selects or enters various information necessary for printing and the items of information thus selected or entered are combined by the printing control apparatus to obtain the printing information that is required for optimum printing. This information is supplied to the printing device so that a printout may be obtained on the desired paper and in accordance with the desired method.

With the example of the prior art mentioned above, however, a considerable burden is placed upon the user since the user is required to select or enter the various information needed for printing. In addition, if the information is entered or selected erroneously, there is a good possibility that printing may not be performed in optimum fashion. Furthermore, since the printing control apparatus combines the entered information, creates printing information necessary to carry out printing and supplies this information to the printing device, it is difficult to deal with situations where the content of the entered information or the number of items in the information changes or situations where the content of the information or number of items in the information supplied to the printing device changes.

Further, a printing information supply apparatus known in the art supplies information necessary to perform printing to a printing device in which it is possible to select plural types of printing paper and a variety of printing methods. With a printing information supply apparatus of this kind, the user selects or enters various information necessary for printing and the items of information thus selected or entered are combined to obtain the information that is required for optimum printing. This information is supplied to the printing device.

As shown in FIGS. 64 and 65, the printing information supply apparatus displays various settable items such as media type, paper size, printing quality, paper supply method, type of dithering and color processing information, as well as values set for these. The user selects or enters the settings from the items displayed.

The fact that values are required to be selected or entered with regard to a large number of items places a large burden upon the user. Moreover, if the user selects a value erroneously, the incorrect setting is supplied to the printing device and, as a result, printing is not performed in optimum fashion. For example, to print on OHP (overhead projector) paper, "OHP Paper" is selected as the setting of the item "Media Type." If "Automatic Sheet Feeder" is selected as the setting of the item "Paper Supply Method," however, a function that allows manual insertion of the medium will not operate.

Furthermore, since the printing information supply apparatus internally combines information, creates information necessary to carry out printing based upon the combination and supplies this information to the printing device, it is difficult to deal with situations where the content of the entered information or the number of items in the information changes or situations where the content of the information or number of items in the information supplied to the printing device changes.

Further, in many color inkjet printers, for example, a head for monochrome printing and a head for color printing are separate from each other and the heads must be interchanged in dependence upon the particular printing job. The conventional printing control apparatus is so adapted that color printing and monochrome printing can be set.

In order to verify that ink remains in a printer that is not equipped with a remaining ink sensor, often the quantity of ink used is counted in the printer and the amount of ink remaining is sensed based upon the quantity of ink used. In a printer of this kind, resetting of the amount of remaining ink must be performed by the operator in conformity with a cartridge installed to replace the old cartridge.

With this example of the prior art, however, a considerable load is placed upon the user as the user is required to select or enter a variety of information necessary for printing. If information is entered or selected incorrectly, it is likely that optimum printing will not be carried out. For example, to print on paper (referred to as paper A) which requires that paper supplied by manual insertion be selected as the paper supply method, "paper A" is selected as the setting of the item "media type." However, if "automatic sheet feeder" is selected as the setting of the item "paper supply method," paper cannot be fed by manual insertion and it is likely that a printing problem such as jamming will occur.

Further, since items of information are combined within the printing control apparatus, information necessary to perform printing is created based upon the combination and the created information is supplied to the printing device, it is difficult to deal with situations where the content of the entered information or the number of items in the information changes or situations where the content of the information or number of items in the information supplied to the printing device changes.

Further, in a case where the operator designates resetting of remaining amount of ink in accordance with cartridge replacement, the remaining amount of ink will not be the correct amount if the cartridge for which resetting has been designated and a cartridge actually installed as the replacement differ.

Further, even if the printer is one capable of being fitted with either a color head or a monochrome head, printing data is transmitted to the printing device in accordance with the setting of the printing control apparatus by the operator. If the head installed differs from that for which the setting has been made, correct printing will not be carried out.

SUMMARY OF THE INVENTION

A first object of the present invention is to provide a printing control apparatus for controlling a printing device by creating printing information that conforms to results of printing desired by a user, this being performed without placing a burden upon the user.

A second object of the present invention is to provide a printing information supply apparatus and method capable of alleviating the burden of entering settings.

A third object of the present invention is to provide a printing control apparatus in which the status of a printer is checked before printing, a warning display is presented if a setting made by the printing control apparatus differs from the status of the printer, and it is made possible to change the setting of the printer so as to make it the same as that set by the printing control apparatus, thereby enabling printing to be performed correctly.

A fourth object of the present invention is to provide a printing control apparatus and method through which a cartridge installed before replacement and a cartridge installed after replacement are compared and resetting of the amount of remaining ink is performed in conformity with the cartridge after replacement, thereby making it possible to deal with the remaining amount of ink correctly.

According to the present invention, the foregoing objects are attained by providing a printing control apparatus in which printing control information to be set in a printing device is stored as settable value information obtained by combining settable items and values. Further, default information, in which appropriate values are set for items capable of being set by the operator and for items that cannot be set by the operator, is stored. In a case where a specific item takes on a specific value, an item and value decided in accordance with this value are stored as link information. When printing is performed, the settable value information and default information that has been stored in advance is read out and the read information is stored and displayed as settings for the printing device. When these values are changed by the operator, the link information is read out based upon the changed items and values. If there is another item for which a value should be changed, the value of this item is changed and displayed. If necessary, the operator can be made to verify these values before sending them to the printing device.

In a preferred embodiment, settable values are displayed at all times and settings are displayed in an emphasized manner.

Further, the type of ink cartridge used by the printing device is included as the settable information. If the ink cartridge actually installed and the ink cartridge to be installed differ, printing processing is terminated without printing being performed or printing is carried out by another printing device.

Further, in a printing control apparatus which manages the amount of remaining ink, a check is performed at the time of ink cartridge replacement to determine whether the cartridges before and after replacement are the same. If the cartridges are the same, the amount of remaining ink is reset and management of the amount of remaining ink is started anew. This makes is possible to manage the amount of remaining ink correctly.

Other features and advantages of the invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a diagram illustrating an example of the content of a user information storage unit for storing user information;

FIG. 3 is a diagram illustrating an example of the content of a user information storage unit for storing user information;

FIG. 4 is a diagram illustrating an example of the content of a user information storage unit for storing user information;

FIG. 5 is a diagram illustrating an example of the content of a combined information storage unit for storing combined information;

FIG. 6 is a diagram illustrating an example of the content of a combined information storage unit for storing combined information;

FIG. 7 is a diagram illustrating an example of the content of a combined information storage unit for storing combined information;

FIG. 8 is a diagram illustrating an example of the content of a combined information storage unit for storing combined information;

FIG. 12 is a block diagram illustrating a second embodiment of the present invention;

FIG. 13 is a diagram showing an example of emphasized display of default settings;

FIG. 14 is a diagram showing an example of a display after a setting for media type is changed;

FIG. 18 is a diagram showing settable items and settings that have been stored in a settable value storage unit;

FIG. 19 is a diagram showing default settings that have been stored in a default setting storage unit;

FIG. 25 is a diagram showing the status of quality properties in a case where settings of an automatic pallet have been changed from those for a word processor to those of a photographic film;

FIG. 26 is a diagram showing the status of color setting properties in a case where settings of an automatic pallet have been changed from those for a word processor to those of a photographic film;

FIG. 27 is a diagram showing the status of quality properties when media settings have been changed from those for high-gloss film to those of a coated paper;

FIG. 29 is a diagram illustrating a case where settings for method of paper feed have been changed to those for an automatic sheet feeder and settings of media type have been changed to those for coated paper;

FIG. 30 is a diagram illustrating a case where settings of media type have been changed to those for coated paper;

FIG. 34 is a diagram showing a printing dialog box;

FIG. 43 is a diagram showing a printing dialog box 2;

FIG. 50 is a diagram showing a printing dialog box in the eighth embodiment;

FIG. 51 is a diagram showing a cartridge menu when a color head has been installed;

FIG. 52 is a diagram showing a cartridge menu when a monochrome head has been installed;

FIG. 53 is a diagram showing a cartridge menu when a photographic grade printing head has been installed;

FIG. 61 is a memory map of a memory for storing a printing control program according to the present invention;

FIG. 62 is a memory map of a memory for storing a printing control program according to the present invention;

FIG. 63 is a memory map of a memory for storing a printing control program according to the present invention;

FIG. 64 is a diagram showing an example of conventional display; and

FIG. 65 is a diagram showing an example of conventional display.

DESCRIPTION OF THE PREFERRED EMBODIMENTS

First Embodiment

A printing system embodying the present invention will now be described in accordance with the accompanying drawings.

Figure 1:
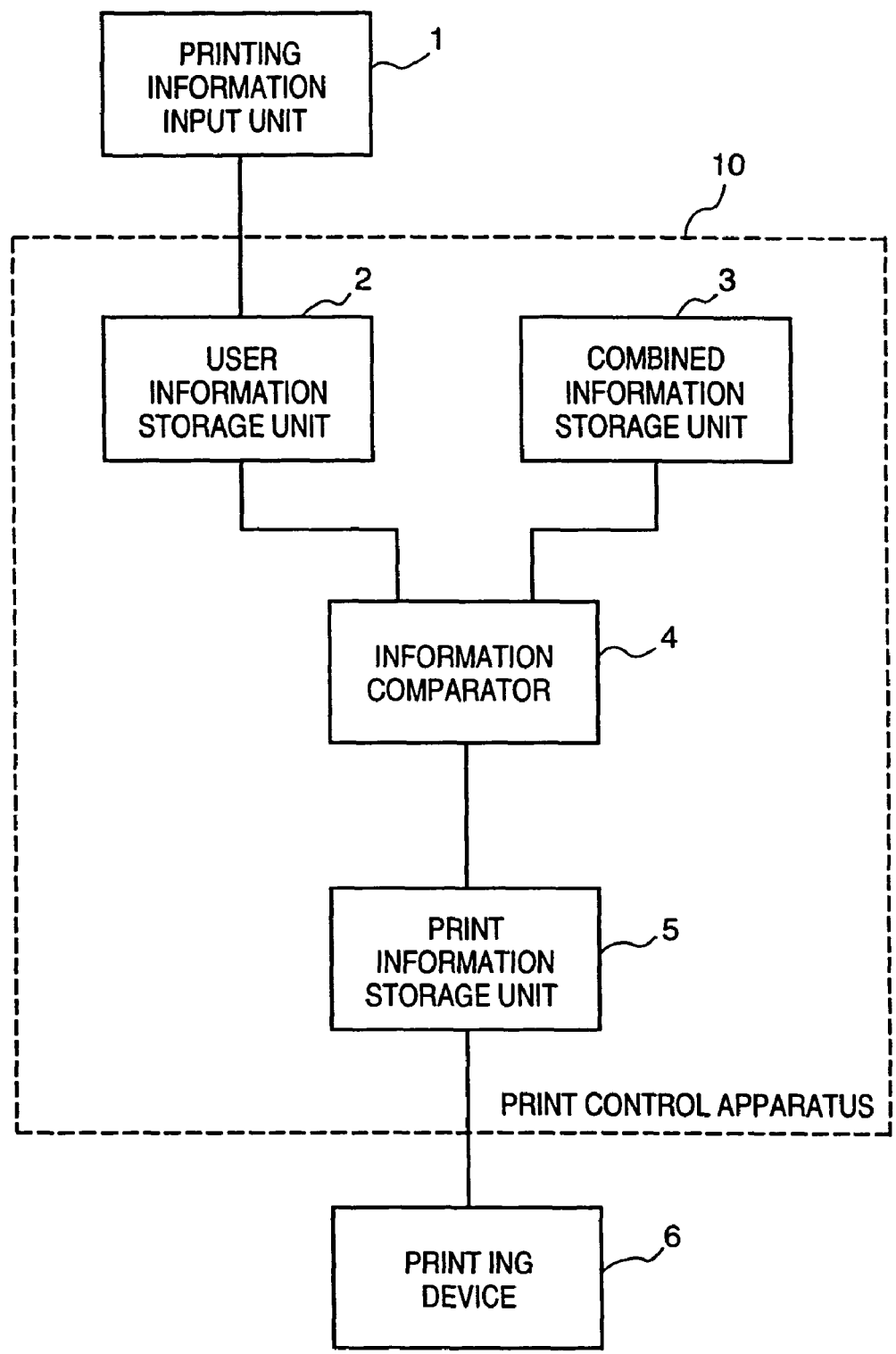
FIG. 1 is a block diagram showing the general configuration of a system comprising a printing control apparatus and a printing device embodying the present invention.

FIG. 1 is a block diagram which best represents the characterizing features of a printing system to which the present invention is applied and will be used to describe the printing system. The system includes a printing information input unit 1 by which the user selects or enters the minimum information necessary for printing. The user selects or enters the minimum printing information necessary for printing. Examples of such information are printing paper size, printing paper type, printing quality and whether printing is color or monochrome printing. To this end, the operator may be allowed to enter all of this information by character strings or it may be so arranged that candidates for selection are displayed beforehand in a menu format and the operator is allowed to select the desired data from the menu. For example, printing information is entered for color printing with size A4 as the paper size, coated paper as the paper type and high-quality printing as the printing quality. In a case where the items of information or number thereof necessary for printing have changed, it goes without saying that the items of information or number thereof selected or entered by the user must also be changed.

There are many cases in which this entry of printing information can be made from an application program which has a printing function and which is executed in a host computer that uses a printing device. In such case the printing information input unit 1 enters the various printing information via this application program.

The system further includes a user information storage unit 2 for storing the printing information selected or entered by the user at the printing information input unit 1. The printing information entered by the user is stored using a table of the kind shown in FIG. 2, by way of example. More specifically, the user information storage unit 2 stores the type of entered information and the content thereof. In a case where the items of information or number thereof selected or entered by user at the information input unit 1 have been changed, then the types of information or number thereof stored in the user information storage unit are also changed accordingly. For example, in a case where information concerning the paper feed method becomes necessary anew in order to perform optimum printing, it is so arranged that the user is capable of selecting, at the printing information unit 1, the paper feed method from the paper feed tray used or paper feed by manual insertion, whereby the selected paper feed method is stored in the user information storage unit 2. The content of the user information storage unit 2 in this case is as shown in FIG. 3.

That is, the paper feed method is added on as a stored item (as type of information), and the paper feed method designated by the operator is stored as the content of this item. In FIG. 3, the automatic sheet feeder has been designated as the paper feed method.

It can be so arranged that when printing information adequate to perform optimum printing has been obtained even without the user selecting printing quality, the user need not select printing quality at the printing information unit 1. The user information storage unit 2 in such case is as shown in FIG. 4. That is, printing quality is no longer an item and the operator need not designate this.

The system further includes a combined information storage unit 3. It may be so arranged that information obtained by combining all information selected or entered by the user at the printing information unit 1 is stored, and it may be so arranged that only a limited combination of information is stored to carry out optimum printing. Furthermore, there are instances where a function that cannot be selected or entered at the printing information unit 1 is capable of being used at the printing device. By making use of this function at the printing device, optimum printing can be carried out. In such case information obtained by combining information selected or entered by the user and information relating to the function may be stored. At such time a number or the like is assigned to the combination so that the combined information can be selected. The information stored in the combined information storage unit 3 is set by the operator who enters and stores the information from the printing information unit 1 in advance.

FIGS. 5, 6, 7 and 8 are diagrams illustrating specific examples of the content of the combined information storage unit 3. FIG. 5 is an example of a case where all combinations of the four items of paper size, paper type, printing quality and printing color have been stored in the storage unit 3. Though paper size is limited to A4, there are two candidates for each of the other three items. There are eight possible combinations in all. FIG. 6 is an example of a case where only specific combinations have been stored. These are combinations in which printing quality is decided in conformity with paper type. Low quality corresponds to plain paper and high quality corresponds to coated paper. In this case, information selected or entered by the user at the printing information unit 1 is such that printing quality is decided by designating the type of paper. As a result, items to be designated are only paper size, paper type and printing color. This makes it possible to reduce the burden upon the user.

FIG. 7 illustrates an example of the content of the combined information storage unit 3 in a case where a printing device 6 possesses functions that cannot be selected or entered by the user from the printing information unit 1. FIG. 7 illustrates an example of a case where the printing device is provided with functions, such as a smoothing function, which, by being used, make it possible to perform printing in optimum fashion. Here smoothing is not carried out in a case where low-quality printing, i.e., plain paper, has been designated; it is performed only when high-quality printing, namely coated paper, has been designated. In a case where the combined information storage unit 3 stores the information shown in FIG. 7, the information selected or entered at the printing information unit 1 is only paper size, paper type and printing color, thus making it possible to reduce the burden upon the user. It is not necessary to designate printing quality and smoothing. Furthermore, since the smoothing function not capable of being designated by the user is capable of being used, it is possible to perform ideal printing.

FIG. 8 shows an example of the combined information storage unit 3 in a case where the user must select or enter information on the paper feed method at the printing information unit 1. The structure of the combined information storage unit 3 is such that items stored and combinations can be changed in simple fashion depending upon a change in the content of information or the number of items of information necessary for printing. Examples of this structure are a table structure of the kind illustrated or a tree structure in which each item is a node and the values of the nodes are branches.

The system of FIG. 1 further includes a printing information comparator 4 for comparing information that has been stored in the user information storage unit 2 and information that has been stored in the combined information storage unit 3. The printing information comparator 4 recognizes a combination of printing information for which a match has been obtained as optimum printing information necessary for printing. For example, assume that information that has been stored in the user information storage unit 2 is as shown in FIG. 2 and that the content of the combined information storage unit 3 is as illustrated in FIG. 5. By comparing the contents of the storage units in this case, it is possible to recognize from FIG. 5 that the combination that matches the user's designations, namely A4 as the paper size, coated paper as the paper type, high quality as the printing quality and color as the printing color, is the combination of No. 5 in FIG. 5. Further, in a case where the content of the user information storage unit 2 is as shown in FIG. 4 and the content of the combined information storage unit 3 is as shown in FIG. 8, the combination of No. 6 can be recognized as the combination that matches the user's designations. A combination that thus matches the user's designations includes optimum values for the combination designated by the user with regard to functions that cannot be designated by the user. In other words, on the basis of the printing information entered by the user, an item that cannot be entered by the user is set automatically in the manner determined in advance.

The system further includes a printing information storage unit 5 for storing the optimum information combination necessary for printing recognized in the printing information comparator 4 and for sending this combination to the printing device 6. In accordance with the printing information sent, the printing device 6 prints out data such as an image or text to be printed.

Thus, the printing device 6 is capable of being supplied with optimum information necessary for printing on the basis of the minimum information necessary to carry out printing selected or entered by the user.

Figure 10:
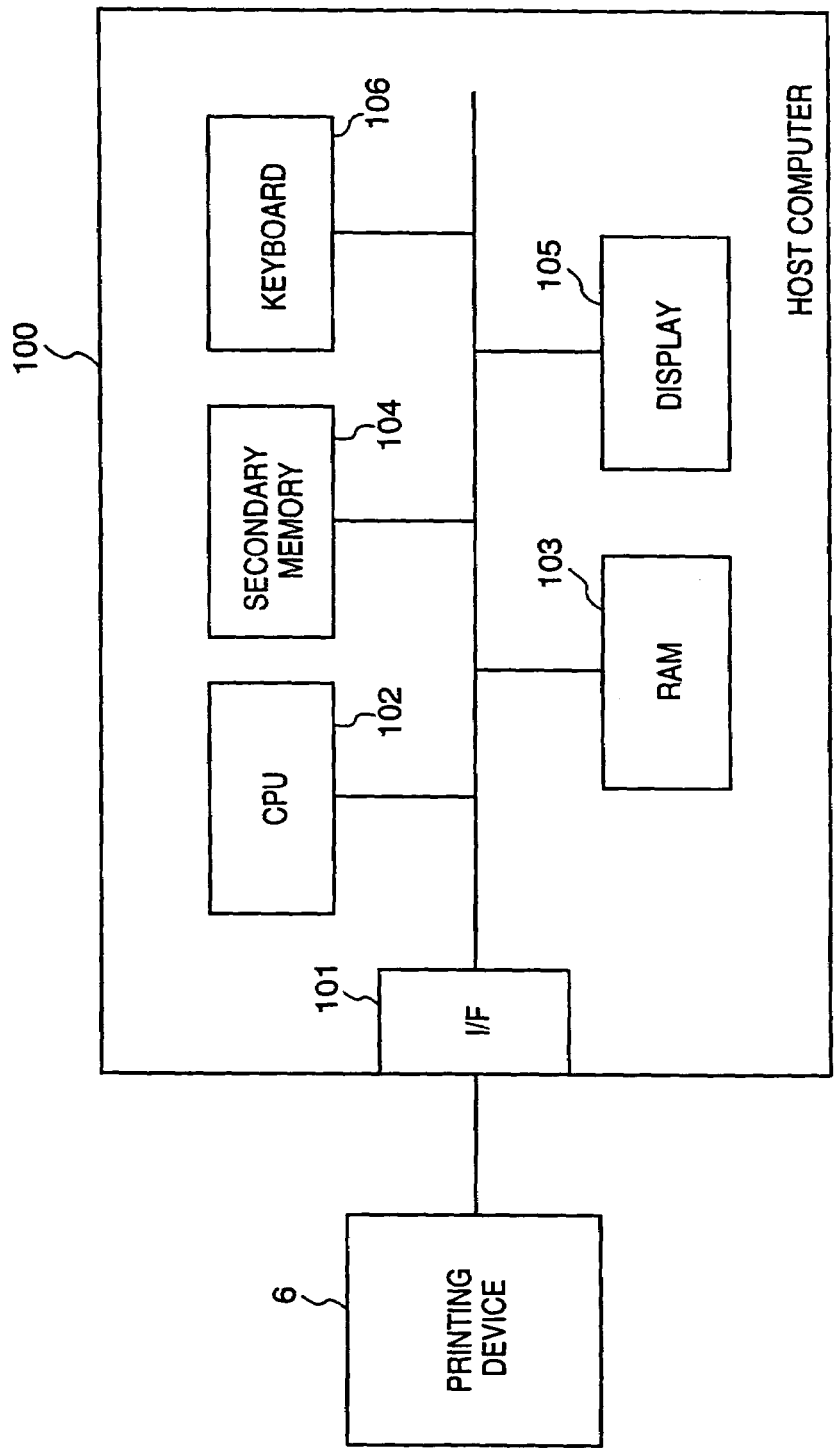
FIG. 10 is a block diagram of a printing system comprising a host computer and a printing device.

FIG. 10 illustrates an arrangement in which the printing system shown in FIG. 1 and comprising the printing information unit 1, printing control apparatus 10 and printing device 6 is implemented by a host computer 100 and the printing device 6. The printing information unit 1 and printing control apparatus 10 are realized by the hardware and software resources of the host computer 100.

As for the hardware resources, a CPU 102 controls the overall apparatus and executes the program of a procedure (described later) stored in a RAM 103, thereby implementing the functions of the printing control apparatus of FIG. 1. Furthermore, the CPU 102 executes the above-mentioned application program to allow the user to enter printing information. In addition to programs, the RAM 103 stores the information of the kind shown in FIGS. 2 through 4, namely the user printing information, combined printing information predetermined based upon the user printing information and the functions of the printing device 6, and printing information, which is to be sent to the printing device 6, obtained by comparing the user printing information and combined printing information. A secondary memory 104 stores a program and data used upon being loaded in the RAM 103. The program and data to be stored in the RAM 103 are stored in the secondary memory 104 in advance and can be loaded from the memory 104 to the RAM 103. A display 105 and a keyboard 106 are used when the user enters printing information. The apparatus is equipped not only with a keyboard but also with a pointing device so that desired items can be designated on a menu displayed on the display 105.

Figure 9:
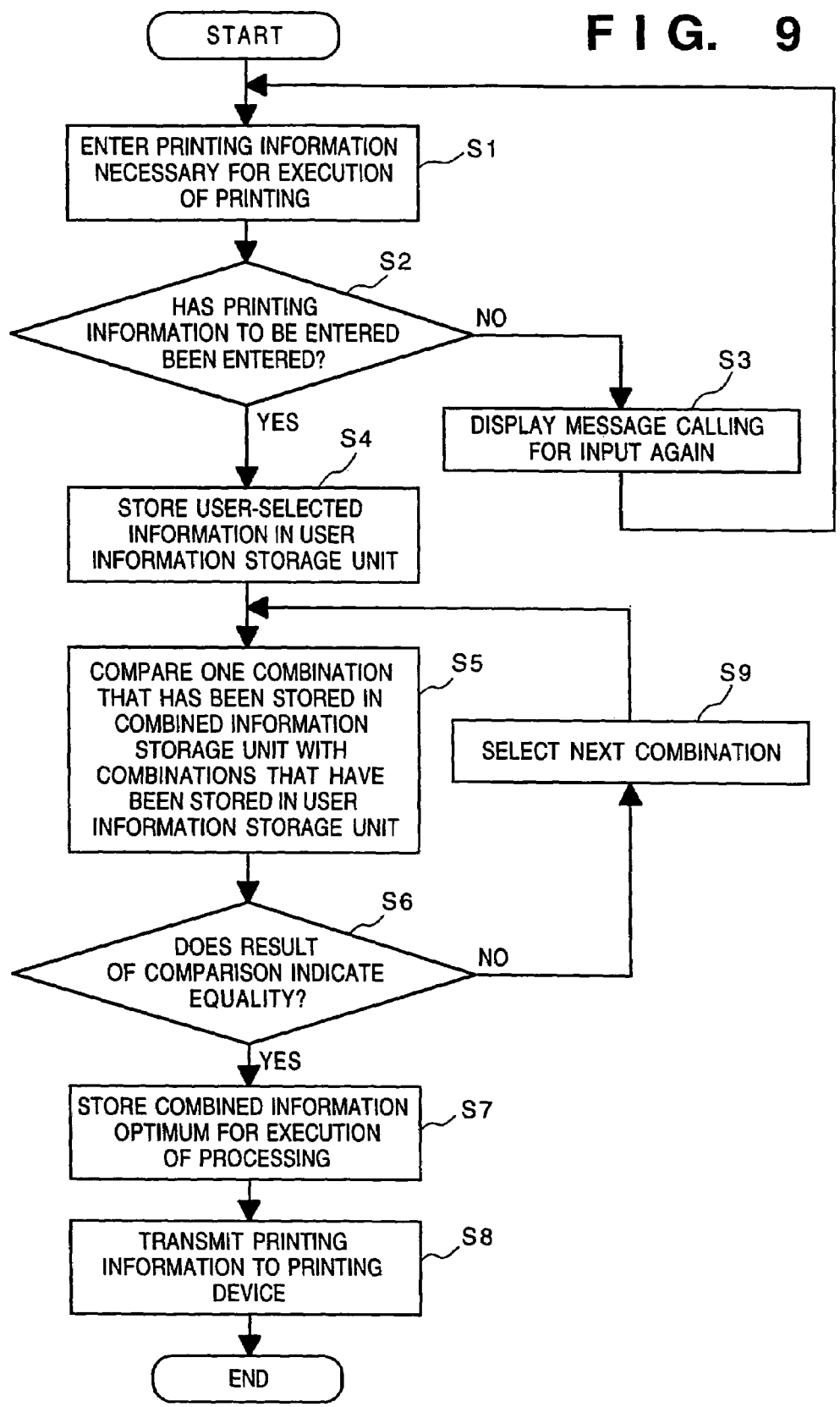
FIG. 9 is a flowchart illustrating a procedure for deciding optimum printing information.

In order to implement the functions of the printing control apparatus 10, the program of a procedure shown in FIG. 9 is executed by the CPU 102 of the host computer 100 configured as described above. The procedure of FIG. 9 has already been described with reference to FIG. 1, but will now be described again with reference to FIG. 9.

First, the operator is allowed to enter the printing information necessary to execute printing (step S1). It is determined whether the entered information is the information that should be entered, i.e., whether all of the printing information capable of being entered or selected by the user has been set (step S2). If the answer is "NO", a message calling for entry to be performed again is displayed in order to allow entry of the insufficient information (step S3). The program then returns to step S1.

If entry of the information that is to be set by the user is finished, then these items of information are stored in the user information storage section of RAM 103 in the format of FIGS. 2 through 4 (step S4).

Next, the user information is compared with a candidate from the combined information that has been stored beforehand in the combined information storage section of the RAM 103 (step S5). If the compared items of information do not match, then the next combination candidate is selected from the combined information storage section (step S9) and the comparison operation is repeated. If matching is achieved, this combination is stored in the RAM 103 as printing information transmitted to the printing device (step S7) and the combination is sent to the printing device (step S8).

If printing data to be printed are subsequently sent to the printing device, then the printing device performs a printout in accordance with the printing information previously sent to the printing device.

Thus, the printing control apparatus is capable of setting printing information, which is to be sent to the printing device, by exploiting the functions of the printing device based upon the information set by the user. Further, even if the items of printing information set by the user are fixed items, functions peculiar to the printing device are optimized in dependence upon the user's setting, thereby making it possible to set printing information so as to accommodate printing devices having different functions.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing the program codes of the software for performing the aforesaid functions of the foregoing embodiment to a system or an apparatus, reading the program codes with a computer (e.g., a CPU or MPU) of the system or apparatus from the storage medium, and then executing the program.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system (OS) or the like working on the computer performs a part of or the entire process in accordance with the designation of program codes and implements the functions according to the embodiment.

Furthermore, the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiments.

Figure 11:
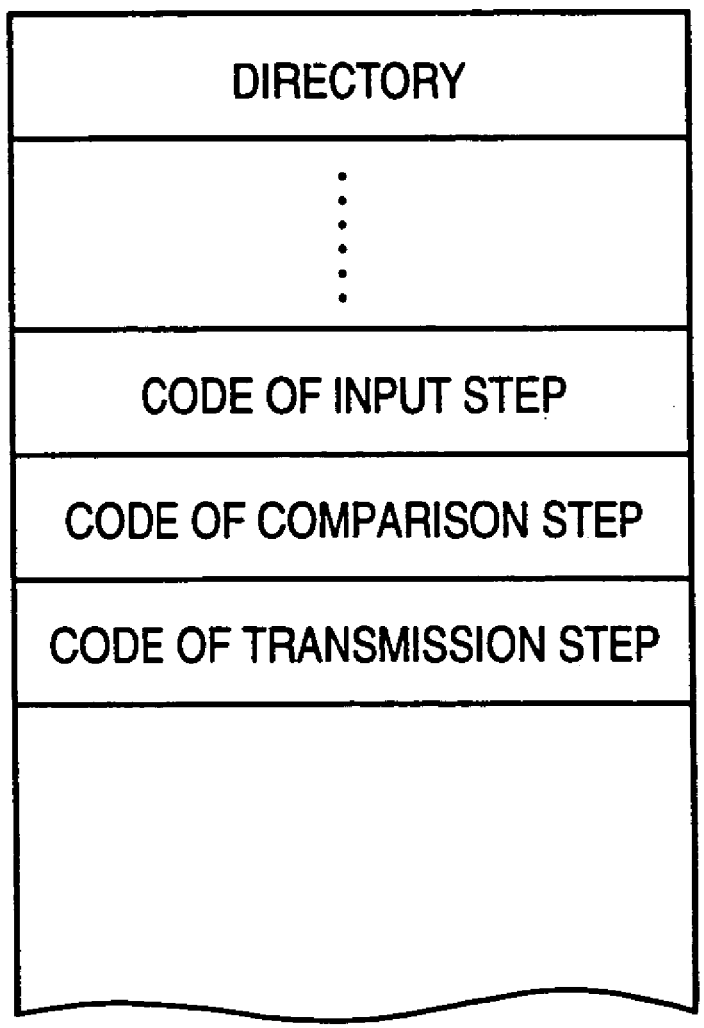
FIG. 11 is a diagram showing a memory map which prevails when the program of the flowchart of FIG. 9 is stored.

In a case where the present invention is applied to the above-mentioned storage medium, program codes corresponding to the flowchart described earlier are stored on this storage medium. More specifically, modules illustrating an example of the memory map of FIG. 11 are stored on the storage medium.

Specifically, it will suffice to store program codes of at least a module of an input step of entering control information, a module of a comparison step of storing, in addition to a combination of information capable of being entered, control information candidates which include items not entered but capable of being set on the printing device, and comparing this information with the entered control information, and a module of a transmission step of transmitting control information to the printing device in dependence upon the results of comparison. These program codes are stored on the storage medium.

Second Embodiment

A second embodiment of the invention will now be described in detail with reference to the drawings.

FIG. 12, which illustrates the second embodiment of the invention, shows a printing information supply apparatus 200 for supplying printing information to a printing device 100.

The printing information supply apparatus 200 includes a setting unit 201 for selecting one setting with regard to each settable item in a menu displayed on a display unit 211, and a set information storage unit 204 for storing information on settable items and settings of a menu to be displayed. The settable items and settings stored in the set information storage unit 204 are illustrated in Table 1.

TABLE 1

| SETTABLE ITEM | SETTING |
| --- | --- |
| MEDIA TYPE | PLAIN PAPER |
|  | COATED PAPER |
|  | OHP PAPER |
| PAPER SIZE | A4 |
|  | A5 |
|  | B4 |
|  | B5 |
|  | POSTCARD |
| PRINTING COLOR | COLOR PRINTING |
|  | MONOCHROME PRINTING |

TABLE 1-continued

| SETTABLE ITEM | SETTING |
| --- | --- |
| PRINTING QUALITY | HIGH-QUALITY PRINTING |
| | INTERMEDIATE-QUALITY PRINTING |
| | LOW-QUALITY PRINTING |
| PAPER FEED METHOD | AUTOMATIC SHEET FEEDER |
| | MANUAL INSERTION |

A setting information notification unit 203 extracts the settable items of the menu to be displayed and the information representing the settings from the set information storage unit 204. A default information storage unit 206 is for storing a default setting with regard to each settable item to be displayed. Settings that almost never need to be selected by ordinary users are employed as the default settings stored in the default information storage unit 206. Examples of default settings are illustrated in Table 2.

TABLE 2

| SETTABLE ITEM | DEFAULT SETTING |
| --- | --- |
| MEDIA TYPE | PLAIN PAPER |
| PAPER SIZE | A4 |
| PRINTING COLOR | COLOR PRINTING |
| PRINTING QUALITY | HIGH-QUALITY PRINTING |
| PAPER FEED METHOD | AUTOMATIC SHEET FEEDER |

A default setting notification unit 205 is for extracting a default setting with regard to each settable item of the menu from the default information storage unit 206. A setting change information storage unit 208 stores a list of settings in which correlation between settable items is established in advance. A setting change information notification unit 207 extracts a list related to changed settings from the setting change information storage unit 208. A printing information selection unit 202 causes the display unit 211 to display the settable items and settings extracted by the setting information notification unit 203 and default information notification unit 205, respectively, to display the default settings in emphasized form. The printing information selection unit 202 stores the latest settings in a storage area and, if the settings of the list from the setting change information notification unit 207 differ from the settings in this storage area, causes the settings of the list to be displayed in highlighted form. In a case where settings displayed in highlighted form have been decided upon, the printing information selection unit 202 stores the settings that have been decided in a user selection information storage unit 209. A user selection information notification unit 210 sends information that has been stored in the user selection information storage unit 209 to the printing device 100.

In operation, the printing information selection unit 202 sends the setting information notification unit 203 a setting information request instruction 221 when printing is requested by the user. Upon receiving the instruction 221, the setting information notification unit 203 sends the set information storage unit 204 a setting information request instruction 222, whereby all items of setting information 223, namely all settable items shown in Table 1 and all settings regarding each of the settable items, are extracted from the set information storage unit 204 and the extracted setting information 224 is communicated to the printing information selection unit 202. Upon receiving this information, the printing information selection unit 202 displays all settable items and all settings regarding these settable items on the display unit 11.

The printing information selection unit 202 sends a default information request instruction 225 to the default information notification unit 205. Upon receiving the instruction 225, the default information notification unit 205 sends the default information storage unit 206 a default information request instruction 226, whereby items of default information 227, namely the default settings regarding the settable items, are extracted from the default information storage unit 206 and the extracted default information 228 is communicated to the printing information selection unit 202. The default settings so communicated are "Plain Paper" for the settable item "Media Type", "A4" for the settable item "Paper Size", "Color Printing" for the settable item "Printing Color", "High-quality Printing" for the settable item "Printing Quality", and "Automatic Sheet Feeder" for the settable item "Paper Feed Method". The printing information selection unit 202 stores the default settings in the storage area as the latest settings and causes these settings to be displayed on the display unit 211 in emphasized form. FIG. 13 illustrates an example of the menu displayed on the display unit 211.

When the user operates the setting unit 201 and presses a "Select" screen key shown in FIG. 13 under these conditions, the default settings are stored in the user selection information storage unit 209 by the printing information selection unit 202. The settings in the user selection information storage unit 209 are communicated to the printing device 100 by the user selection information notification unit 210 and printing is performed by the printing device 100 in accordance with these default settings.

However, the user may not always execute printing using the default settings and may wish to change the settings. If the user operates the setting unit 201 to change a setting, e.g., to change the setting of the item "Media Type" to from "Plain Paper" to "OHP Paper" (at which time the setting "OHP Paper" will be displayed in highlighted form), the printing information selection unit 202 sends a setting change information request instruction 229 to the setting change information notification unit 207. Table 3 illustrates settable items and settings for which a change has been included in the setting change information request instruction 229.

TABLE 3

| SETTABLE ITEM | SETTING AFTER CHANGE |
| --- | --- |
| MEDIA TYPE | OHP PAPER |

Upon receiving the instruction 229, the setting change information notification unit 207 sends the setting change information storage unit 208 a setting change information request instruction 230 so that a list containing the changed setting is extracted from the setting change information storage unit 208. The content of the list extracted is shown in Table 4.

TABLE 4

| SETTABLE ITEM | DEFAULT SETTING |
| --- | --- |
| MEDIA TYPE | OHP PAPER |
| PAPER SIZE | A4 |
| PRINTING COLOR | COLOR PRINTING |
| PRINTING QUALITY | HIGH-QUALITY PRINTING |
| PAPER FEED METHOD | MANUAL INSERTION |

When this list is communicated to the printing information selection unit 202 by the setting change information notification unit 207, the printing information selection unit 202 responds by comparing the list with latest settings that have been stored in the storage area of the printing information selection unit 202 and, if there is a setting that is different, by changing the setting of this settable item to the setting in the list. Since the default settings will have been stored in the storage area, the default settings of Table 2 and the settings in the list of Table 4 are compared. The result of the comparison will be that the setting of the item "Paper Feed Method" is "Automatic Sheet Feeder" in one and "Manual Insertion" in the other. Accordingly, the setting for which the change has been made is "Automatic Sheet Feeder." This example is shown in Table 5.

TABLE 5

| SETTABLE ITEM | SETTING AFTER CHANGE |
|---|---|
| PAPER FEED METHOD | AUTOMATIC SHEET FEEDER |

Accordingly, the setting "Manual Insertion", which is the setting in the list, is set and highlighted instead of the setting "Automatic Sheet Feeder." An example of the display in this case is as shown in FIG. 14.

When the user operates the setting unit 201 and presses a "Cancel" screen key shown in FIG. 14 under these conditions, the setting is not finalized and the default setting is left as the setting. In addition, the menu screen vanishes. If the "Select" screen key is pressed, on the other hand, the content of the storage area of printing information selection unit 202 is updated to the settings in the list and the currently prevailing settings are stored in the user selection information storage unit 209 by the printing information selection unit 202. The settings that have been stored in the user selection information storage unit 209 are communicated to the printing device 100 by the user selection information notification unit 210 and printing is performed by the printing device 100 in accordance with these settings.

In the example described above, a correlated value is stored in the setting change information storage unit 208 beforehand with regard to the media type "OHP Paper" in the manner shown in Table 4. However, correlations may be performed solely with regard to some of the settable items. For example, if the setting of "Media Type" is "OHP Paper", then "A4" would be correlated with "Paper Size" and "Manual Insertion" with "Paper Feed Method." Nothing is stored for the other settable items. Accordingly, the settable items for which there are correlations, namely paper size and paper feed method, are read out of the setting change information storage unit 208. The printing information selection unit 202 employs and highlights these settings instead of those selected thus far and adopts the previous settings for the other items.

Figure 15:
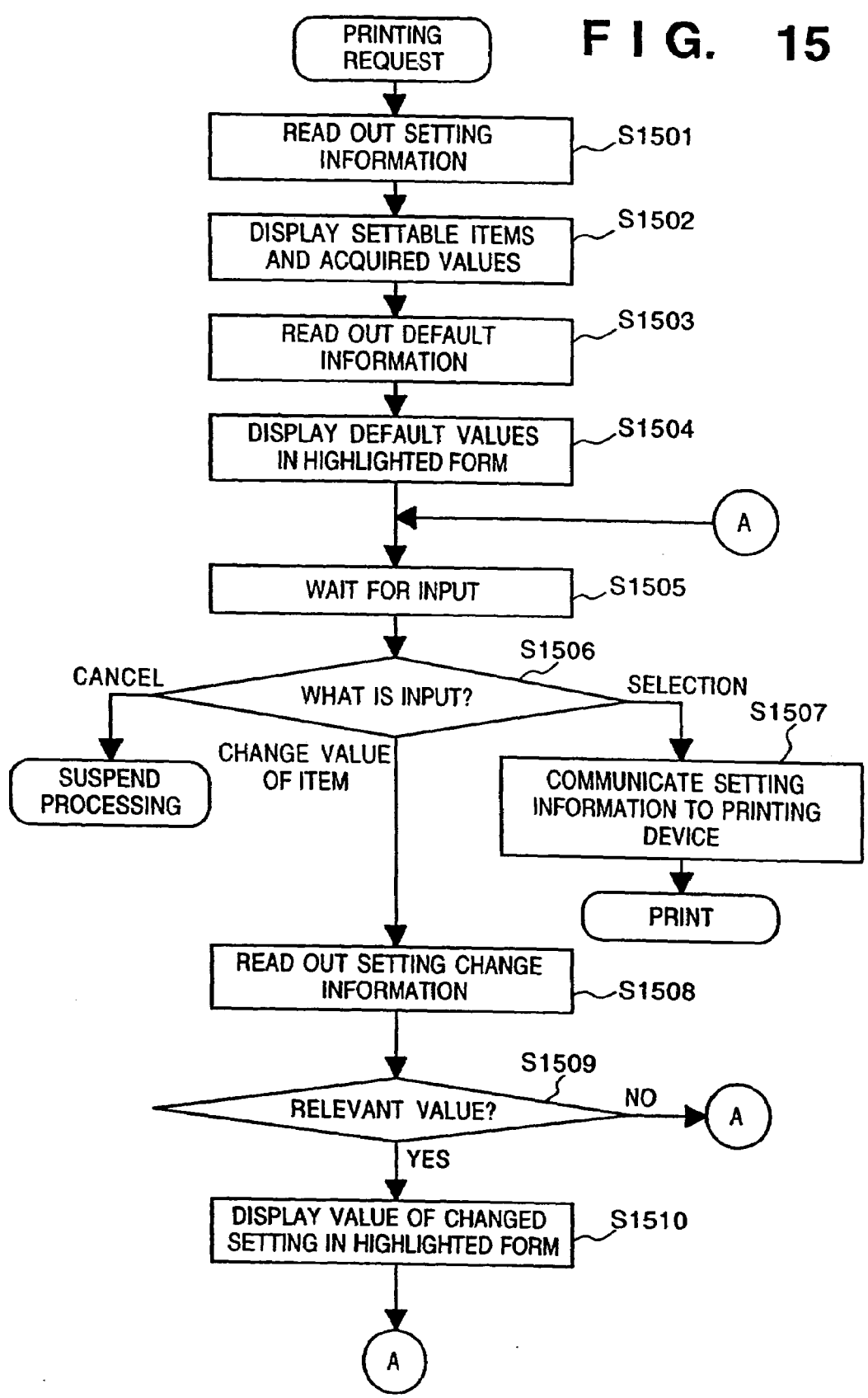
FIG. 15 is a flowchart illustrating a control procedure according to the second embodiment.

FIG. 15 is a flowchart showing the operation of the printing information supply apparatus according to this embodiment. FIG. 15 illustrates the procedure of the program executed by the CPU 102 when the arrangement of FIG. 12 is implemented by the computer having the architecture shown in FIG. 10.

When this program is executed, settable items and settable values of the kind shown in Table 1 and default settings of the kind shown in Table 2 will have already been stored in the secondary memory 104 or RAM 103. Further, if, in a case where a certain item has been set to a specific value, there are items that are restricted by this value and are capable of taking on only specific values, default settings of these items in which the values of the items serve as indices will have been stored in the memory 104 or RAM 103. At readout these default settings are read out in the format of Table 4.

The processing indicated by the flowchart of FIG. 15 starts when a printing request is issued to the printing information supply apparatus 200.

First, the setting information of the kind shown in Table 1 is read out of the secondary memory 104 at step S1501 in FIG. 15, then the items capable of being set and the values which these items can take on are displayed at step S1502. This is followed by reading out the default information of Table 2 (step 51503), storing the default values in the RAIVI 103 as the current settings and displaying these values in highlighted form in the manner shown in FIG. 13 (step S1504). If the default settings have been displayed in this fashion, the system waits for an input from the operator (step S1505).

If the operator makes an input, the CPU 102 determines what kind of input this is (step S1506). If the cancel button is pressed, printing processing remains suspended. If the select button is pressed, the CPU judges that the highlighted settings of the selection items have been selected and sends the current settings to the printing device (step S1507). The printing device thenceforth receives printing data and executes printing.

If the input is a change in the setting of a selectable item, then the setting is changed. To change the setting, the operator performs a setting operation by moving a mouse cursor to the desired setting and clicking the mouse button. When values are changed, first new default settings are read out with the set items and values thereof serving as indices (step S1508). In a case where there is no default value for an index, the system waits for an input without changing the display or current settings. If a default setting for an index exists, this value is read out and stored again as the current setting and the display is changed in such a manner that the updated setting is displayed in highlighted form. The system then waits for an input.

Thus, in a case where a certain item is set to a specific value, the operator need not be aware of the relationship even if there are items that are restricted by this value and are capable of taking on only specific values. The relationship is stored in the printing information supply apparatus 200 and the settings can be selected in accordance with the particular restriction without the special consideration being required on the part of the operator.

Thus, in accordance with the present invention as described above, the user is capable of executing optimum printing by making the minimum number of settings. If the content of information or the number of items thereof are changed by the user, or if the content of information or the number of items thereof supplied to the printing device are changed, this can be dealt with merely by changing the combination of information in advance.

Further, since it is so arranged that default settings are made, the user need not makes settings related to printing information when ordinary printing is carried out. This reduces the burden upon the user.

If any setting has been changed by the user, the settings of other settable items also are revised to optimum settings that have been predetermined. This reduces the number of settings that the user must make.

Third Embodiment

Figure 16:
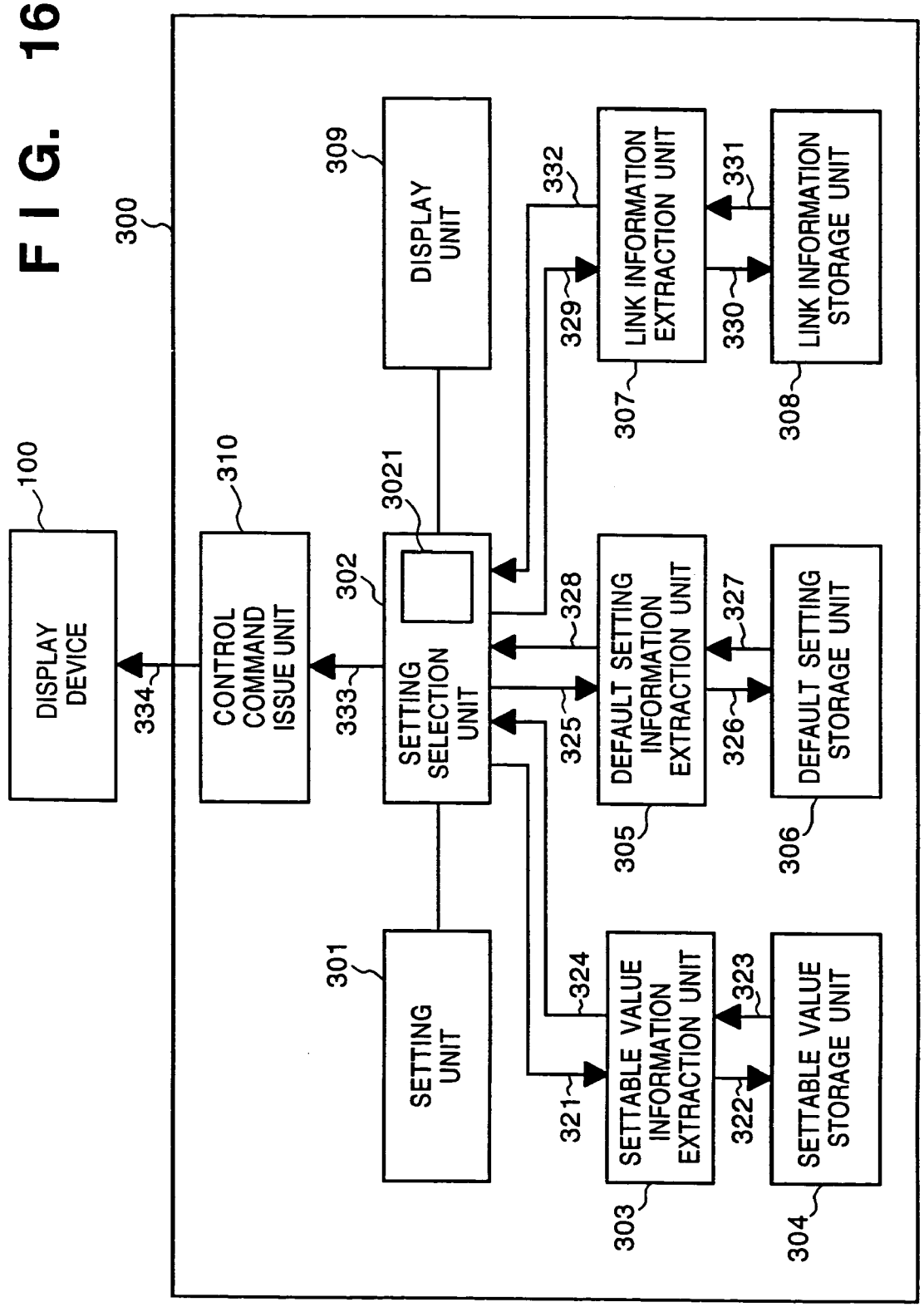
FIG. 16 is a block diagram illustrating a printing control apparatus embodying the present invention.

FIG. 16 is a block diagram which best represents the characterizing features of a printing system to which the present invention is applied and will be used to describe the printing system.

As shown in FIG. 16, the system includes a printing control apparatus 300 for supplying the printing device 100 with printing control information and printing data and for controlling printing by the printing device. The printing control apparatus 300 is implemented by having a computer 110 in FIG. 17 execute the driver program of the printing device, inclusive of an operating system, as will be described later.

The printing control apparatus 300 includes a setting unit 301 for selecting one setting with regard to each settable item in a menu displayed on a display unit 309. The selection of the setting is performed by entry of a value from a keyboard or by selection on a menu made by a pointing device. A settable value storage unit 304 is for setting, as settable values, information representing all combinations of settable items representing the various functions possessed by the printing device 100 and the settings representing the details of these items. More specifically, the settable value storage unit 304 stores settable items and values for every type of printing device. FIG. 18 illustrates the settable items and settings stored in the settable value storage unit 304. A settable value information extraction unit 303 extracts the settable items of the menu to be displayed and the information representing the settings from the settable value storage unit 304.

A default information storage unit 306 is for storing a default setting with regard to each settable item to be displayed. Settings that almost never need to be changed by ordinary users and message information settings relating to printing are employed as the default settings stored in the default setting storage unit 306. Examples of default settings are illustrated in FIG. 19. A default setting information extraction unit 305 extracts a default setting with regard to each settable item from the default setting storage unit 306.

A link information storage unit 308 stores a list of settings in which correlations between the settable items of the menu are established in advance. A link information extraction unit 307 extracts a list related to changed settings from the link information storage unit 308. A setting selection unit 302 stores the latest settings in a storage area 3021 and, if the settings of the list from the link information extraction unit 307 differ from the settings in the storage area 3021, causes the settings of the list to be displayed on the display unit 309. In a case where settings displayed on the display unit 309 have been decided upon, the setting selection unit 302 sends these finalized settings to a control command issuance unit 310 so that this information will be sent to the printing device 100.

It should be noted that the link information includes settable items and settings capable of being set by the setting selection unit 302, as well as non-settable items and settings that cannot be set by the setting selection unit 302. The link information storage unit 308 combines settings that are capable of being set with regard to settable items and stores link information candidates consisting of desired values set as non-settable items for every settable item combined.

<Operation of Printing Control Apparatus>

The operation of the apparatus shown in FIG. 16 will now be described. The setting selection unit 302 sends the settable value information extraction unit 303 a settable value information request instruction 321 when printing is requested of the printing control apparatus 300 by the user. Upon receiving the request 321, the settable value information extraction unit 303 sends the settable value storage unit 304 a settable value information request instruction 322. In response to the instruction 322, all items of settable value information 323, namely all settable items shown in FIG. 18 and all settings regarding each of the settable items, are extracted from the settable value storage unit 304. The settable value information extraction unit 303 communicates the extracted settable value information 324 to the setting selection unit 302. Upon receiving this information, the setting selection unit 302 stores all of the settable value information in the storage area 3021 and causes the display unit 309 to display, whenever necessary, all settable items and all settings for these settable items.

The setting selection unit 302 sends the default setting information extraction unit 305 a default setting information request instruction 325. Upon receiving the instruction 325, the default setting information extraction unit 305 sends default setting information 326 to the default setting storage unit 306. As a result, default settings 327, namely default settings corresponding to the settable items are extracted from the default setting storage unit 306. The default setting information extraction unit 305 communicates the extracted default setting information 328 to the setting selection unit 302. As shown in FIG. 19, the communicated default setting information possesses a unique setting for each settable item. The setting selection unit 302 stores the default setting information in the storage area 3021 as the latest settings and causes the display unit 309 to display these settings.

If the user designates execution of printing under these conditions, setting information representing each setting is sent to the control command issuance unit 310 by the setting selection unit 302 and printing is performed by the printing device 100 in accordance with a printing control command 334 issued by the control command issuance unit 310.

However, the user may not always execute printing using the default settings and may wish to change the settings. If the user operates the setting unit 301 to change the setting of a certain item, the setting selection unit 302 sends a link information request instruction 329 to the link information extraction unit 307. The link information request instruction 329 includes the settable item that has been changed and setting information after the change. Upon receiving the link information request instruction 329, the link information extraction unit 307 sends the link information storage unit 308 a link information request instruction 330, to which the link information storage unit 308 responds by extracting link information 331, which includes the changed setting, from the link information storage unit 308. When this link information is communicated to the setting selection unit 302 by the link information extraction unit 307, the setting selection unit 302 compares this information and the latest setting that has been stored in the storage area 3021. If the result of the comparison is that there is a settable item for which the two settings are different, the operator is allowed to select either of the settings of this item to effect a change to the selected setting and store the setting in the storage area 3021. The latest setting is displayed on the display unit 309.

Whenever the user changes a setting, the exchange of the above-mentioned information is performed, the user designates execution of printing and the setting information representing each setting is sent to the control command issuance unit 310, whereby the exchange of information is terminated.

<Setting of Printer Driver in Computer System>

Figure 32:
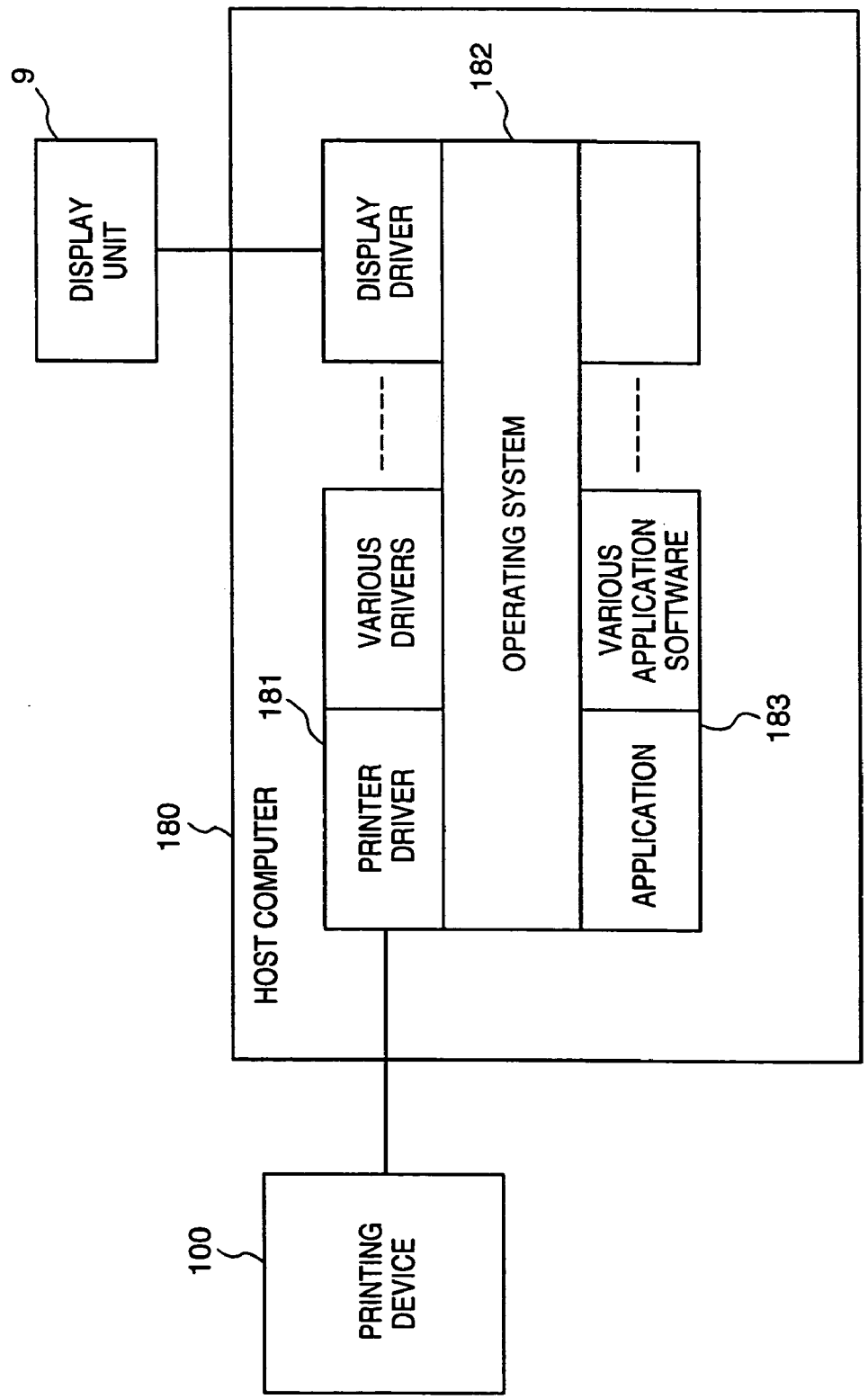
FIG. 32 is a diagram showing the software configuration of a system according to a third embodiment of the invention.

The present invention will now be described with regard to a specific embodiment. In the example set forth below, a printer driver in a computer system having the program constitution shown in FIG. 32 is imagined as the printing control apparatus 300. This printer driver corresponds to the printing control apparatus 300 in FIG. 16. As shown in FIG. 32, software/hardware resources of a host computer 180 are managed by an operating system 182. An application program 183 utilizes various peripheral drivers and managers via the operating system 182. These driver programs include a printer driver 181 for controlling the printing device 100 and a display driver for controlling the display unit 309.

In a case where the user creates data using application software (e.g., word processing software) 183 and executes printing by the printer in the system of FIG. 32, the user designates execution of printing via an input unit such as a keyboard or mouse. The signal representing this designation is sent from the application software 183 to the operating system 182, which initiates start-up of the printer driver 181. The operation of the printer driver at this time is as already described in connection with FIG. 16.

Specifically, in the printer driver 181, the setting selection unit 302 sends the settable value information extraction unit 303 the settable value information request instruction 321, the series of information exchanges described above is carried out and the setting selection unit 302 receives the settable value information 324 from the settable value information extraction unit 303. The settable value information 324 is stored temporarily in the storage area 3021, which is provided on a recording medium such as a RAM (random-access memory) or HD (hard disk). Next, the setting selection unit 302 sends the default setting information extraction unit 305 the default setting information request instruction 325, the series of information exchanges described above is carried out and the setting selection unit 302 receives the default setting information 327 from the default setting information extraction unit 305. The default setting information 327 is stored temporarily in the storage area 3021 and is displayed on the display unit 309 that is connected to the host computer. At this time the items for which defaults have been set are made distinguishable as by highlighting them. Further, settings made by the user are implemented by the setting unit 301, which includes the keyboard and pointing device.

FIGS. 20 through 23 show windows illustrating various settings regarding the printer driver according to this invention when a user employing Microsoft's operating system "Windows 95" designates printing from the application software.

Figure 20:
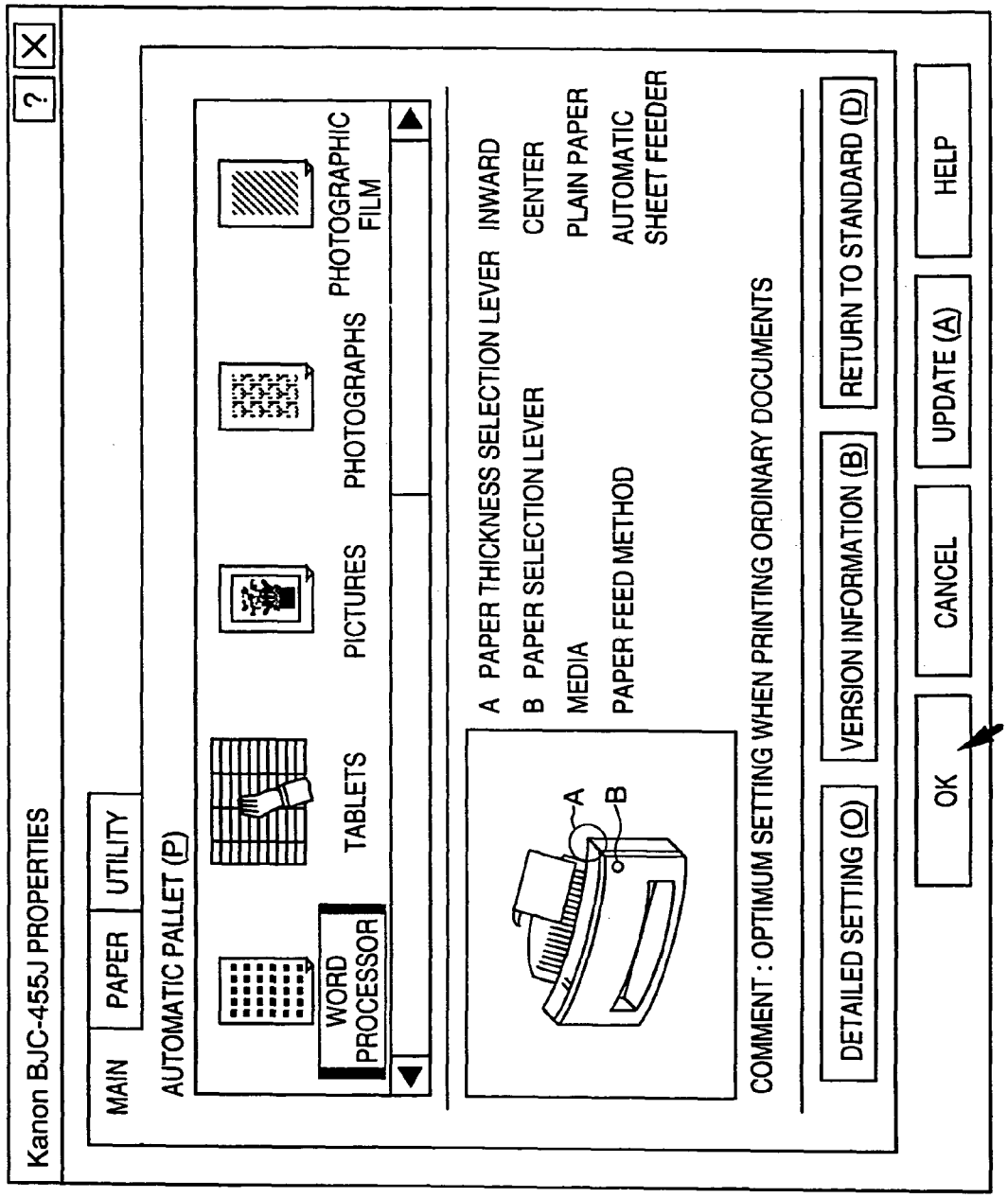
FIG. 20 is a diagram showing a specific example of main properties based upon default settings.

FIG. 20 shows a window referred to as a "main property" window. The user is capable of employing this window to set an "Automatic Pallet" section through which the operator may select a printing method that is suited to the user's own application software. Furthermore, the window illustrates messages regarding positions to which "Paper Thickness Selection Lever" and "Paper Thickness Lever" are to be moved in dependent upon thickness of the printing paper and settings of "Media Type" and "Paper Feed Method." The default settings for each of the items are as follows: "Word Processor" is selected on the automatic pallet, "Inward" for "Paper Thickness Selection Lever", "Center" for "Paper Thickness Lever", "Plain Paper" for "Media" and "Automatic Sheet Feeder" for "Paper Feed Method." These are displayed on the display unit.

Figure 21:
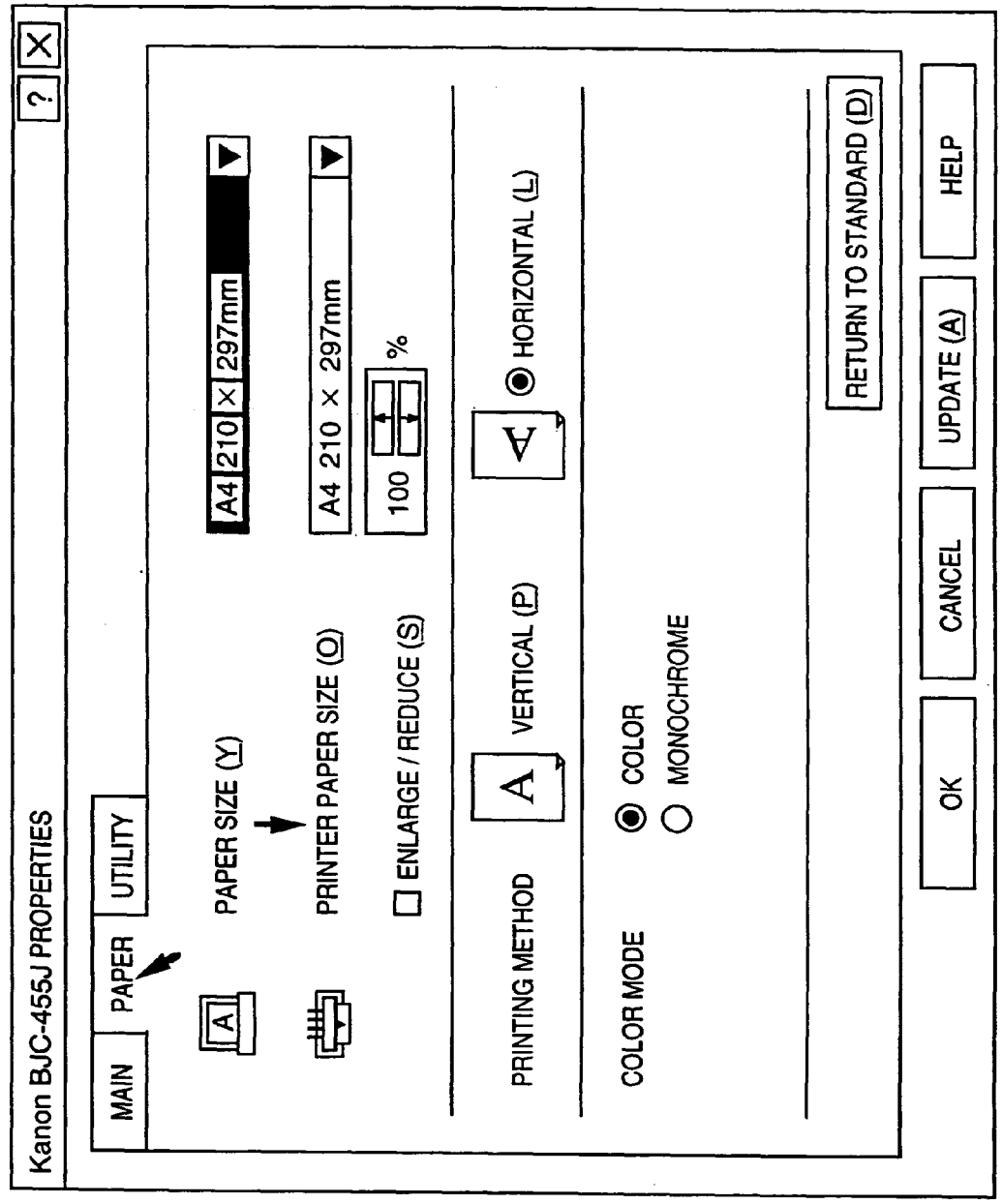
FIG. 21 is a diagram showing a specific example of paper properties based upon default settings.

FIG. 21 shows a window referred to as a "paper property" window. This window makes it possible for the user to set a "Paper Size" field, which indicates the size of the paper that has been designated in the application program, an "Enlarge/Reduce" check box indicating whether an image is to be enlarged or reduced in a case where the size specified in the "Paper Size" field differs from the size of the paper actually loaded in the printer, a "Printing Direction" field for designating the direction of printing, and a "Color Mode" field for designating printing color. The default settings for these settable items are "A4" for "Paper Size", "OFF" for "Enlarge/Reduce", "Vertical" for "Printing Direction" and "Color" for "Color Mode". These are displayed on the display unit.

Figure 22:
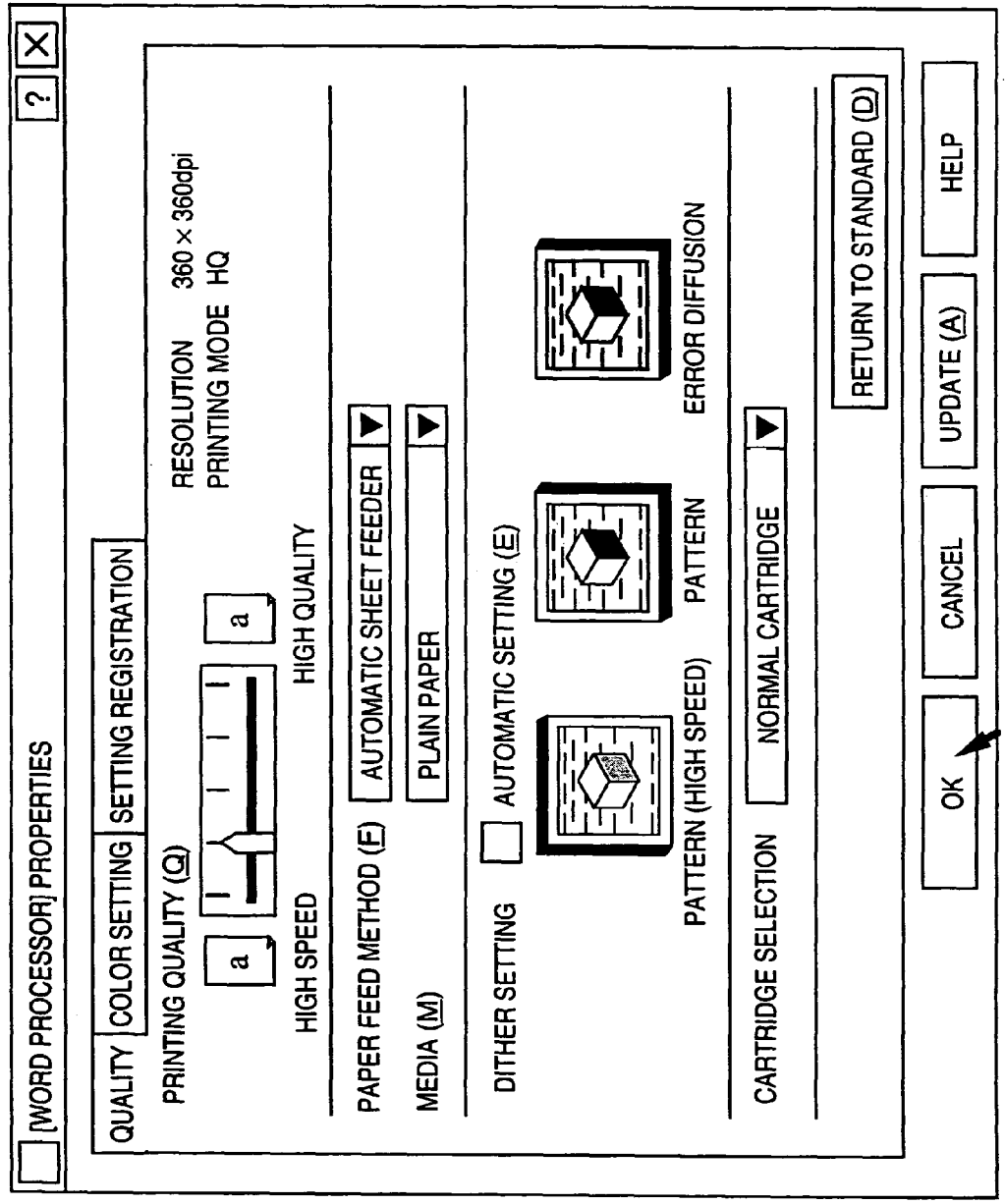
FIG. 22 is a diagram showing a specific example of quality properties based upon default settings.

FIG. 22 shows a window referred to as a "quality property" window that opens when a "Detailed Setting" button (FIG. 20) is pressed. This window makes it possible for the user to set a "Printing Quality" slide bar which designates the quality of printing, "Resolution" & "Printing Mode" messages indicating the states of resolution and printing mode in the particular set state of the "Printing Quality" slide bar, a "Paper Feed Method" field for designating the method of paper feed, a "Media" field for designating the printing medium, and a "Dither Setting" field for designating dither processing. The default settings for these settable items are the second graduation from the left for "Printing Quality", the messages "360× 360 dpi" and "HQ" for "Resolution" and "Printing Mode", respectively, "Automatic Sheet Feeder" for "Paper Feed Method", "Plain Paper" for "Media" and "Pattern (High Speed)" for "Dither Setting." These are displayed on the display unit.

Figure 23:
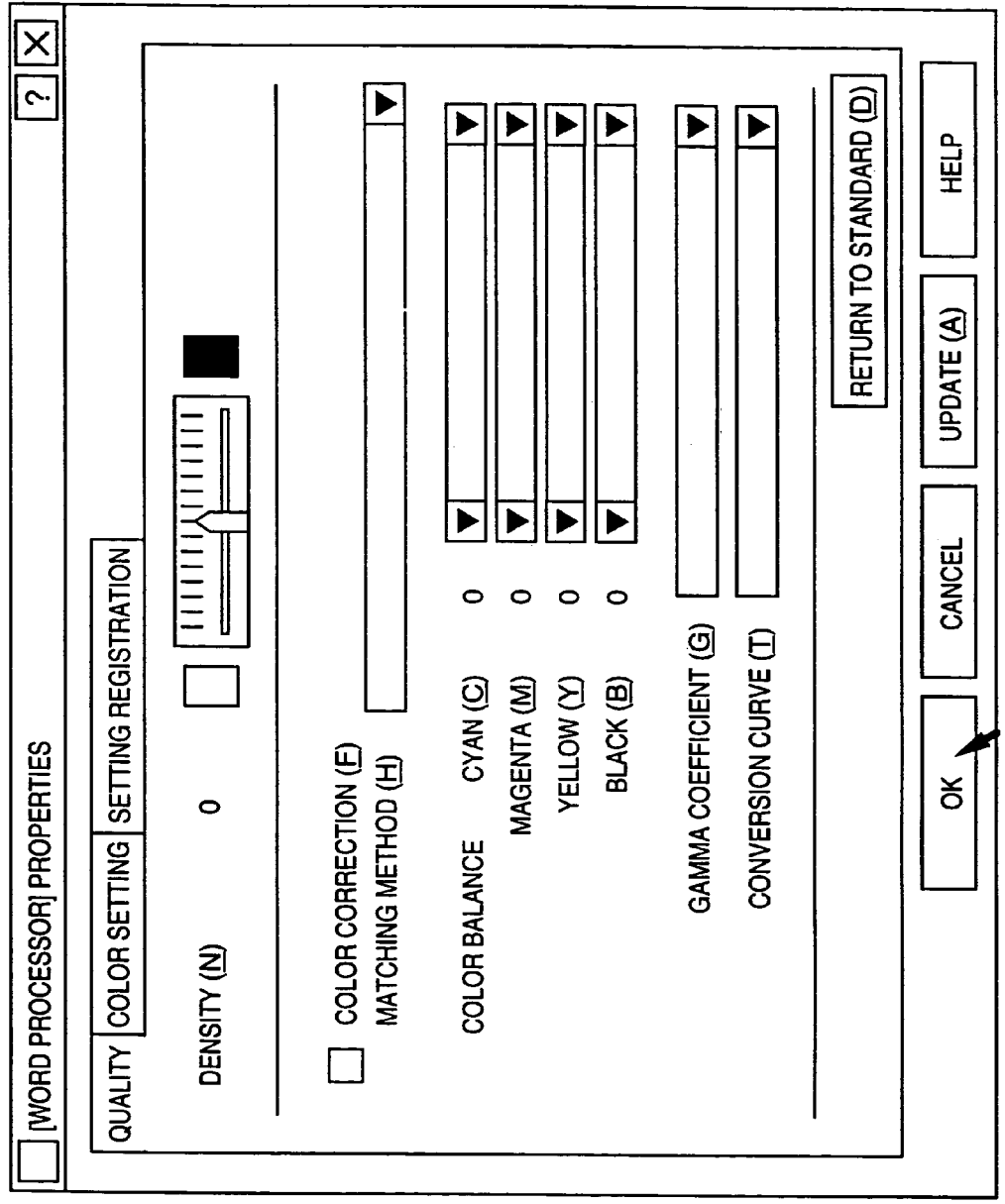
FIG. 23 is a diagram showing a specific example of color setting properties based upon default settings.

FIG. 23 shows a window referred to as a "color setting property" window capable of being opened after the window of FIG. 22 is opened. The user can employ this window to set a "Density" field through which the density of data at the time of printing can be changed, and a "Color Correction" field for performing various color corrections. The default setting for these settable items are "0" for "Density" and "OFF" for "Color Correction." These are displayed on the display unit.

Ordinarily the user selects the type of application from the "Automatic Pallet" of the main property window using the setting unit 301. Then, in conformity with the selection made on the "Automatic Pallet", the user merely moves the levers in the directions displayed in the "Paper Thickness Selection Lever" and "Paper Selection Lever" messages and places the medium indicated in the "Media" message in the printer, thereby making it possible to execute printing that conforms to the application. If the application being employed by the user is word processing software, the user need only execute printing by leaving the various settings at the default settings.

If the user clicks on the "OK" button in FIG. 20 in order to execute printing using the default settings, the default settings that have been stored in the storage area 3021 are communicated from the setting selection unit 302 to the control command issuance unit 310 as setting information 333 and to the printing device 100 as the printing control command 334. As a result, printing in accordance with the default settings is performed by the setting device 100.

However, the user may not always execute printing using the default settings and may wish to change the settings. An example of such a scenario will now be described.

Figure 24:
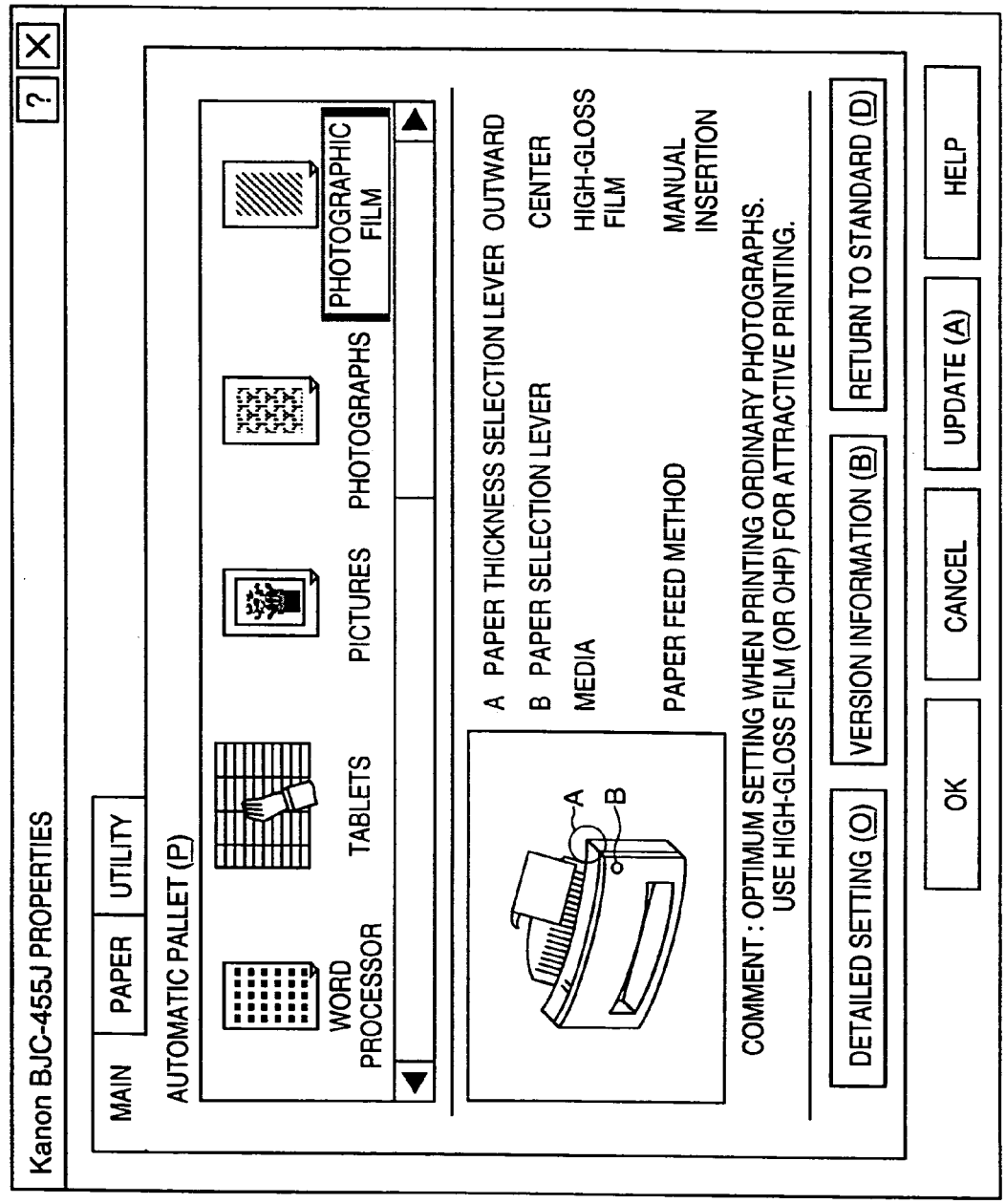
FIG. 24 is a diagram showing the status of main properties in a case where settings of an automatic pallet have been changed from those for a word processor to those of a photographic film.

FIG. 24 shows a window illustrating a state in which "Photographic Film" has been selected on the "Automatic Pallet" in a case where the image created by a photograph retouching program is to be printed on glossy film paper.

In FIG. 24, "Outward" has been set for "Paper Thickness Selection Lever", "Center" for "Paper Selection Lever", "High-gloss Film" for "Media" and "Manual Insertion" for "Paper Feed Method." More specifically, the user has, in effect, sent a message meaning "move the Paper Thickness selection lever of the printer outward, move the paper selection lever toward the center, use high-gloss film as the medium placed in the printer and insert the film manually." Thus, the user is instructed of the operation necessary to perform printing in the manner desired by the user. If the user performs the operation specified for the printer driver and executes printing, it will be possible to obtain printed results suitable for photographic film.

If the user is not satisfied with the photographic film setting on the "Automatic Pallet" and wishes to make a more detailed setting, then the user clicks the "Detailed Setting" button in the main property window. This causes the quality property window of FIG. 25 to open. The user can use this screen to make detailed settings such as by changing the media or dither processing and opening the color setting property window of FIG. 26 to adjust density or set color balance.

In FIG. 25, the setting "Pattern (High Speed)" for "Dither Setting" is dimmed and cannot be selected by the user; "Error Diffusion" has been selected. When a button or the like is dimmed on the screen, this means that the button cannot be selected. In the Figures, however, dimmed buttons and the like are not particularly illustrated. The display shown in FIG. 25 is the result of the user having performed the operation below by selecting "Photographic Film" instead of "Word Processor" on the "Automatic Pallet" of the main property window through use of the setting unit 301. It should be noted that it is assumed that "Word Processor" has been set as the default setting at start-up of printer driver, and that this setting has been stored in the storage area 3021 as the latest value.

The setting selection unit 302 sends the link information extraction unit 307 the link information request instruction 329 relating to the setting "Photographic Film" on the automatic pallet. The link information 331 extracted from the link information storage unit 308 in accordance with the instruction 329 includes information to the effect that "Pattern (High Speed)" of the dither settable item is to be made non-selectable, as well as information to the effect that "Error Diffusion" is to be selected. The link information extraction unit 307 receives the link information 331 and sends the link information 332 to the setting selection unit 302. Upon receiving the link information 332, the setting selection unit 302 compares the latest setting information saved in the storage area 3021 with the link information 332. The result of the comparison is that the two are different. In such case the dither setting is changed from the default "Pattern (High Speed)" to "Error Diffusion" obtained by the link information, and this is stored in the storage area 3021. The result of the change is displayed on the display unit 309.

Thus, the link information includes a settable item and setting ("Error Diffusion" in this example) capable of being selected by the setting selection unit 302, as well as non-selectable item and setting ["Pattern (High Speed)"]. The link information storage unit 308 combines settings capable of being set with regard to the above-mentioned settable items and stores link information candidates consisting of desired values set as non-settable items for every settable item combined. When the value of a certain item is changed, therefore, items which must not be set and their values are obtained from the link information together with the item to be changed and its value that are linked to the value of the changed item.

Further, the message item "Resolution" has been changed from "360×360 dpi" to "720×360 dpi" and the message item "Printing Mode" has been changed from "HQ" to "FINE". All of these changes have been made in linkage with the change of the setting of "Automatic Pallet" in the main property window. By virtue of the fact that "Pattern (High Speed)" has been dimmed for "Dither Setting" in FIG. 25, high-speed printing that would diminish printing quality is prevented from being executed with regard to high-gloss film, which is a high-grade medium.

Figure 27:
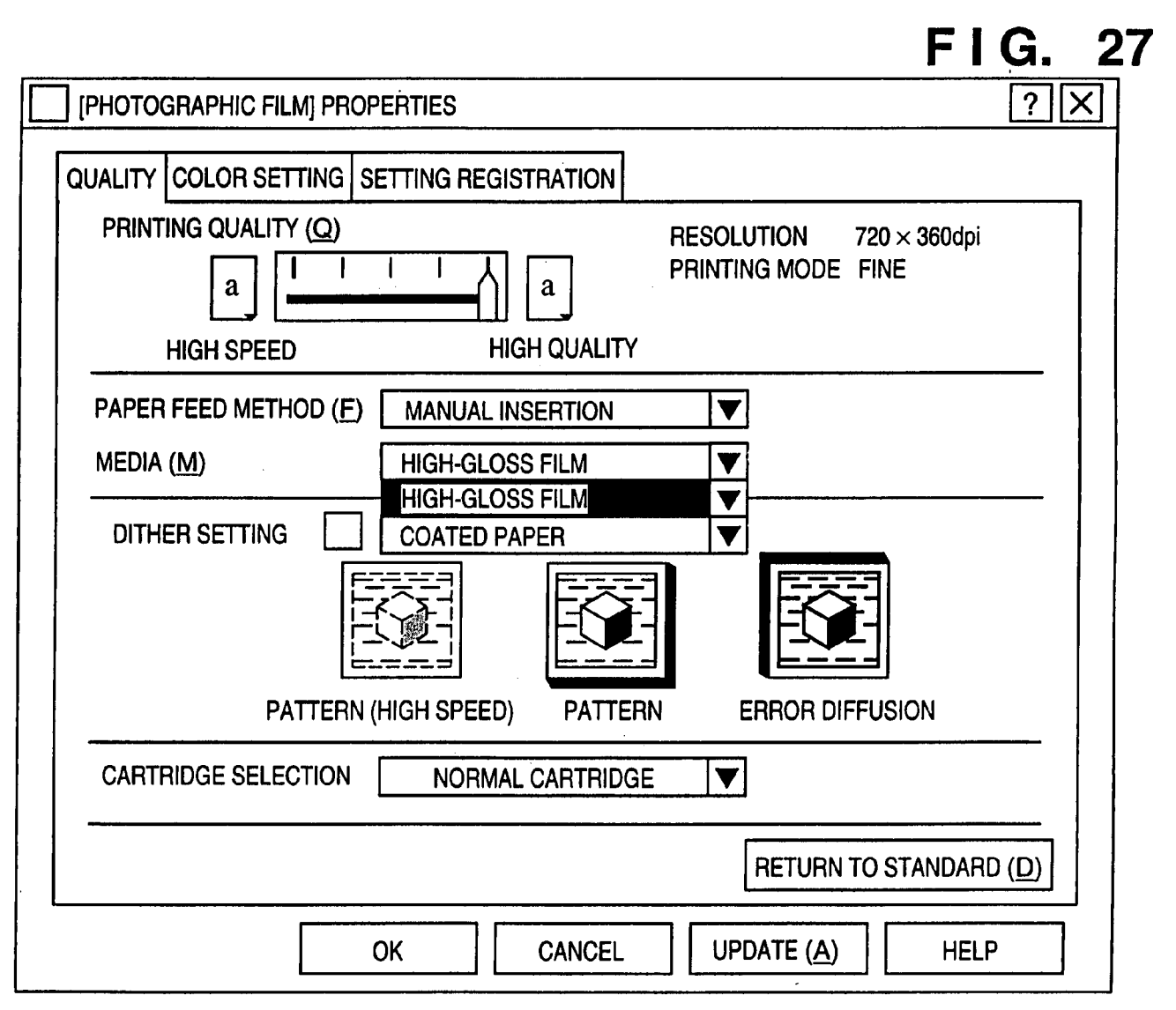
Figure 28:
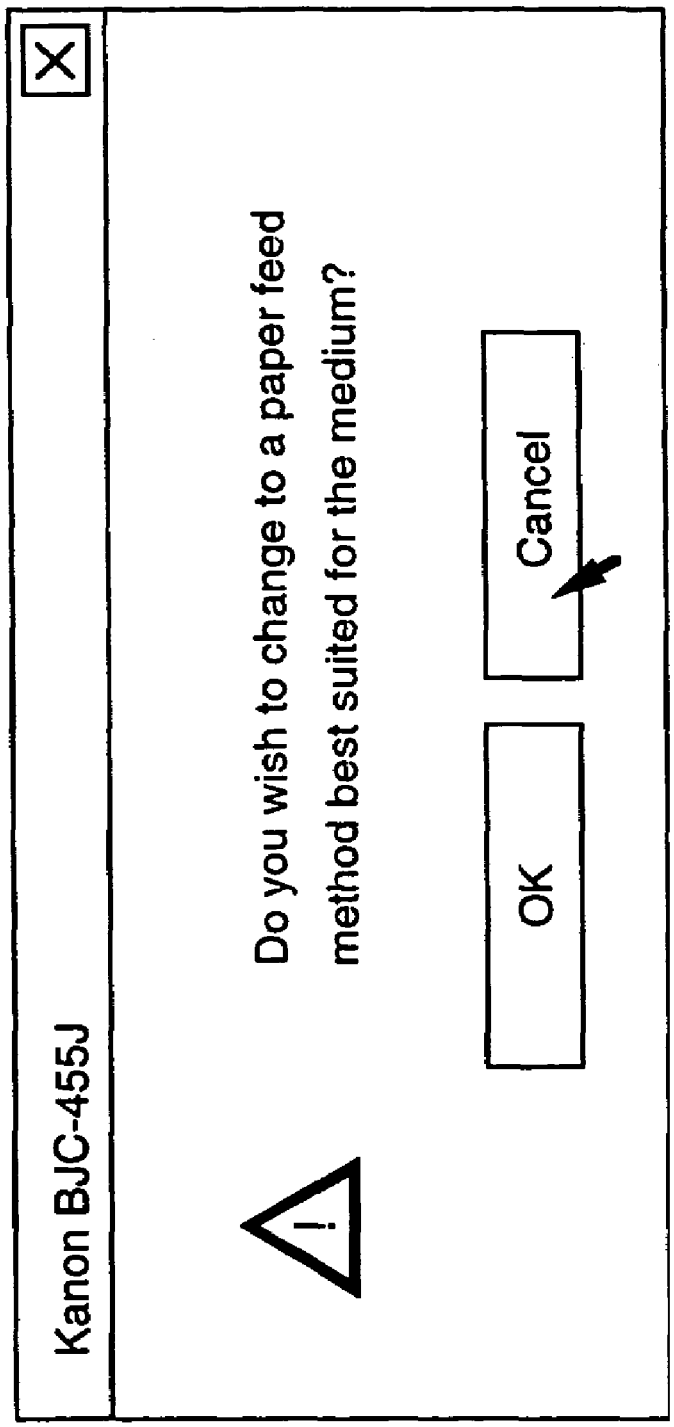
FIG. 28 is a diagram showing an example of a display in a case where user judgment is called upon.
Figure 30:
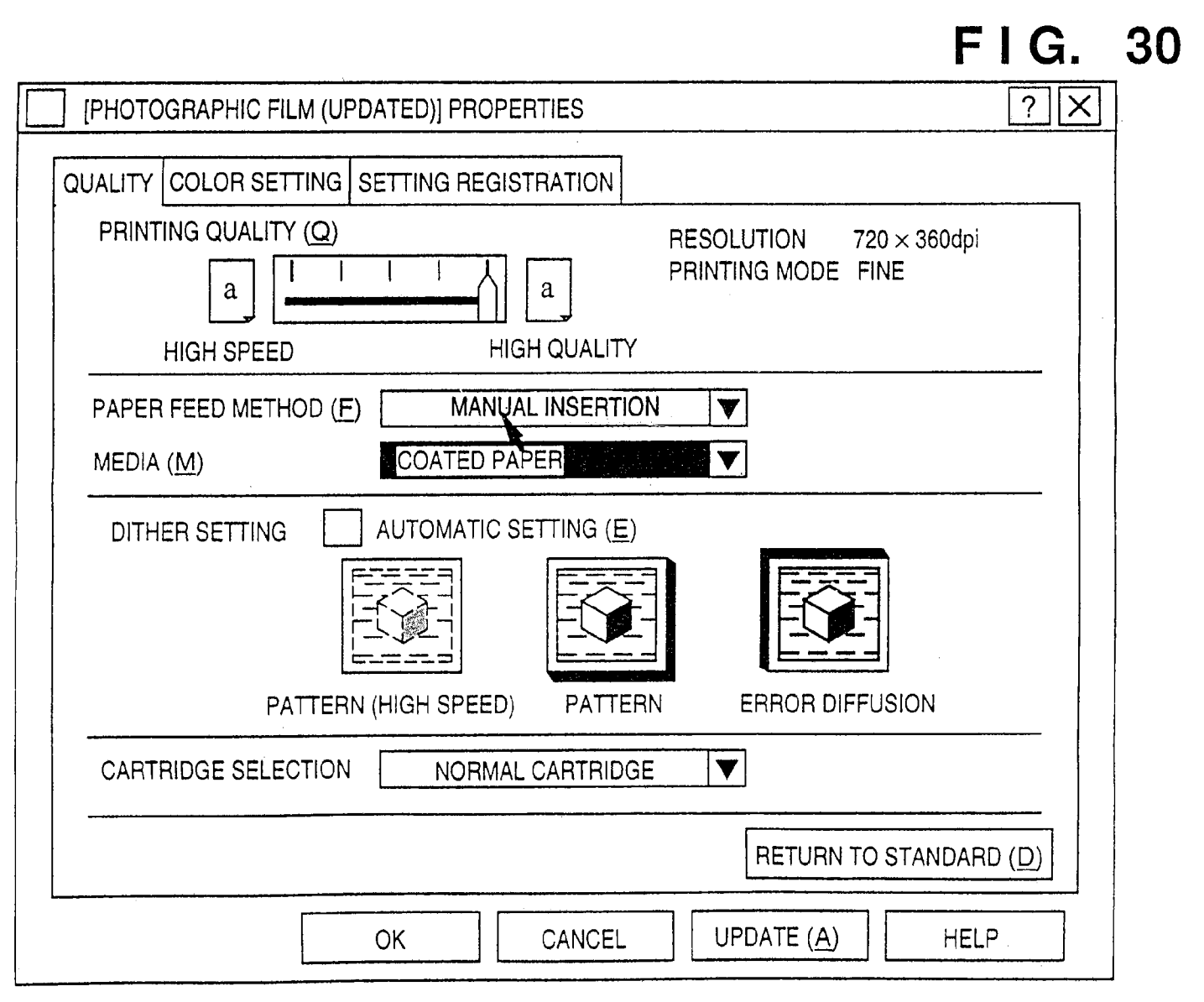

In a case where the user executes printing using coated paper instead of high-gloss film and making the "Photographic Film" setting in the "Automatic Pallet" field, the setting of the item "Media" is changed from "High-gloss Film" to "Coated Film", as shown in FIG. 27. When this is done, the setting selection unit 302 sends the link information extraction unit 307 the information request instruction 329, which includes information to the effect that the setting of the item "Media" has been changed from "High-gloss Film" to "Coated Paper." The link information extraction unit 307 sends the link information storage unit 308 the link information request instruction 330. Upon receiving the instruction 330, the link information storage unit 308 sends information, which includes the setting of an item to be changed attendant upon the change of the setting for the item "Media" from "High-gloss Film" to "Coated Paper", to the link information extraction unit 307 as the link information 331. This information is delivered from the link information extraction unit 307 to the setting selection unit 302 as link information 322. The setting selection unit 302 compares the latest set value stored in the storage area 3021 with the link information 332. If the setting stored in the storage area 3021 and the setting of the link information 332 differ and, moreover, neither can be decided upon, the user is called upon to make the decision, as shown in FIG. 28. In a case where the user has decided that a change should be made to the link information, the user clicks on the "OK" button in FIG. 28. In response to this operation, the link information 332 is stored on the recording medium as the latest information. The display unit displays the latest information in the manner shown in FIG. 29. Here the setting for the item "Paper Feed Method" has been changed from "Manual Insertion" to "Automatic Sheet Feeder." In a case where the user decides that the preceding setting is acceptable in FIG. 28, the user clicks on the "Cancel" button in FIG. 28. In response, the information that has been stored in the storage area 3021 is displayed by the display unit 309 in the manner shown in FIG. 30. In the window shown in FIG. 30, the only change made by the operator from the window of FIG. 25 is the settable item "Media", which the operator has changed to "Coated Paper."

This exchange of information is performed among the setting selection unit 302, link information extraction unit 307 and link information storage unit 308 until the user clicks on the "OK" button in the main property window.

When the "OK" button in the main property window is pressed, the latest setting information that has been stored in the storage area 3021 is communicated from the setting selection unit 302 to the control command issuance unit 310 as the setting information 333. Furthermore, this information is communicated to the printing device 100 as the printing control command 334 so that printing in accordance with the latest setting information is carried out by the printing device 100.

<Hardware Configuration>

Figure 17:
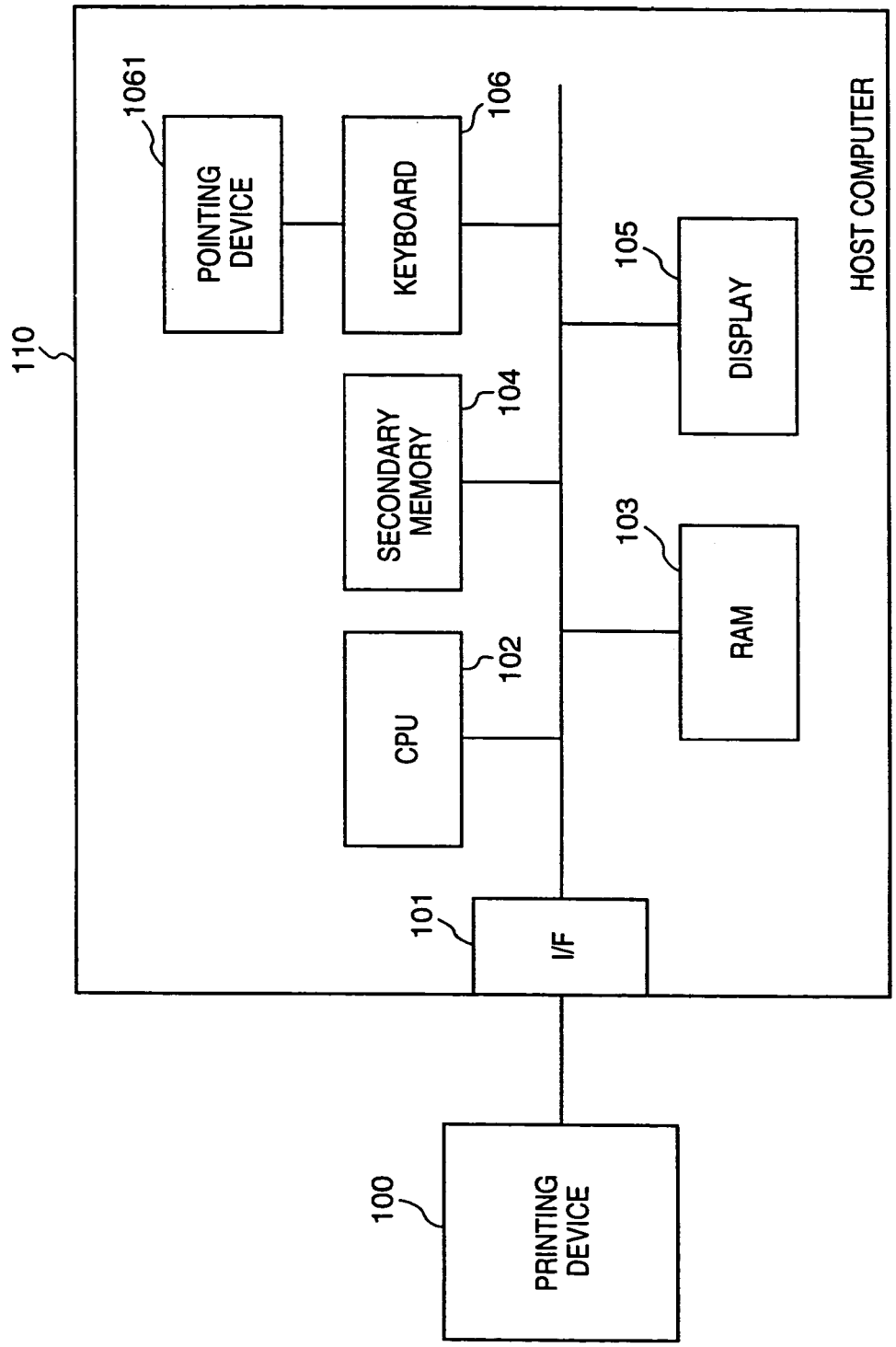
FIG. 17 is a block diagram of a printing system comprising a host computer and a printing device.

FIG. 17 is a block diagram illustrating a case where the printing system shown in FIG. 16 and comprising the printing device 100 and host computer 110 is implemented by hardware resources.

As for the hardware resources, the CPU 102 controls the overall apparatus and executes the program of a procedure (described later) stored in the RAM 103, thereby implementing the functions of the printing control apparatus of FIG. 16 or of the system shown in FIG. 32. Furthermore, the CPU 102 executes the above-mentioned application program to allow the user to enter printing information. In addition to a storage area for programs, the RAM 103 is provided with the storage area 3201 for storing the settable values planted by the setting selection unit 302, the default settings and the latest settings. The secondary memory 104 stores a program and information used upon being loaded in the RAM 103. The program and information to be stored in the RAM 103 are stored in the secondary memory 104 in advance and can be loaded from the memory 104 to the RAM 103. The display 105, a keyboard 106 and a pointing device 1061 are used when the user selects or enters settings. The windows of FIGS. 20 through 30 are displayed by the display 105 and settings are made by the keyboard or pointing device.

Figure 31:
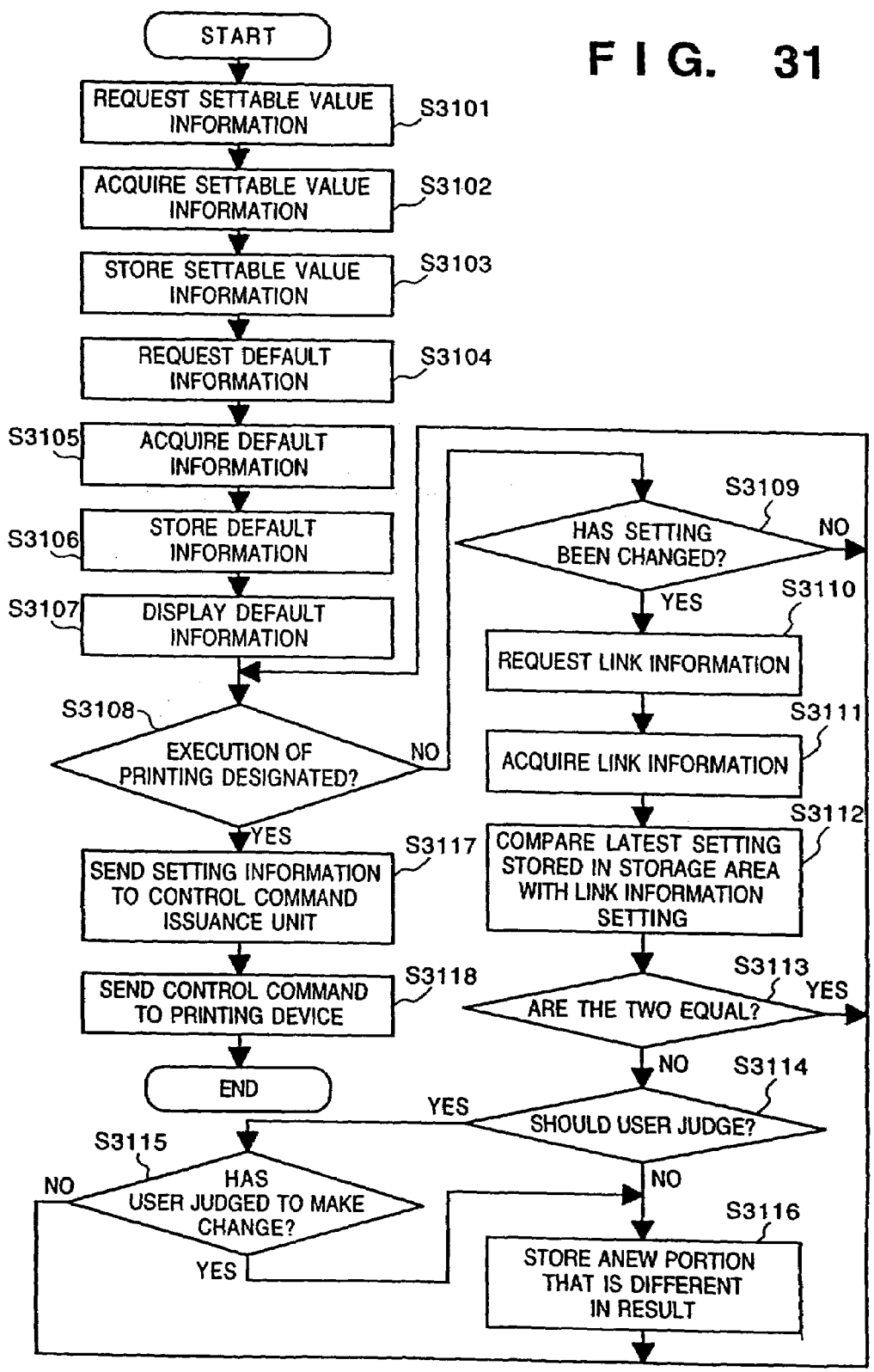
FIG. 31 is a flowchart of a printer driver according to this embodiment.

In order to implement the functions of the printing control apparatus, the program of a procedure shown in FIG. 31 is executed by the CPU 102 of the host computer 110 configured as described above. The procedure of FIG. 31 has already been described with reference to FIGS. 16, 18-30 and 32 but will now be described again in terms of the flow of processing.

When a print request is issued by the user to call the printer properties, a request for settable value information is made (step S3101), whereupon the settable value information is acquired (step S3102) and stored in the RAM 103 (step S3103). Default information is then requested (step S3104), the default information is acquired (step S3105) and the default information is stored in the RAM 103 (step S3106) and displayed on the display 105 (step S3107).

It is determined whether execution of printing has been designated by the user (step S3108). If the answer is "YES", then setting information is sent to the control command issuance unit (step S3117). The latter sends a control command to the printing device 100 (step S3118), in response to which the printing device 100 executes a printing operation.

If it is found at step S3108 that the user has not designated printing, then it is determined whether a setting has been changed (step S3109). If a setting has not been changed, then the program returns to step S3108.

If a setting has been changed, on the other hand, then link information is requested (step S3110) and the link information is acquired (step S3111). When the link information has been acquired, the latest setting that has been stored in the storage area and the link information setting are compared (step S3112) and judged (step S3113). If the result of the comparison is that the two are equal, the program returns to step S3108. If the two are not equal, then it is determined whether the selection of the setting should be made by the user (step S3114). This decision is made by setting a flag in advance, for every item of link information, indicating whether the item is one to be left to the judgment of the user, and then referring to the flag.

If it is decided that the user should make the selection, then the selection entered by the user is investigated (step S3115). If a change has been entered, the portion that is different in the result of the comparison is substituted for the link information setting and this is stored in the RAM 103 (step S3116).

If it is judged at step S3114 that the user should not make the selection, then the program proceeds to step S3116.

If the changed setting has been stored in the RAM 103 at step S3116, the program returns to step S3108, where it is determined whether the user has designated the execution of printing.

Thus, the printing control apparatus according to the present invention in such that for every value set as a settable item for the purpose of performing printing, other settable items related to this item and the values of these other items are stored beforehand as link information. If the value of any settable item has been changed, link information is retrieved based upon the changed item and its value and the items and values thereof contained in the link information obtained are adopted as new settings or as setting candidates. As a result, the burden of making settings at the time of printing is alleviated as far as the operator is concerned. In addition, the settings at the time of printing are made the optimum values with ease.

Further, since it is so arranged that default settings are made, the user need not make many settings relating to printing information in a case where the printing operation is of the ordinary type. This also makes it possible to lighten the burden upon the operator.

In a case where a setting has been changed by the user, the settings of other settable items also are made optimum settings decided in advance. As a result, control can be performed in such a manner that the user cannot select combinations that are not allowed.

Figure 55:
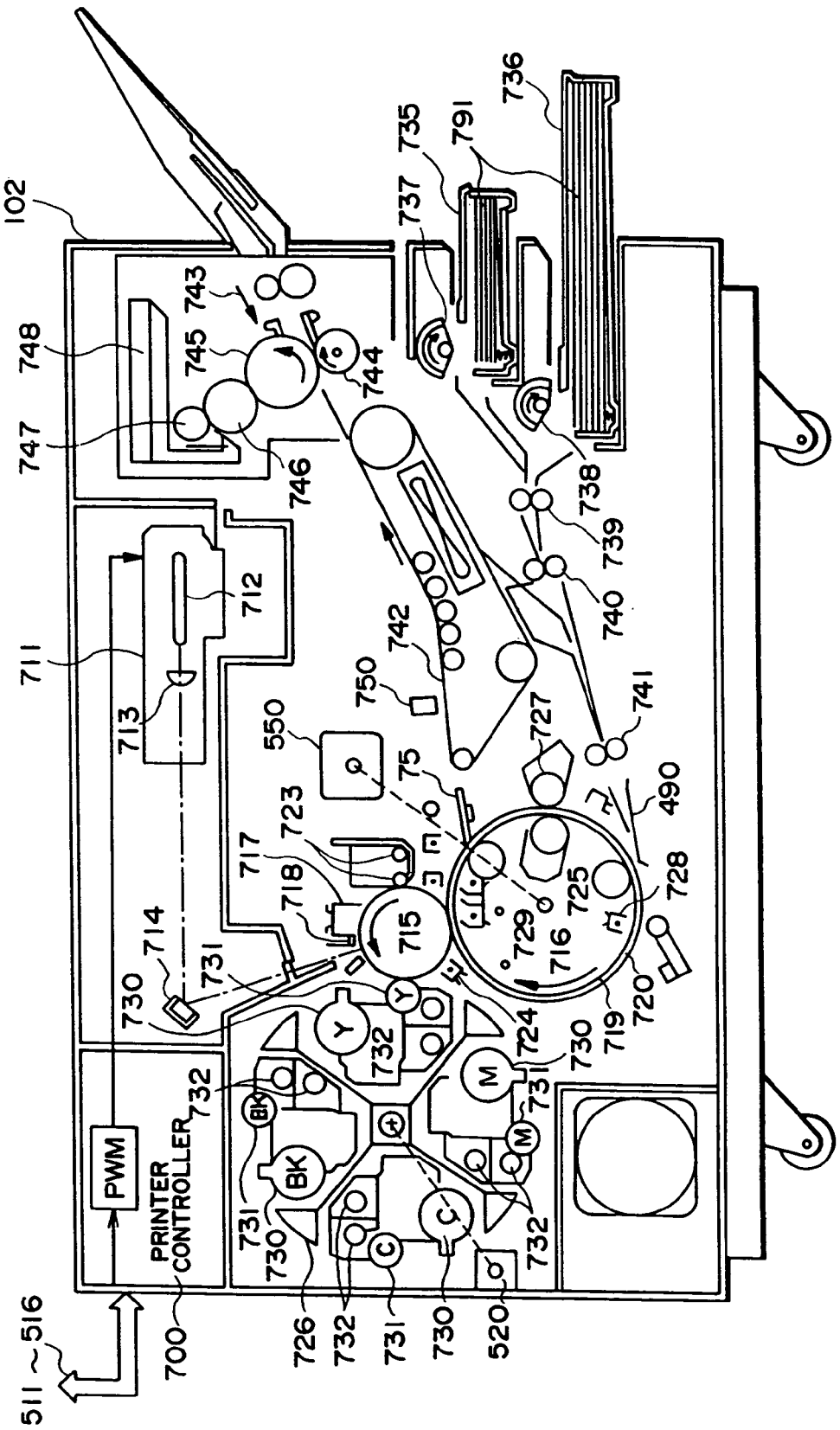
FIG. 55 is a sectional view of a color laser beam printer.

An example of a printer capable of being controlled by a printer driver according to the invention will now be described. FIG. 55 is a sectional view of a color laser printer 1020. As shown in FIG. 55, the printer includes an optical system 711 having a laser output unit (not shown) for converting an image signal to an optical signal, a polygon mirror 712 having the shape of a polyhedron (e.g., an octahedron), a motor (not shown) for rotating the mirror 712, and an f/θ lens (image forming lens) 713. A reflecting mirror 714 changes the optical path of the laser beam. Numeral 715 denotes a photosensitive drum. The laser beam emitted by the laser output unit is reflected by one side of the polygon mirror 712 and linearly scans (raster scans) the surface of the photosensitive drum 715, which is rotating in the direction indicated by the arrow), through the f/θ lens 713 and mirror 714. As a result, an electrostatic latent image that corresponds to the image of an original is formed on the surface of the photosensitive drum 715.

The printer further includes a primary corona charging device 717, a full-exposure lamp 718, a cleaner 723 for recovering residual toner that has not been transferred, and a pre-transfer corona charging device 724. These units are arranged along the circumference of the photosensitive drum 715.

A developing unit 726 develops the electrostatic latent image that has been formed on the surface of the photosensitive drum 715. Specifically, the developing unit 726 includes developing sleeves 731Y, 731M, 731C, 731Bk which perform direct development by contacting the surface of the photosensitive drum 715, toner hoppers 730Y, 730M, 730C, 730Bk containing preliminary toners, and screws 732 for conveying developer. The sleeves 731Y~731Bk, toner hoppers 730Y~730Bk and screws 732 are arranged so as to surround a rotary shaft P of the developing unit. It should be noted that the characters Y, M, C, Bk of these components indicate colors. Specifically, "Y", "M", "C" and "Bk" represent the colors yellow, magenta, cyan and black, respectively. When a yellow toner image is formed, a yellow toner development process is performed at the position indicated in FIG. 55. When a magenta toner image is formed, the developing unit 726 is revolved about the shaft P to bring the developing sleeve 731M inside the magenta developing unit into contact with the photosensitive drum 715. A similar operation is performed with regard to the cyan and black images as well.

The printer further includes a transfer drum 716 which transfers the toner images formed on the photosensitive drum 715 from the drum to paper, an actuator plate 719 for detecting the position to which the transfer drum 716 has been moved, a position sensor 720 which, by being approached by the actuator plate 719, senses that the transfer drum 716 has moved to a home position, a transfer drum cleaner 725, a paper retaining roller 727, a charge removing device 728 and a transfer corona charging device 729. These units 719, 720, 725, 727 and 729 are arranged along the circumference of the transfer drum 716.

Numerals 735, 736 denote paper supply cassettes which accommodate sheets of paper. It is assumed in this embodiment that the paper supply cassettes 735 and 736 contain size A4 paper and size A3 paper, respectively. Paper feed rollers 737, 738 supply paper from the cassettes 735, 736, respectively. Timing rollers 739, 740 and 741 decide the timing of paper supply and conveyance. A sheet of paper supplied and conveyed via these rollers is introduced to a paper guide 749 and the paper is wound upon the transfer drum 716 while its leading edge is held by a gripper, described below. A transition is then made to the image forming process. It should be noted that which of the paper feed cassettes 735, 736 is selected is decided by a command from a main controller, and that only a selected paper feed roller is rotated.

It should be noted that an inkjet printer can be utilized instead of this laser beam printer. A description of the structure of the inkjet printer is not given here as the structure will be described in conjunction with a fourth embodiment, set forth below.

Fourth Embodiment

A printing system which implements a printer driver to perform printing will now be described as a fourth embodiment with reference to the arrangement shown in FIG. 33.

Figure 33:
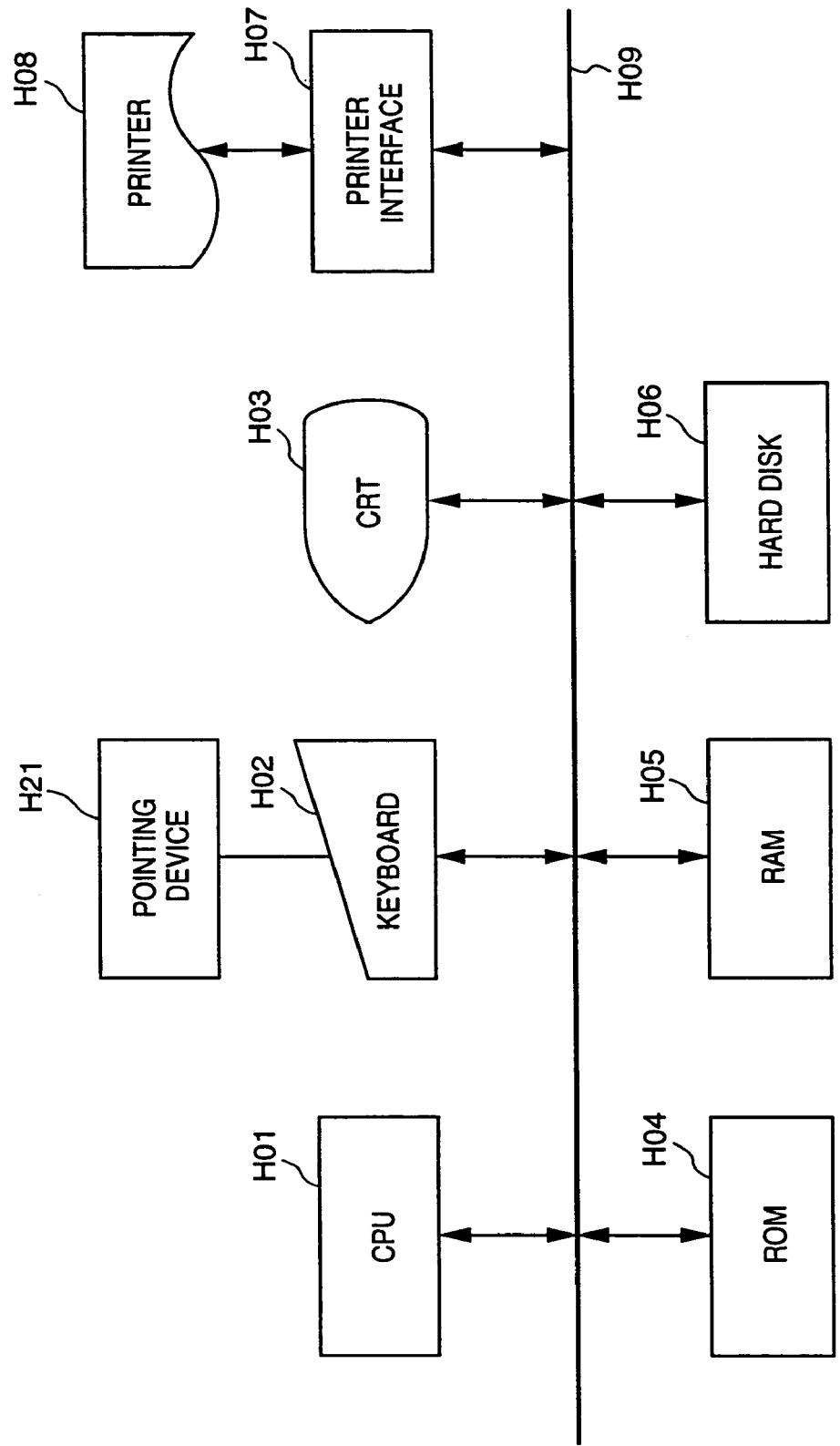
FIG. 33 is a diagram showing the software configuration of a printing system according to third through eighth embodiments of the invention.

As shown in FIG. 33, a controller H01 (referred to as a "CPU" below) administers overall control of the embodiment. A keyboard H02 and a pointing device H21 are used when the operator enters various data. A color display unit H03 displays image data that has been stored in a RAM H05. A ROM H04 is a read-only memory in which the control procedure for controlling the overall apparatus and various other items of necessary information are stored in advance. A RAM H05 is a random-access memory utilized as a working area. A hard disk H06 is for reading and writing various data and for storing programs. A printer interface H07 is a bidirectional interface for transmitting printing data and for receiving signals representing the status of a printer H08. A data bus H09 is used to transfer various data. It should be noted that the hard disk H06 stores application programs and a printer driver. These are loaded in the RAM H05 and are executed by the CPU H01.

The printer H08 of this embodiment is a color inkjet printer and is capable of being equipped with three types of interchangeable heads. The first is a monochrome printing head, the second, a color printing head and the third, a photographic grade printing head. The monochrome and color printing heads are bi-level heads, the same as those in conventional printers. One bit of image data in a print command signifies one dot. The photographic grade printing head is capable of performing grayscale printing by superimposing light inks. In this embodiment, the head is capable of printing four gray levels. This means that two bits are necessary to express one dot. Since the number of bits needed to print one dot thus differs depending upon the head, printing cannot be performed correctly unless a print command suited to the head installed in the printer is transmitted.

The details of the printing system shown in FIG. 33 will be described next. This system is so adapted as to determine whether the printing head that has been set in the printer driver and the printing head actually installed in the printer agree, present an error display if the two do not agree and suspend printing or allow the head to be changed.

Figures 35, 36:
FIG. 35 is a diagram showing a cartridge menu.
FIG. 36 is a diagram showing an error dialog box in case of head mismatch.

The operation of the printer driver as indicated on the display screen will be described first. FIG. 34 shows a printing dialog box. The printing dialog box is a display window that allows the operator to make various settings related to printing. The operator observes the display and sets appropriate values by entering them or by selecting them from a menu. When a setting has been made, the setting is stored in the RAM H05 or hard disk H06. A "Cartridge" menu in FIG. 34 is for selecting the head. Three types of heads can be selected using this menu. FIG. 35 illustrates selectable items in the "Cartridge" menu. The printer driver generates a print command in conformity with the setting on the "Cartridge" menu when a "Print" button is pressed. The head that has been installed in the printer is checked before the print command is transmitted to the printer. If the installed head agrees with the menu setting, then the print command is transmitted. If non-agreement is found, an error dialog box shown in FIG. 36 is displayed. If the "Stop" button in this dialog box is pressed, printing is suspended. If the "Continue" button is pressed, then head verification processing is executed and processing is repeated until the setting is found to agree with the actual head.

Figure 37:
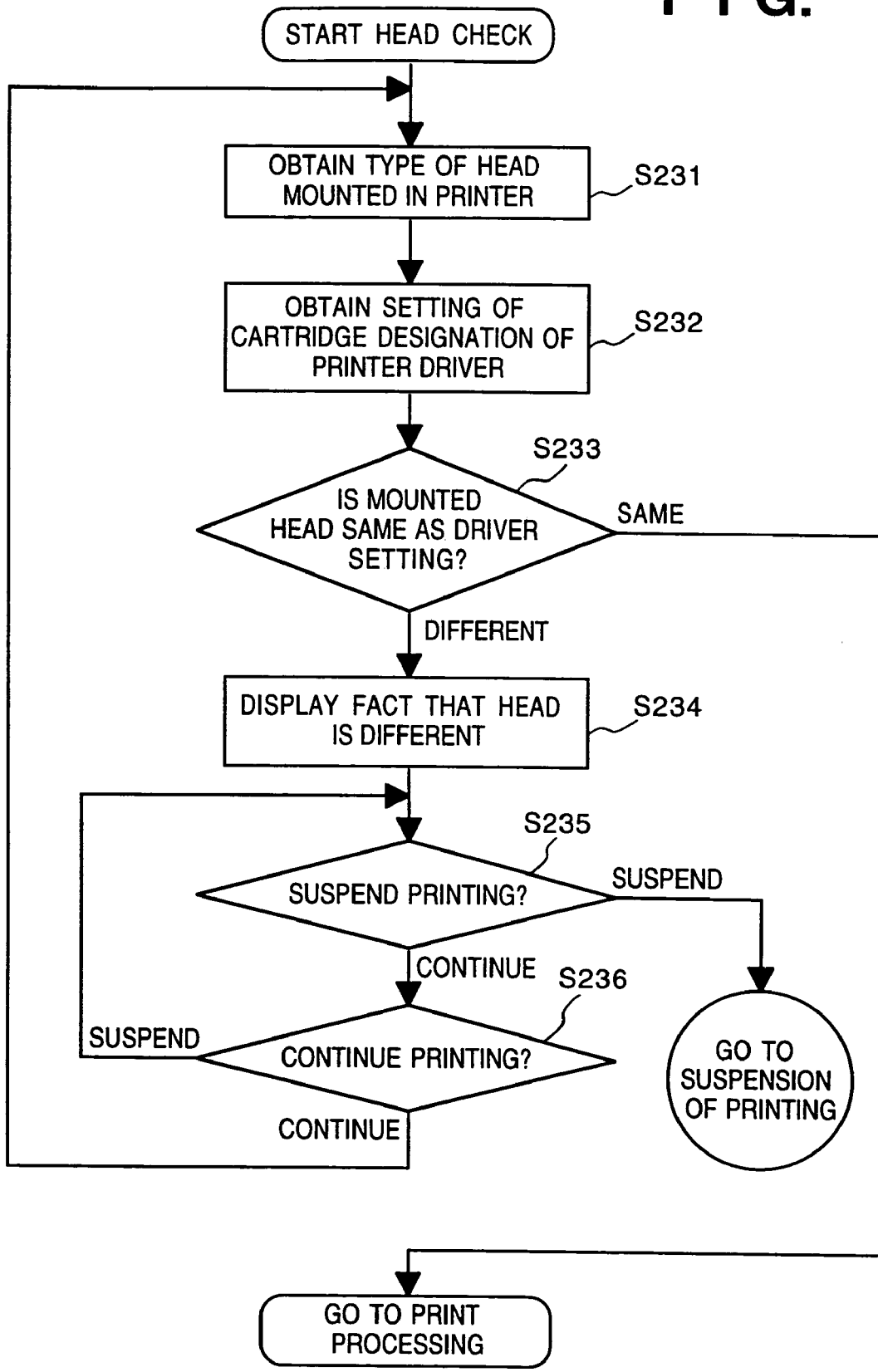
FIG. 37 is a flowchart of processing for checking heads in the fourth embodiment.

The operation of the printer driver will now be described with reference to a flowchart. FIG. 37 is a flowchart of processing from clicking of the "Print" button in FIG. 34 to transmission of the print command.

The type of head mounted in the printer H08 is obtained via the printer interface H07 of FIG. 33 at step S321. The value set as the "Cartridge" item of the printer driver is obtained at step S232. It is determined at step S233 whether the head that has been mounted in the printer H08 and the setting obtained at step S232 agree. If the two agree, the setting is sent to the printer H08 and a transition is made to printing processing. If the two do not agree, the program proceeds to step S234, at which a display is presented to the effect that the printing head is different from the setting of the driver. In this embodiment, the error dialog box of FIG. 36 is displayed. Steps S235 and S236 constitute error dialog processing. It is determined at step S235 whether the "Stop" button has been pressed. If the "Stop" button has been pressed, a transition is made to suspension of printing. It is determined at step S236 whether the "Continue" button has been pressed. If this button has been pressed, a transition is made to step S231. If this button has not been pressed, however, the program returns to step S235.

By virtue of the fact that the printer driver controls the setting of the printing head in the manner described above, it is possible to prevent printing malfunction caused by a difference between the setting of printing head and the actually installed printing head.

Figure 38:
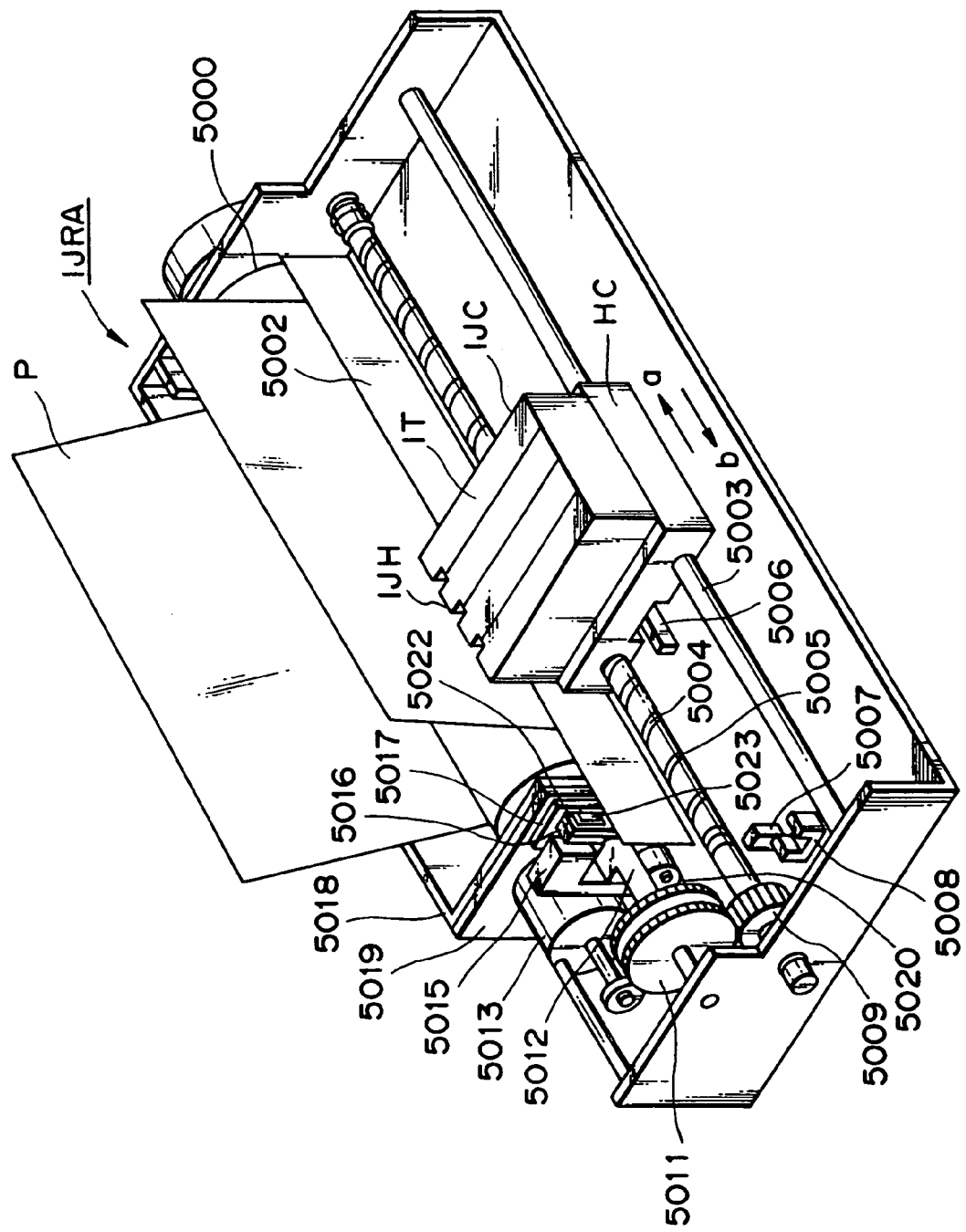
FIG. 38 is a diagram showing the construction of an inkjet printer capable of being used by the third through eighth embodiments.

FIG. 38 is diagram showing the construction of a color inkjet recording apparatus IJRA applicable to this embodiment of the invention. It should be noted that this printer can be used not only in the first embodiment but also in the embodiments from the second onward. As shown in FIG. 38, a carriage HC is engaged with a helical groove 5004 of a lead screw 5005 rotated via driving force transmission gears 5011, 5009 in operative association with the forward and reverse rotation of a driver motor 5013. The carriage HC has a pin (not shown) moved back and forth in directions of arrows a and b. An inkjet cartridge IJC for the colors Y (yellow), M (magenta), C (cyan) and Bk (black) is mounted on the carriage HC in a case where the color head is selected. If the monochrome head is selected, a cartridge solely for the color black is mounted. If photographic color is selected, a cartridge for photographic color is mounted. A paper retaining plate 5002 presses recording paper P against a platen 5000 along the traveling direction of the carriage. Photocouplers 5007, 5008 constitute home position sensing means for verifying the presence of a carriage lever 5006 in the vicinity of the photocouplers and changing over the direction in which the motor 5013 is rotated. A member 5016 supports a cap member 5022, which is for capping the front side of the recording head. Suction means 5015 for applying suction to the cap subjects the cap to suction recovery via an opening 5023 inside the cap. A member 5019 makes it possible to move a cleaning blade 5017 back and forth. The cleaning blade 5017 and the member 5019 are supported on a support plate 5018. It goes without saying that the blade need not be of this type and that a well-known cleaning blade can be applied to this embodiment. A lever 5021, which is for starting the suction of the suction recovery operation, moves with movement of a cam 5020 engaged with the carriage. Movement is controlled by well-known transmission means whereby the driving force from the driver motor is changed over as by a clutch.

Fifth Embodiment

A fifth embodiment of the invention will now be described. In this embodiment, it is determined whether selection of paper size of the printer driver and the size of the paper actually placed in the printer agree. If the two do not agree, an error display is presented and printing is suspended or the paper is changed. The construction of the printer is the same as that of the fourth embodiment and is as shown in FIG. 33.

Figure 39:
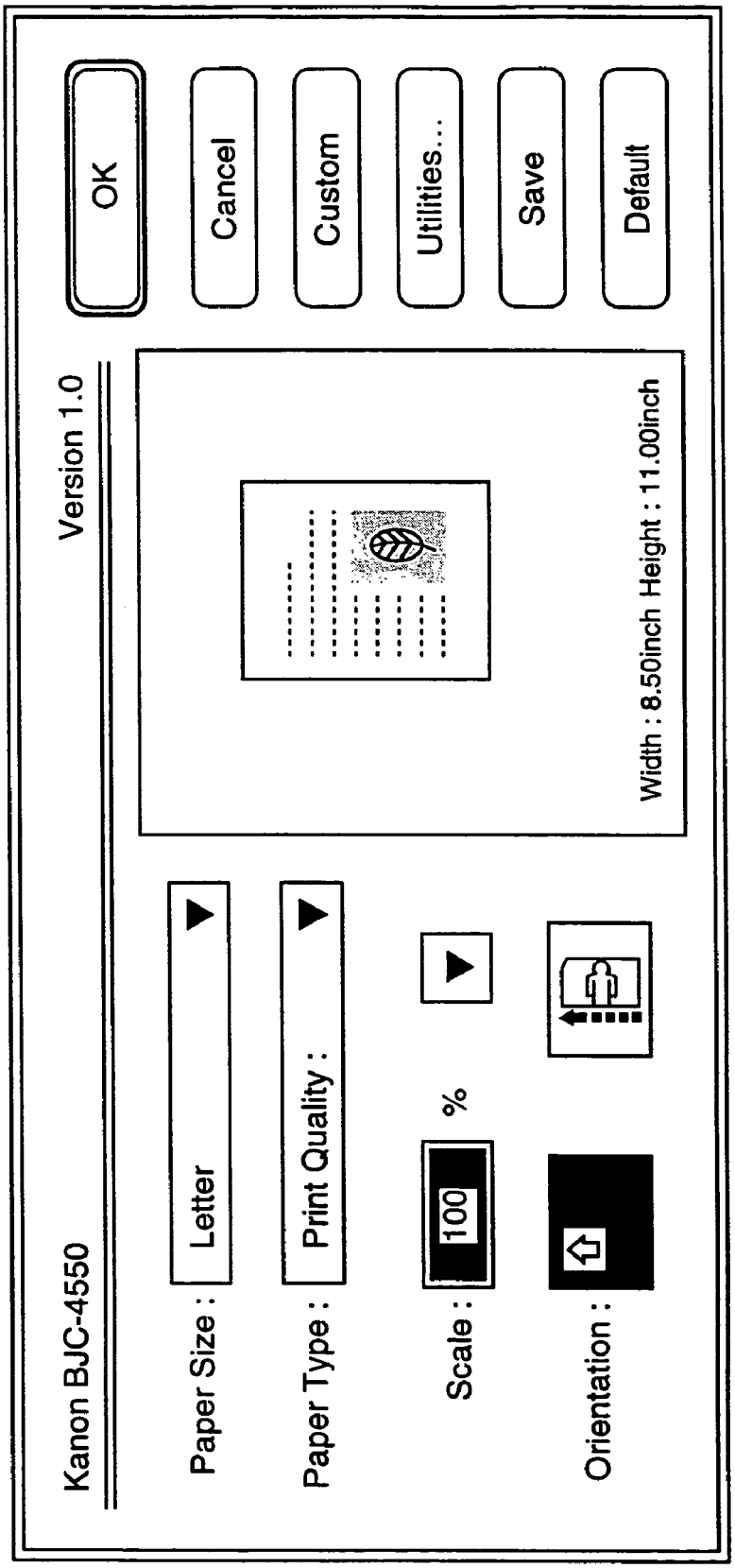
FIG. 39 is a diagram showing a paper setting dialog box.
Figures 40, 41:
FIG. 40 is a diagram showing a paper size menu.
FIG. 41 is a diagram showing an error dialog box in case of paper mismatch error.

The operation of the printer driver will now be described in terms of the display screen. FIG. 39 shows a dialog box for setting paper size. This dialog box is a window for setting the size, scale and orientation of the printing paper. The set values are stored in the RAM H08 or hard disk H06. The operator sets printing paper size and the like by setting the values desired for each of the items on the screen or by selecting the values from a menu. In FIG. 39, a "Paper Size" menu is a menu for selecting paper size. The printer of this embodiment supports 13 types of paper sizes. FIG. 40 illustrates the selectable items in the "Paper Size" menu. The "OK" button in the dialog box of FIG. 39 signifies a decision on paper size and is not for designating execution of printing. Printing is performed by selecting the "Print" button in the printing dialog box of FIG. 34. When the "Print" button in the printing dialog box is pressed, the printer driver generates a print command in conformity with the value set for the item "Paper Size." Before the print command is transmitted to the printer, the size of the paper that has been placed in the printer is confirmed. If the size agrees with the setting, the print command is transmitted to the printer. If the two do not agree, an error dialog box shown in FIG. 41 is displayed. Printing is suspended if a "Stop" button in FIG. 41 is pressed. If the "Continue" button is pressed, then paper size verification processing is executed and processing is repeated until the setting is found to agree with the paper size.

Figure 42:
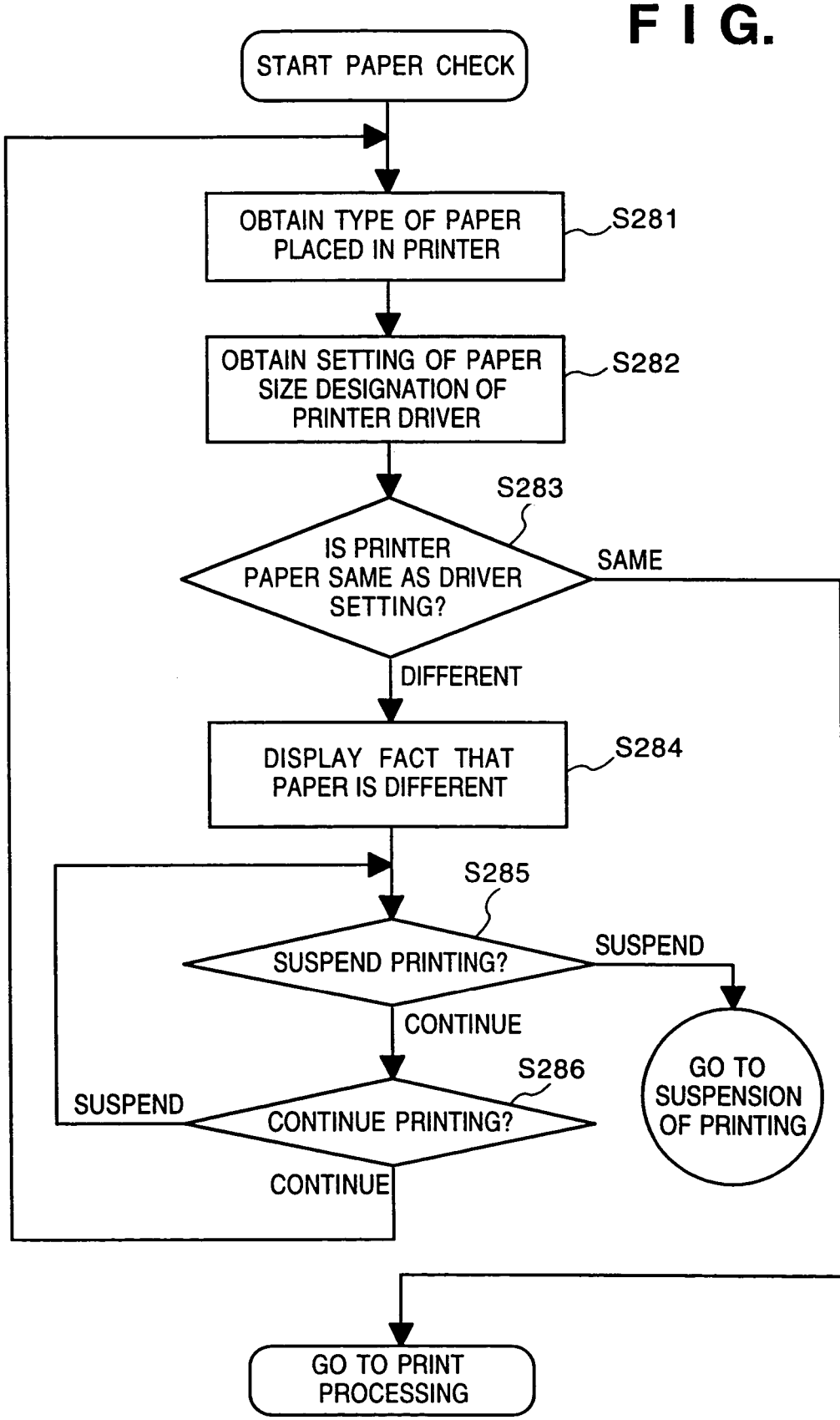
FIG. 42 is a flowchart of processing for checking paper size in the fifth embodiment.

The operation of the printer driver will now be described with reference to a flowchart. FIG. 42 is a flowchart of processing from clicking of the "Print" button in FIG. 34 to transmission of the print command.

The size of the paper that has been placed in the printer H08 is obtained via the printer interface H07 of FIG. 33 at step S281. The value set of the "Paper Size" set by the operator in the dialog box of FIG. 39 is obtained at step S282. It is determined at step S283 whether the size of the paper that has been placed in the printer and the value set in the dialog box of FIG. 39 with respect to the printer driver agree. If the two agree, a transition is made to printing processing. If the two do not agree, the program proceeds to step S284, at which a display is presented to the effect that the paper size is different. In this embodiment, the error dialog box of FIG. 41 is displayed. Steps S285 and S286 constitute error dialog processing. It is determined at step S285 whether the "Stop" button has been pressed. If the "Stop" button has been pressed, a transition is made to suspension of printing. It is determined at step S286 whether the "Continue" button has been pressed. If this button has been pressed, a transition is made to step S281. If this button has not been pressed, however, the program returns to step S285.

The processing described above makes it possible to determine whether the size of paper placed in the printer agrees with the paper size set for the printer driver. As a result, printer malfunction caused by the wrong paper size can be prevented.

Sixth Embodiment

Described next will be a printing system in which when the setting of the printer driver and the setting of the printer differ, a different printer can be selected anew without an error display being presented. A system having a construction the same as that of the printing system of the third embodiment will be described as an example.

Figure 44:
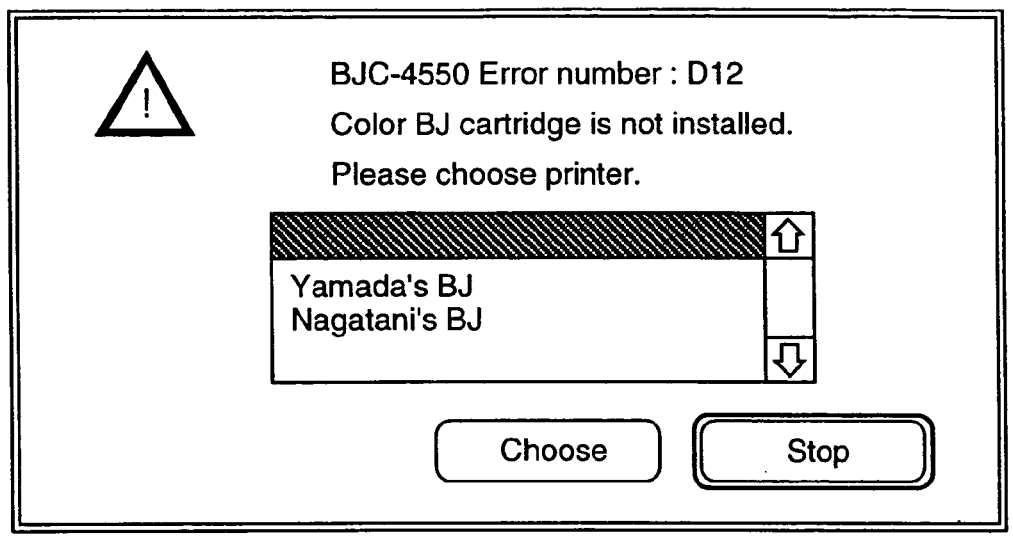
FIG. 44 is a diagram showing a printer selection dialog box.
Figure 45:
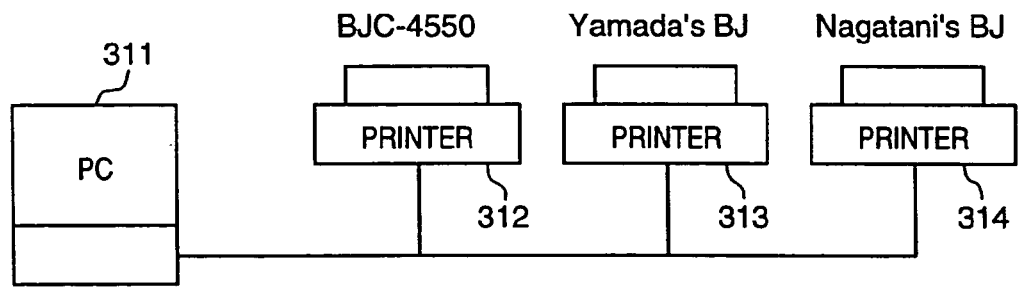
FIG. 45 is a diagram showing the manner in which a plurality of printers are interconnected.

The connections between a host and printers is as shown in FIG. 45. A PC 311 in FIG. 45 serves as a host and is connected to printers 312~314, each of which has a name assigned to it. The operation of the printer driver will be described in terms of the display screen. FIG. 43 shows a printing dialog box. A "Cartridge" menu in FIG. 43 is for selecting the head. The printer driver generates a print command in conformity with the setting on the "Cartridge" menu when a "Print" button is pressed. The head that has been installed in the printer is checked before the print command is transmitted to the printer. If the installed head agrees with the menu setting, then the print command is transmitted. If non-agreement is found, an error dialog box shown in FIG. 44 is displayed. If the "Stop" button in this dialog box is pressed, printing is suspended. If the printer is selected from the display and a "Choose" button in the dialog box of FIG. 44 is pressed, then head verification processing is executed again with regard to the printer chosen and processing is repeated until the heads are found to agree.

Figure 46:
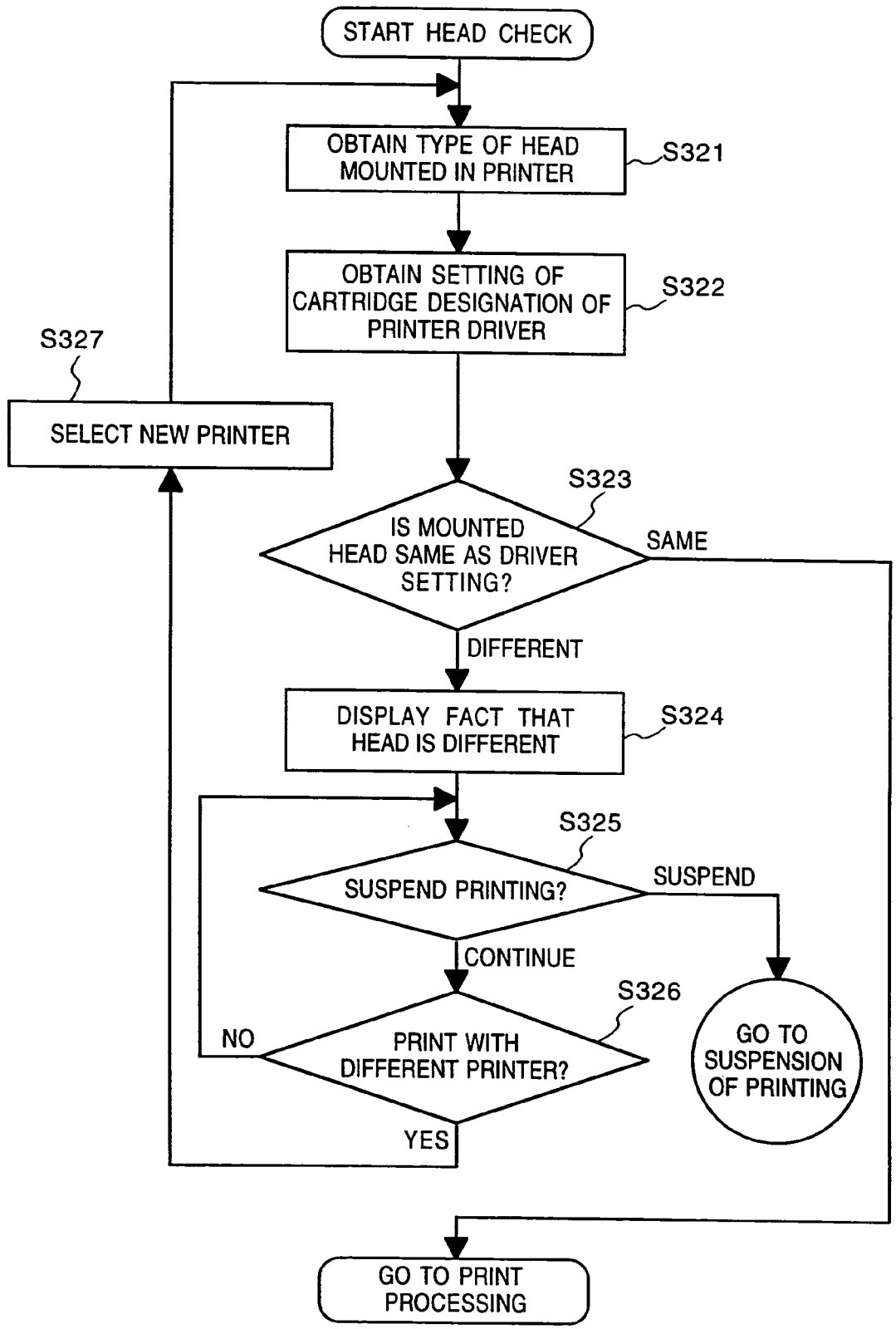
FIG. 46 is a flowchart of processing for checking heads in the sixth embodiment.

The operation of the printer driver will now be described with reference to a flowchart. FIG. 46 is a flowchart of processing from clicking of the "Print" button to transmission of the print command.

The type of head mounted in the printer H08 is obtained via the printer interface H07 of FIG. 33 at step S231. The value set as the "Cartridge" item of the printer driver is obtained at step S322. It is determined at step S323 whether the head that has been mounted in the printer H08 and the setting of the printer driver agree. If the two agree, a transition is made to printing processing. If the two do not agree, the program proceeds to step S324, at which a display is presented to the effect that the head is different from the setting of the driver. In this embodiment, the error dialog box of FIG. 44 is displayed. Steps S325 and S326 constitute error dialog processing. It is determined at step S325 whether the "Stop" button has been pressed. If the "Stop" button has been pressed, a transition is made to suspension of printing. It is determined at step S326 whether the "Choose" button has been pressed. If this button has been pressed, a new printer currently connected is selected as the printer whose printing is to be controlled and the processing from step S321 onward is executed again with regard to this printer. If the "Choose" button has not been pressed, the program returns to step S325.

Seventh Embodiment

Described next will be a printing system in which when the setting of the printer driver and the setting of the printer differ, the setting of the printer driver is changed in conformity with the setting of the printer without an error display being presented. A case in which the printing heads differ in a manner similar to that of the third embodiment will be described as an example.

Figure 47:
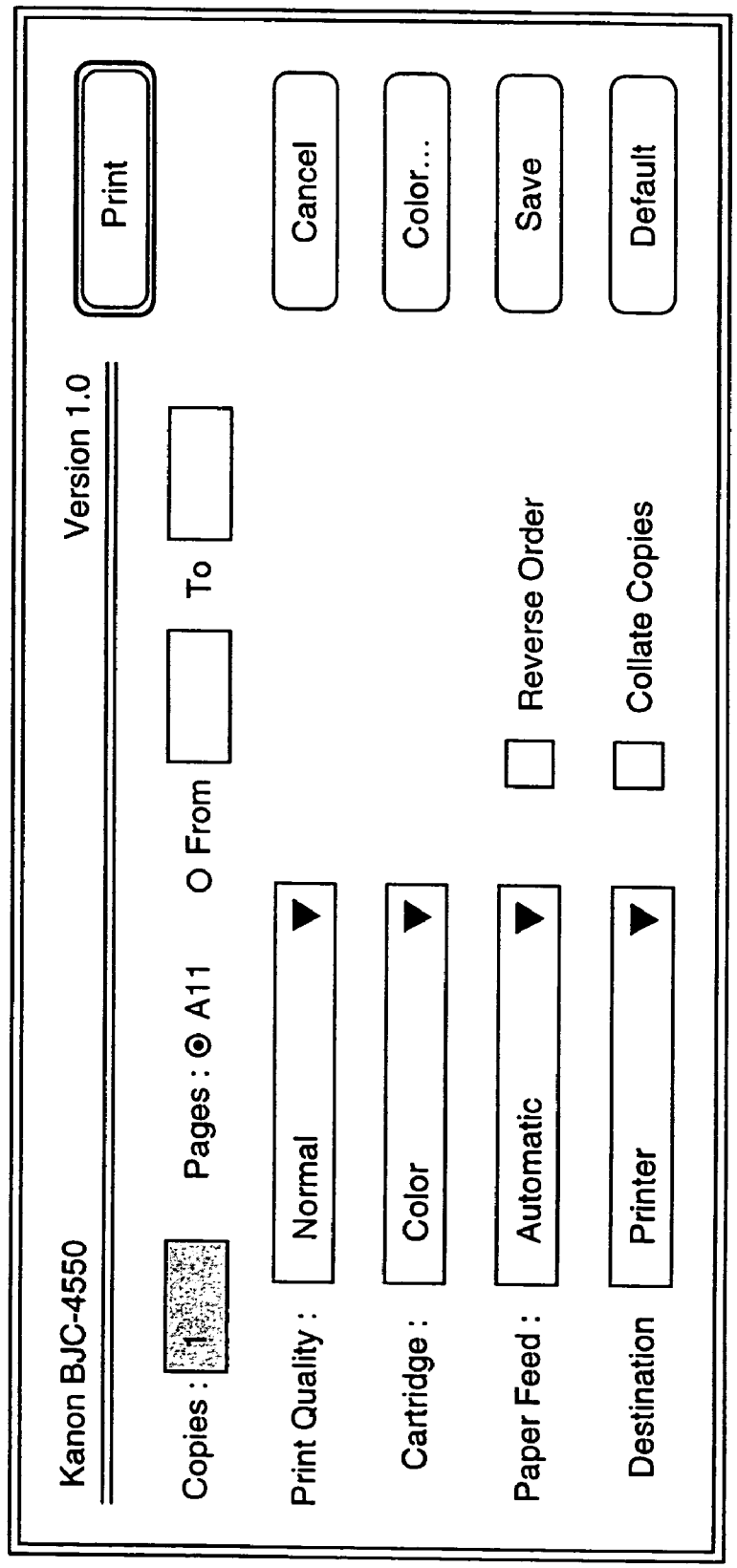
FIG. 47 is a diagram showing a printing dialog box 3.
Figure 48:
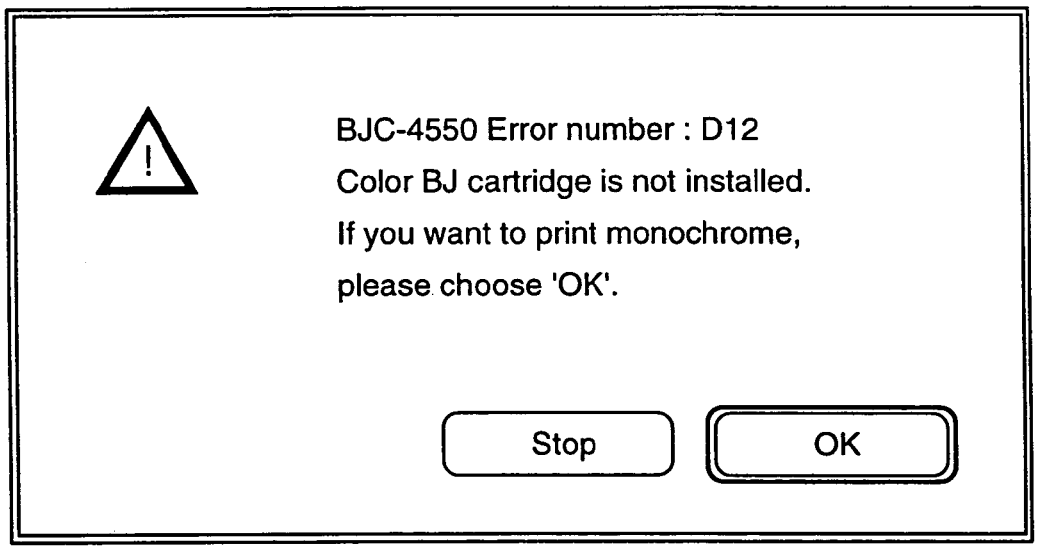
FIG. 48 is a diagram showing a dialog box for confirming monochrome printing.

The operation of the printer driver will be described in terms of the display screen. FIG. 47 shows a printing dialog box. This dialog box is a window for making various settings relating to printing and executing printing. A "Cartridge" menu in FIG. 47 is for selecting the head. Three types of heads are available for the printer in this printing system. The first is a monochrome printing head, the second, a color printing head and the third, a photographic grade printing head. The printer drive generates a print command in conformity with the setting on the "Cartridge" menu when a "Print" button is pressed. The head that has been installed in the printer is checked before the print command is transmitted to the printer. If the installed head agrees with the menu setting, then the print command is transmitted. If non-agreement is found, an error dialog box shown in FIG. 48 is displayed. If the "Stop" button in this dialog box is pressed, printing is suspended. If "OK" is selected, a print command is generated in conformity with the head that has been installed in the printer.

Figure 49:
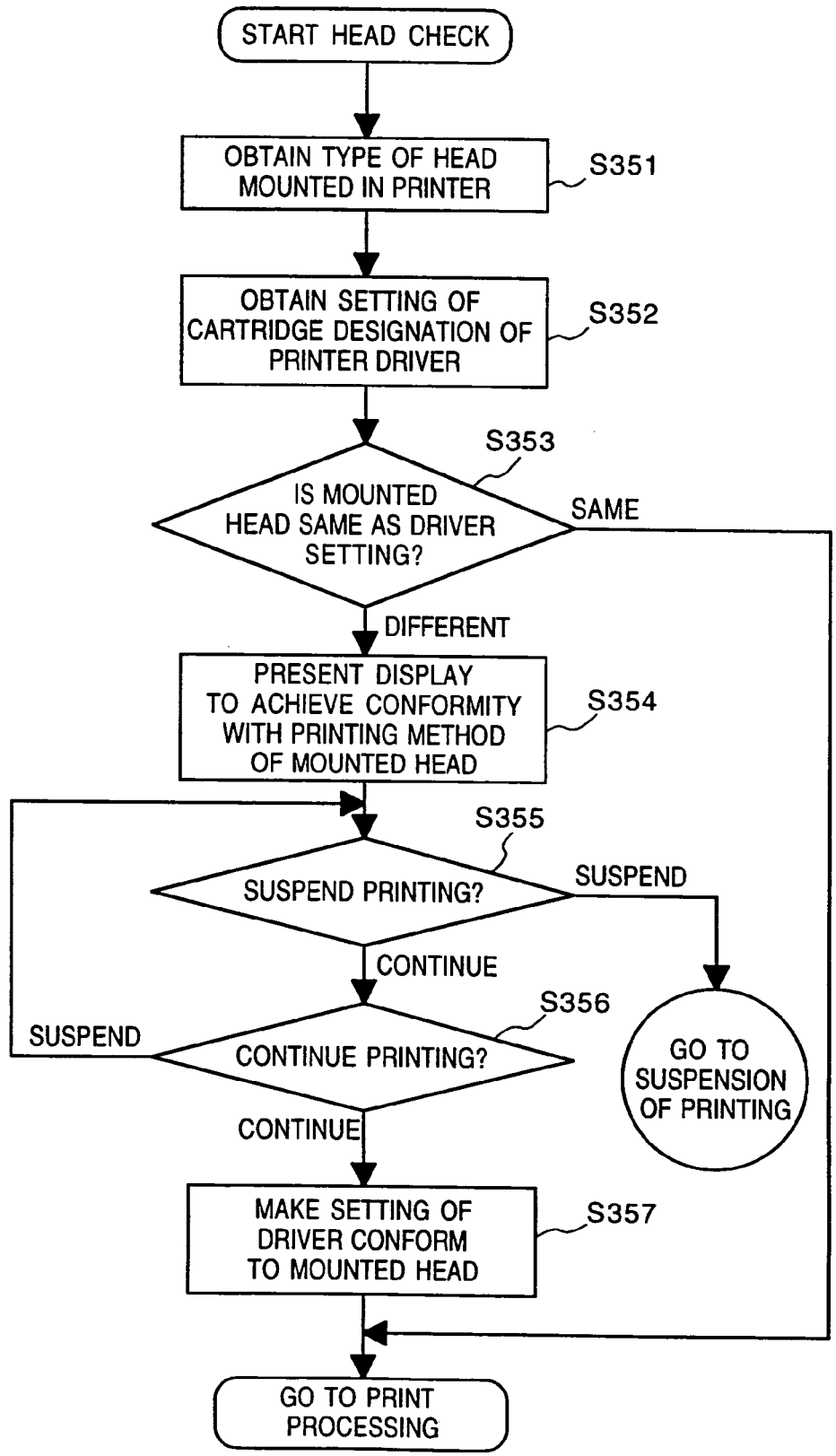
FIG. 49 is a flowchart of processing for checking heads in the seventh embodiment.

The operation of the printer driver will now be described with reference to a flowchart. FIG. 49 is a flowchart of processing from clicking of the "Print" button in FIG. 47 to transmission of the print command after execution of printing is designated.

The type of head mounted in the printer H08 is obtained via the printer interface H07 of FIG. 33 at step S351. The value set as the "Cartridge" item of the printer driver is obtained at step S352. It is determined at step S353 whether the head that has been mounted in the printer H08 and the setting regarding the printer driver agree. If the two agree, a transition is made to printing processing. If the two do not agree, the program proceeds to step S354, at which a display is presented to the effect that the set head is different from the head actually installed. In this embodiment, the error dialog box of FIG. 48 is displayed. Steps S355 and S356 constitute error dialog processing. It is determined at step S355 whether the "Stop" button has been pressed. If the "Stop" button has been pressed, a transition is made to step S357. If the "Stop" button has not been pressed, however, the program returns to step S355. The setting of the printer driver is made to conform to the head mounted in the printer at step S358. Subsequent printing steps generate a command in conformity with the setting of the printer driver. As a result, a command in line with the mounted head is generated.

It should be noted that although cartridge type is dealt with in this embodiment, processing would be executed in similar fashion with regard to paper size, etc.

By thus making the printer driver setting conform to the setting on the printer per se, printer malfunction caused by erroneous setting at the time of printing can be prevented.

Printing can be performed correctly by executing the same processing even in arrangements other than those of the fourth through seventh embodiments, such as in cases where the setting of paper type or paper feed opening differs from that on the printer driver. Further, if the setting information can be transmitted from the printer to the host, any physical interface may be used.

Eighth Embodiment

The hardware configuration for implementing this embodiment of the invention is as shown in FIG. 33, namely a configuration the same as that of the fourth through seventh embodiments.

The beginning of ordinary printing processing of the printer driver in this embodiment will now be described. The printer driver displays a dialog box for setting up printing processing before printing, and the user sets up printing processing made to conform to the printed matter and designates execution of printing. Setting of printing processing by the user shall be referred to as "print setting." Print setting includes designations not only of the head information described below but also designations of paper size, paper type, printing method and paper feed opening.

The details of this printing system will now be described. The system is adapted to investigate the head installed in the printer while displaying the printing dialog box of the printer driver and to display a cartridge menu conforming to the head that has been installed.

The operation of the printer driver will be described first in terms of the display screen. FIG. 50 illustrates the printing dialog box. A "Cartridge" menu in FIG. 50 is for selecting the head. Three types of heads are available for the printer in this printing system. The first is a monochrome printing head, the second, a color printing head and the third, a photographic grade printing head. FIGS. 51 through 53 show "Cartridge" menus. FIGS. 51, 52 and 53 are menus displayed when the color printing head, monochrome printing head and photographic grade printing head, respectively, have been loaded in the in the printer. The printer driver changes the menu automatically in conformity with the head that has been installed.

Figure 54:
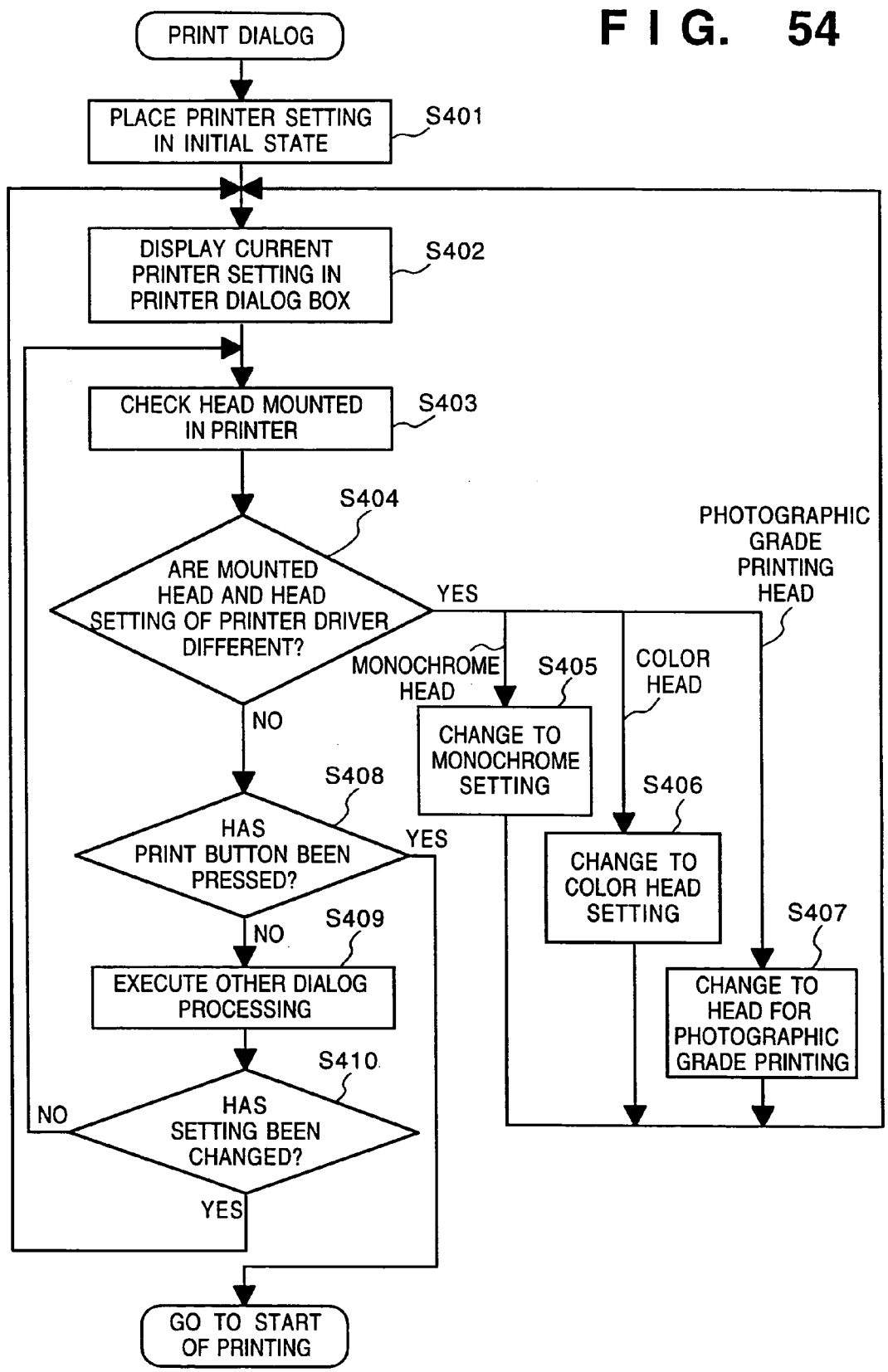
FIG. 54 is a flowchart of processing for displaying a printing dialog box in the eighth embodiment.

The operation of the printer driver will now be described with reference to a flowchart. FIG. 54 is a flowchart of printing dialog processing in the system according to this embodiment. When printing is designated by the operator, processing is started by the procedure of FIG. 54.

Initial setting of printing is performed at step S401. A dialog display is presented at step S402 in conformity with the current print setting. This is followed by step S403, at which it is determined through the printer interface H07 of FIG. 33 whether a head has been mounted in the printer H08. The setting of the head in print setting and the head that has been installed in the printer are compared at step S404. The program proceeds to step S408 if the two agree. If the two do not agree, processing branches in accordance with the head that has been installed in the printer. The program proceeds to step S405 if the monochrome printing head has been installed, to step S406 if the color printing head has been installed and to step S407 if the photographic printing grade head has been installed. The head information of the print setting is set to black and white at step S405, to color at step S406 and to photographic grade printing at step S407. It is determined at step S408 whether the print button of the printing dialog box has been pressed. If the answer is "YES", a transition is made to printing processing. If the answer is "NO", then the program proceeds to step S409, where overall processing for printing dialog is executed. Here print settings such as the printing method and paper feed opening are changed. It is determined at step S410 whether a print setting has been changed at step S409. If a print setting has been changed, the program proceeds to step S402; otherwise, the program proceeds to step S403.

Thus, in a case where the cartridge actually installed in the printer and the printer driver setting differ, the setting of the driver is made to conform to the status of the printer, thereby facilitating the setting operation and making it possible to prevent printing malfunction causes by erroneous settings.

Printing processing can be executed under correct settings at all times by executing setting processing through a procedure similar to that of FIG. 54 to deal with paper size and the status of paper feed. Further, if the setting information can be transmitted from the printer to the host, any physical interface may be used.

Ninth Embodiment

Figure 56:
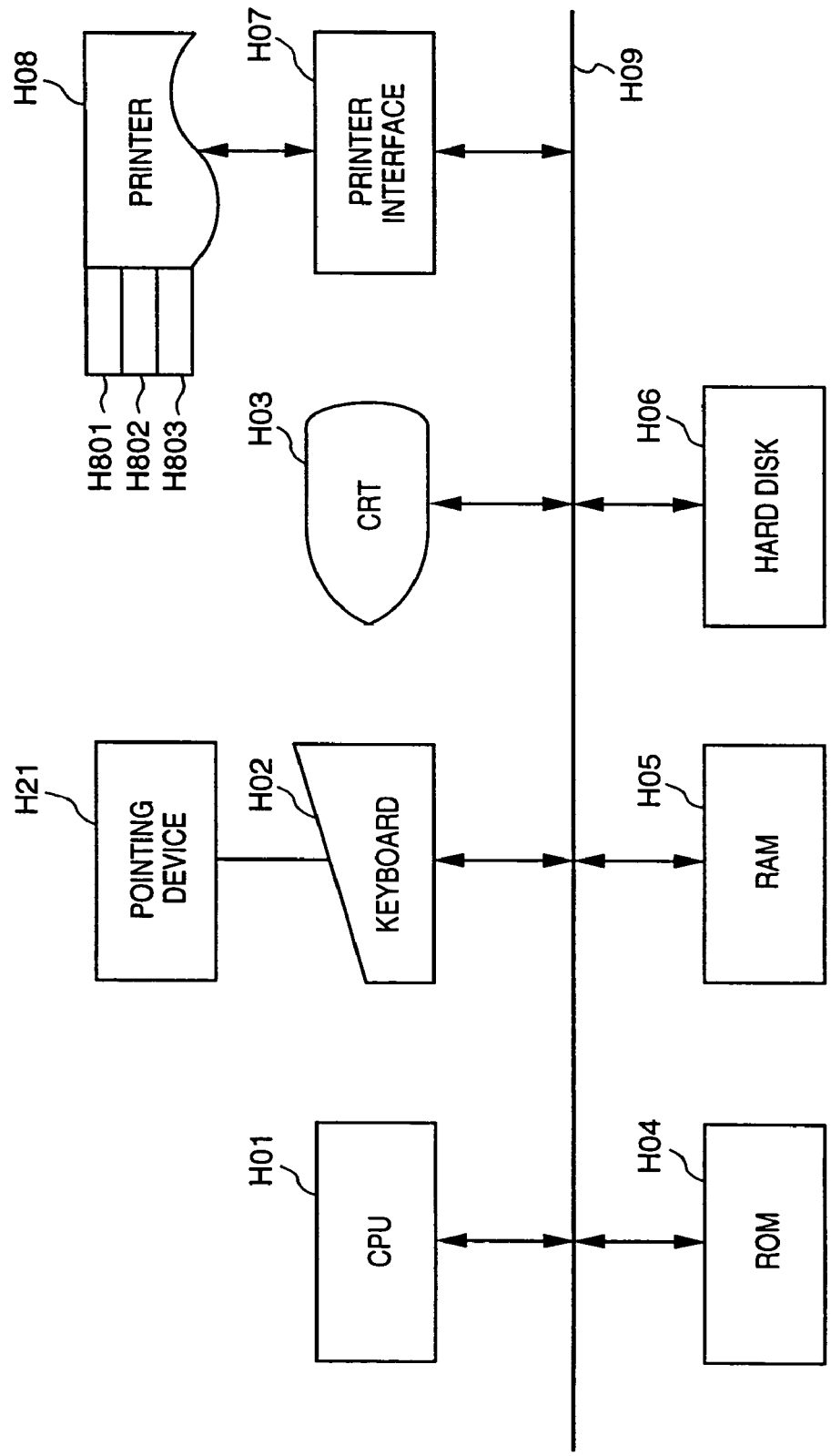
FIG. 56 is a block diagram illustrating the hardware configuration of a printing system according to a ninth embodiment.

The hardware configuration of a printer system for realizing this embodiment of the invention will be described with reference to FIG. 56. Components similar to those shown in FIG. 33 are designated by like reference characters and need not be described again. The arrangement of FIG. 56 differs from that of FIG. 33 in that the printer H08 is equipped with counters H801, H802 and H803 for measuring the amounts of remaining ink in the three types of cartridges. The remaining ink counters are changed over automatically when a cartridge is replaced. However, the amount of ink used is not reset automatically. Further, this system has the software of the kind shown in FIG. 32, and the printer driver is implemented by the CPU H01, whereby the printer H08 is controlled. Furthermore, the printer H08 is capable of discriminating the type of cartridge that has been installed. Specifically, each cartridge is provided beforehand with an identifier such as a projection conforming to the type of cartridge, and the identifier is capable of being sensed by a sensor on the printer body.

Figure 58:
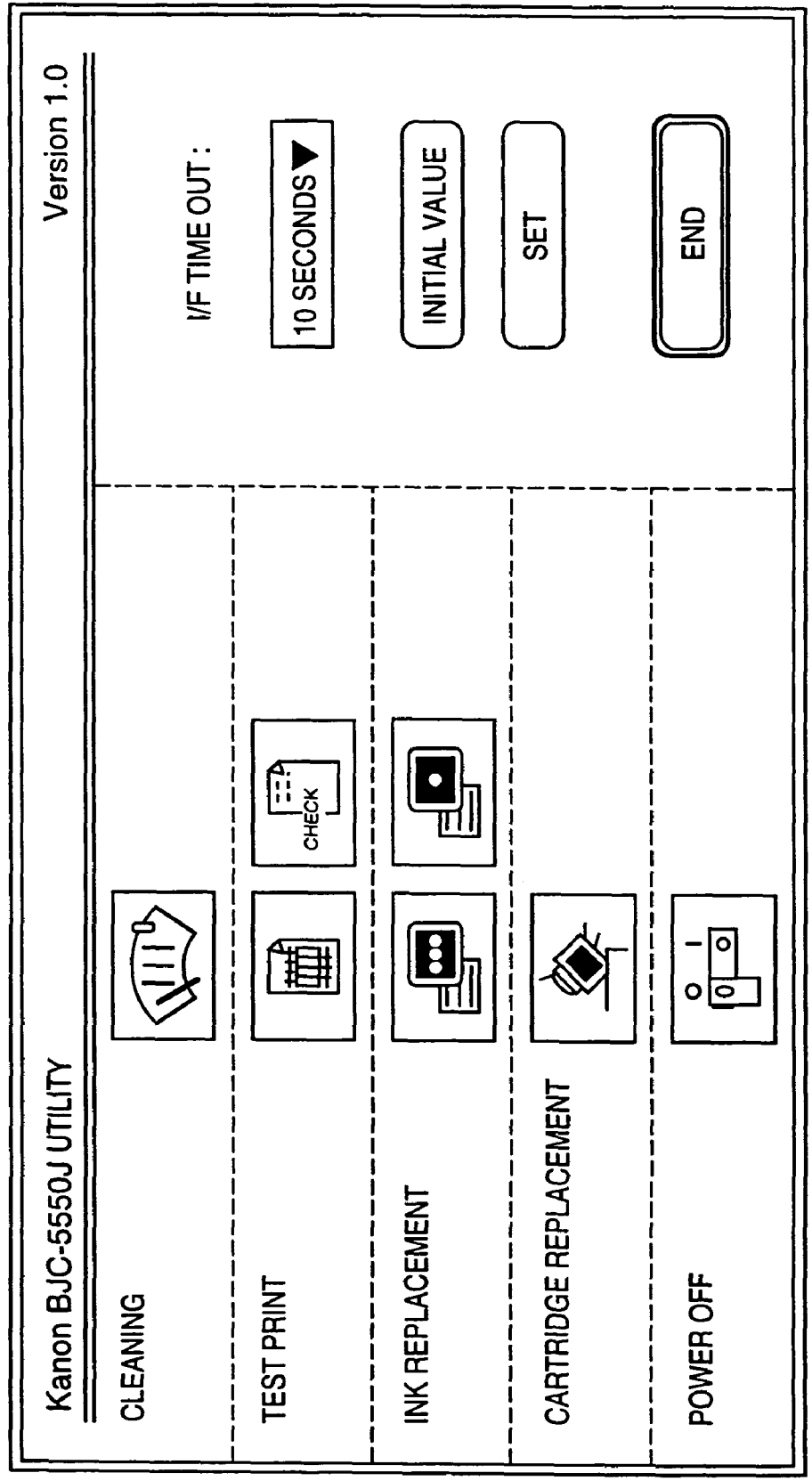
FIG. 58 is a diagram showing an example of a utility dialog box of a printer driver.
Figure 59:
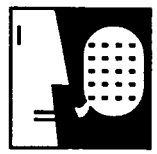
FIG. 59 is a diagram showing an example of a dialog box illustrating that cartridge replacement is in progress.
Figure 60:
FIG. 60 is a diagram showing an example of a dialog box prompting resetting of remaining ink counter.

This embodiment will now be described in conjunction with a display presented on the display screen. FIG. 58 is a utility dialog window for designating cleaning and cartridge replacement in the printer H08. This window is displayed on the display unit H03 by having the operator make an entry by the keyboard or pointing device to the effect that the utility of the printer driver is to be used. When a cartridge replacement button is pressed on this screen, i.e., when the pointing device is used to select this button to designate execution of the replacement, the printer driver starts cartridge replacement processing. First, the cartridge is moved to a cartridge replacement position, after which the system waits for the cartridge to be replaced. The dialog box of FIG. 59 is displayed until the new cartridge is installed. If a different type cartridge is found to have been installed when cartridge replacement is finished (i.e., when this is determined by the cartridge sensor), processing is terminated. If a cartridge of the same type is found to have been installed, the dialog box shown in FIG. 60 is displayed and the operator is requested to select whether the amount of remaining ink is to be reset. If resetting of the amount of remaining ink is selected, the remaining ink counter is reset. If resetting is not selected, then processing is terminated without execution of any other steps.

Figure 57:
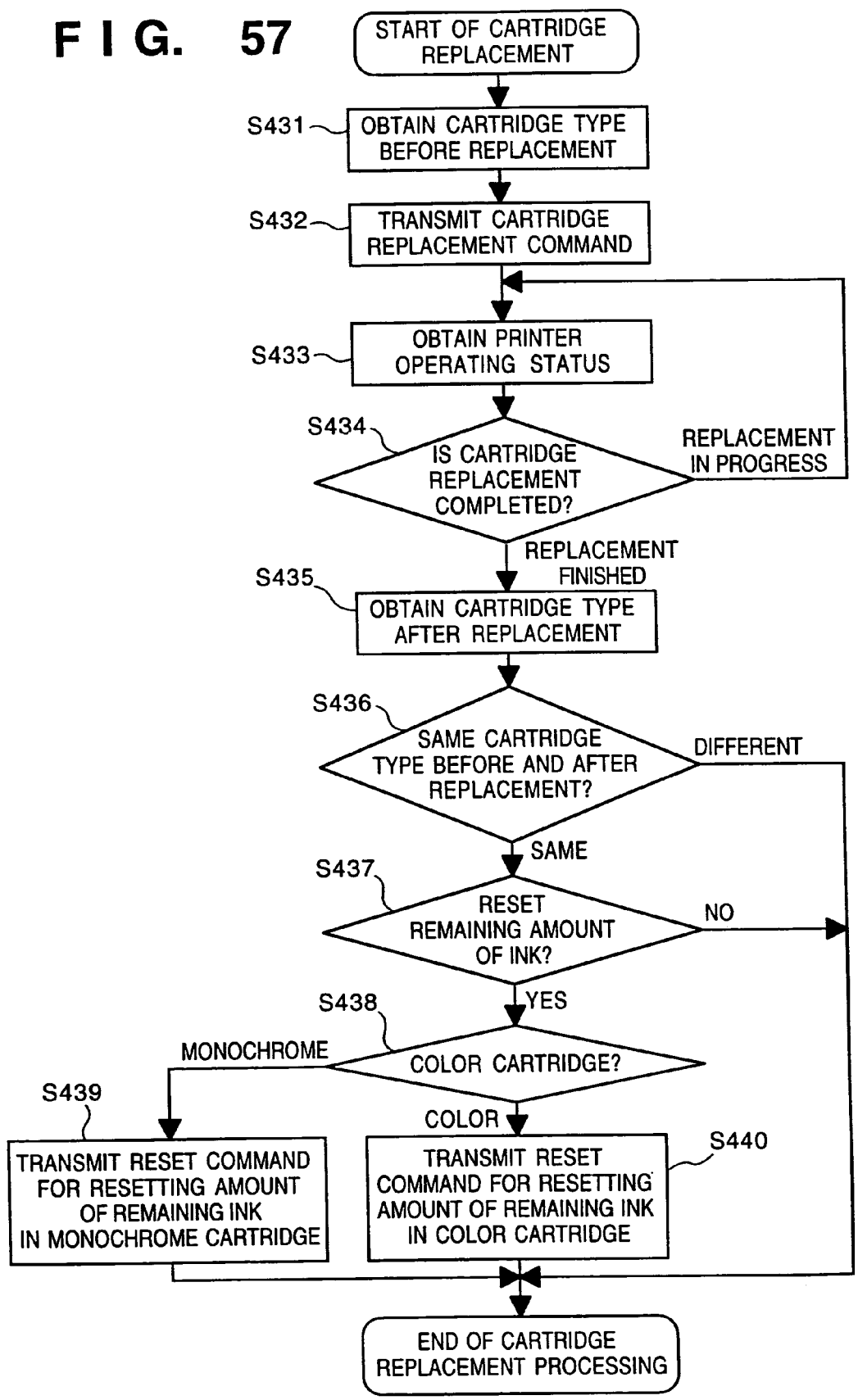
FIG. 57 is a flowchart of processing executed by a print driver of the printing system of the ninth embodiment when an ink cartridge is replaced.

This will now be described with reference to a flowchart. FIG. 57 is a flowchart of the portion of processing related to cartridge replacement in the printer driver. This flowchart is executed after the cartridge replacement button of FIG. 58 is pressed.

The type of cartridge currently installed, i.e., the type of cartridge prior to replacement, is acquired at step. S431. More specifically, the type of cartridge that has been sensed by the cartridge recognition sensor of the printer H08 is requested. Here the dialog box of FIG. 59 is displayed. A command for moving the cartridge to the cartridge replacement position is transmitted at step S432. As a result, the cartridge of the printer is moved to the replacement position.

Status as to whether cartridge replacement has been completed is acquired at step S433. For example, completion of replacement can be judged to have occurred in the printer H08 when a cartridge is sensed again by the cartridge sensor after a cartridge has been removed. The printer sends a signal indicative of this decision to the printer driver as status regarding the completion of cartridge replacement. On the basis of the status signal received, it is determined at step S434 whether the cartridge replacement has been completed. If the answer is "NO", the program returns to step S433. The type of the newly installed cartridge is acquired at step S435. Here it will suffice to execute processing the same as that executed at step S431.

In order to determine whether the type of cartridge after the replacement is the same as that before the replacement, the cartridge type acquired at step S43 1 and the type acquired at step S435 are compared at step S436. If the cartridge type is different, then cartridge replacement processing is ended. Next, at step S437, the screen of FIG. 60 is displayed and the operator is allowed to select whether resetting of the amount of remaining ink is to be performed. If the operator does not reset the amount of remaining ink, then cartridge replacement processing is terminated.

It is determined at step S438 whether the cartridge that has been installed is the monochrome cartridge or the color cartridge. A transition is made to step S439 in case of the monochrome cartridge and to step S440 in case of the color cartridge. A reset command for resetting the amount of remaining ink in the monochrome cartridge is transmitted to the printer H08 at step S439. A reset command for resetting the amount of remaining ink in the color cartridge is transmitted to the printer H08 at step S440. Though only two types of cartridges are dealt with in FIG. 57, resetting of the remaining ink counters corresponding to the cartridges would be performed in the same manner even if there were three or more cartridges.

Since a remaining ink counter corresponding to an installed cartridge can be reset in the manner set forth above, it is possible to prevent an error in the remaining ink counter to be reset at the time of cartridge replacement and to prevent the printer from erroneously detecting the amount of remaining ink.

Though resetting of the amount of remaining ink is performed from the printer driver in the foregoing embodiment, it goes without saying that the same effects can be obtained even if this is performed using the firmware of the printer per se.

Thus, as described above, the present invention has a first cartridge-type acquisition step of acquiring cartridge type before cartridge replacement, a cartridge replacement step of performing cartridge replacement, a second cartridge-type acquisition step of acquiring cartridge type after cartridge replacement, a cartridge-type comparison step of comparing the cartridge types before and after cartridge replacement, and a remaining amount of ink resetting step for resetting amount of remaining ink if the cartridge types are the same, wherein the type of the installed cartridge is recognized automatically and the amount of remaining ink reset correctly.

The present invention can be applied to a system constituted by a plurality of devices (e.g., a host computer, interface, reader, printer, etc.) or to an apparatus comprising a single device (e.g., a copier or facsimile machine, etc.). Further, the invention is applicable also to a case where the object of the invention is attained by supplying a program to a system or apparatus. In such case the system or apparatus would make it possible to attain the effects of the invention by supplying the system or apparatus with a storage medium storing a program represented by software for achieving the invention.

Further, it goes without saying that the object of the present invention can also be achieved by providing a storage medium storing the program codes of the software for performing the aforesaid functions of the foregoing embodiment to a system or an apparatus, reading the program codes with a computer (e.g., a CPU or MPU) of the system or apparatus from the storage medium, and then executing the program.

Further, the storage medium, such as a floppy disk, hard disk, magneto-optical disk, CD-ROM, magnetic tape, non-volatile type memory card or ROM can be used to provide the program codes.

Furthermore, besides the case where the aforesaid functions according to the embodiments are implemented by executing the program codes read by a computer, the present invention covers a case where an operating system (OS) or the like working on the computer performs a part of or the entire process in accordance with the designation of program codes and implements the functions according to the embodiment.

Furthermore, the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiments.

In a case where the present invention is applied to the above-mentioned storage medium, program codes corresponding to the flowchart described earlier are stored on this storage medium. More specifically, modules illustrating an example of the memory map of FIG. 60 are stored on the storage medium.

Specifically, it will suffice to store program codes of at least modules of a code of an input step of entering a value of each item of control information, a code of a readout step of reading out link information from link information storage means, wherein in a case where control information has been entered at the input step, an item to be changed in dependence upon the value of an item and the value of this item are stored beforehand as the link information with regard to predetermined items of the control information, a code of a setting step of setting a value of a relevant item based upon items and values contained in the link information read out at the readout step, and a code of a latest-value storage step of storing the latest value of the control information set at the input step or setting step.

Alternatively, each of the modules shown in the example of the memory map of FIG. 62 is stored on the storage medium.

More specifically, it will suffice to store program codes of at least modules of a code of a setting step of entering a value of an item of control information, a code of a setting acquisition step of acquiring setting status from the printing device, a code of a comparison step of comparing an item set at the setting step and setting status acquired at the setting acquisition state, and a code of a display step which, when the result of the comparison at the comparison step is that the value of the set item and the acquired setting status differ, is a step of displaying this fact.

Alternatively, each of the modules shown in the example of the memory map of FIG. 63 is stored on the storage medium.

More specifically, it will suffice to store program codes of at least modules of a code of a setting step of setting values of items of control information, a code of a setting acquisition step of acquiring setting status from the printing device, a code of a comparison step of comparing an item set at the setting step and setting status acquired at the setting acquisition state, and a code of a re-setting step, when the result of the comparison at the comparison step is that the value of the set item and the acquired setting status differ, is for setting the status, which has been acquired at the setting acquisition step, with regard to each item for which a difference is found.

Alternatively, it will suffice to store program codes of at least modules of a code of a setting step of setting values of items of the control information, a code of a setting acquisition step of acquiring setting status from the printing device, a code of a comparison step of comparing an item set at the setting step and setting status acquired at the setting acquisition state, and a code of a re-setting step which, when the result of the comparison at the comparison state is that the value of the set item and the acquired setting status differ, is for shifting control to a different printing device.

In accordance with the present invention, as described above, the user can execute optimum printing by making the minimum number of settings. In a case where the content of information or number of items thereof selected by the user has changed, or in a case where the content of information or number of items thereof supplied to the printing device has changed, this can be dealt with merely by changing the combination of information.

Since it is so arranged that default settings are made, the user need not make many settings related to printing information in the case of ordinary printing. This reduces the burden upon the user.

In a case where an arbitrary setting has been changed by the user, the settings of other settable items also are made optimum settings determined in advance. As a result, control can be performed in such a manner that the user cannot select combinations that are not allowed. This makes it possible to minimize damage accompanying a change in settings.

In addition, printing can be carried out correctly by making printer driver and printer settings agree.

As many apparently widely different embodiments of the present invention can be made without departing from the spirit and scope thereof, it is to be understood that the invention is not limited to the specific embodiments thereof except as defined in the appended claims.

What is claimed is:

1. An information processing apparatus connected with a printer, comprising:
    a display unit, adapted to display a print setting window for displaying a first value as a setting of a first setting item and displaying a second value as a setting of a second setting item;
    a first determination unit, adapted to determine whether or not a setting of the first setting item in the print setting window is changed from the first value into a third value;
    a second determination unit, adapted to, when it is determined by said first determination unit that the setting of the first setting item is changed from the first value into the third value, determine whether or not a conflict occurs between the third value of the first setting item and the second value of the second setting item;
    a third determination unit, adapted to, when it is determined that the conflict between the third value of the first setting item and the second value of the second setting item occurs, determine whether or not a selection of a change of the second setting item from the second value into a fourth value should be made by the user; and
    a change unit that
    when it is determined by said third determination unit that the user makes the selection, displays a window for accepting a selection by a user, and when the user has made a selection of a change of the setting of the second setting item from the second value into the fourth value, changes a display of the second setting item from the second value into the fourth value so as to avoid the conflict between the second setting item and the first setting item, when it is determined by said third determination unit that the user makes the selection, displays a window for accepting a selection by a user, and when the user has not made a selection of a change of the setting of the second setting item, leaves a display of the second setting item as the second value, and when it is determined by said third determination unit that the user does not make the selection, changes the setting of the second setting item from the second value into the fourth value so as to avoid the conflict between the first setting item and the second setting item without displaying the window for accepting a selection by a user.

2. An apparatus according to claim 1, wherein the first setting item includes a medium type and the second setting item includes a paper feed method.

3. An apparatus according to claim 1, further comprising an acquisition unit, adapted to acquire link information regarding the changed setting when the setting of the first setting item is determined to be changed.

4. An apparatus according to claim 3, wherein the link information contains information instructing that a first setting of the second setting item is unable to be changed and information instructing that a second setting of the second setting item is selected.

5. An apparatus according to claim 1, further comprising:
   an acquisition unit, adapted to acquire link information regarding the changed setting when the setting of the first setting item is determined to be changed; and
   a comparison unit, adapted to compare the link information acquired by said acquisition unit and a setting,
   wherein said change unit changes the setting of the second setting item corresponding to the changed setting of the first setting item if the link information differs from the setting.

6. An information processing method performed in an information processing apparatus connected with a printer and that displays a print setting window for displaying a first value as a setting of a first setting item and displaying a second value as a setting of a second setting item, said method comprising:
   a first determination step of determining whether or not a setting of the first setting item in the print setting window is changed from the first value into a third value;
   a second determination step of, when it is determined in said first determination step that the setting of the first setting item is changed from the first value into the third value, determining whether or not a conflict occurs between the third value of the first setting item and the second value of the second setting item;
   a third determination step of when it is determined that the conflict between the third value of the first setting item and the second value of the second setting item occurs, determining whether or not a selection of a change of the second setting item from the second value into a fourth value should be made by the user; and
   a change step of,
   when it is determined in said third determination step that the user makes the selection, displaying a window for accepting a selection by a user, and when the user has made a selection of a change of the setting of the second setting item from the second value into the fourth value, changing a display of the second setting item from the second value into the fourth value so as to avoid the conflict between the second setting item and the first setting item, when it is determined in said third determination step that the user makes the selection, displaying a window for accepting a selection by a user, and when the user has not made a selection of a change of the setting of the second setting item, leaving a display of the second setting item as the second value, and when it is determined in said third determination step that the user does not make the selection, changing the setting of the second setting item from the second value into the fourth value so as to avoid the conflict between the first setting item and the second setting item without displaying the window for accepting a selection by a user.

7. A method according to claim 6, wherein the first setting item includes a medium type and the second setting item includes a paper feed method.

8. A method according to claim 6, further comprising an acquisition step of acquiring link information regarding the changed setting when the setting of the first setting item is determined to be changed.

9. A method according to claim 8, wherein the link information contains information instructing that a first setting of the second setting item is unable to be changed and information instructing that a second setting of the second setting item is selected.

10. A method according to claim 6, further comprising:
    an acquisition step of acquiring link information regarding the changed setting when the setting of the first setting item is determined to be changed; and
    a comparison step of comparing the link information acquired in said acquisition step and a setting,
    wherein said change step changes the setting of the second setting item corresponding to the changed setting of the first setting item if the link information differs from the setting.

11. A computer-readable medium encoded with a program, which makes a computer execute an information processing method, the computer connected with a printer and displaying a print setting window displaying a first value as a setting of a first setting item and displaying a second value as a setting of a second setting item, said method comprising:
    a first determination step of determining whether or not a setting of the first setting item in the print setting window is changed from the first value into a third value;
    a second determination step of, when it is determined in said first determination step that the setting of the first setting item is changed from the first value into the third value, determining whether or not a conflict occurs between the third value of the first setting item and the second value of the second setting item;
    a third determination step of when it is determined that the conflict between the third value of the first setting item and the second value of the second setting item occurs, determining whether or not a selection of a change of the second setting item from the second value into a fourth value should be made by the user; and
    a change step of,
    when it is determined in said third determination step that the user makes the selection, displaying a window for accepting a selection by a user, and when the user has made a selection of a change of the setting of the second setting item from the second value into the fourth value, changing a display of the second setting item from the second value into the fourth value so as to avoid the conflict between the second setting item and the first setting item, when it is determined in said third determination step that the user makes the selection, displaying a window for accepting a selection by a user, and when the user has not made a selection of a change of the setting of the second setting item, leaving a display of the second setting item as the second value, and when it is determined in said third determination step that the user does not make the selection, changing the setting of the second setting item from the second value into the fourth value so as to avoid the conflict between the first setting item and the second setting item without displaying the window for accepting a selection by a user.

12. A program according to claim 11, wherein the first setting item includes a medium type and the second setting item includes a paper feed method.

13. A program according to claim 11, wherein said method further comprises an acquisition step of acquiring link information regarding the changed setting when the setting of the first setting item is determined to be changed.

14. A program according to claim 13, wherein the link information contains information instructing that a first setting of the second setting item is unable to be changed and information instructing that a second setting of the second setting item is selected.

15. A program according to claim 11, wherein said method further comprises:

an acquisition step of acquiring link information regarding the changed setting when the setting of the first setting item is determined to be changed; and a comparison step of comparing the link information acquired in said acquisition step and a setting, wherein said change step changes the setting of the second setting item corresponding to the changed setting of the first setting item if the link information differs from the setting.

* * * * *

UNITED STATES PATENT AND TRADEMARK OFFICE
CERTIFICATE OF CORRECTION

PATENT NO. : 7,408,674 B2
APPLICATION NO. : 10/659262
DATED : August 5, 2008
INVENTOR(S) : Moro et al.

It is certified that error appears in the above-identified patent and that said Letters Patent is hereby corrected as shown below:

COLUMN 6:
Line 53, "byway" should read --by way--.

COLUMN 14:
Line 13, "(step 51503)," should read --(step S1503),--, and "RAIVI" should read --RAM--.

COLUMN 17:
Line 51, "dependent" should read --dependence--.

COLUMN 30:
Line 10, "step S43 1" should read --step S431--.

Signed and Sealed this

Tenth Day of March, 2009

JOHN DOLL
*Acting Director of the United States Patent and Trademark Office*